(12) United States Patent
Arai et al.

(10) Patent No.: US 6,671,247 B1
(45) Date of Patent: Dec. 30, 2003

(54) OPTICAL PICK-UP APPARATUS, OPTICAL ELEMENT, AND OBJECTIVE LENS HAVING DIFFRACTING SECTION

(75) Inventors: Norikazu Arai, Hachioji (JP); Toshiyuki Kojima, Hachioji (JP); Kohei Ota, Hachioji (JP)

(73) Assignee: Konica Corporation, Tokyo (JP)

( * ) Notice: Subject to any disclaimer, the term of this patent is extended or adjusted under 35 U.S.C. 154(b) by 346 days.

(21) Appl. No.: 09/712,231

(22) Filed: Nov. 15, 2000

(30) Foreign Application Priority Data

Nov. 18, 1999 (JP) .................................. 11-328264
Dec. 15, 1999 (JP) .................................. 11-355788
Feb. 24, 2000 (JP) .................................. 2000-047984
Mar. 24, 2000 (JP) .................................. 2000-083761

(51) Int. Cl.⁷ .................................................. G11B 7/00

(52) U.S. Cl. ............................... 369/112.01; 369/112.08

(58) Field of Search ..................... 369/109.2, 110.03, 369/112.03, 112.07, 112.08, 112.12, 112.13, 112.23, 53.11

(56) References Cited

U.S. PATENT DOCUMENTS 6,192,021 B1 * 2/2001 Saito et al. .................. 369/112

\* cited by examiner

*Primary Examiner*—Nabil Hindi
(74) *Attorney, Agent, or Firm*—Finnegan, Henderson, Farabow, Garrett & Dunner, L.L.P.

(57) ABSTRACT

An optical pickup apparatus for a first optical medium including a first transparent base plate having a thickness of t1 and a second optical medium including a second transparent base plate having a thickness of t2 (t2>t1), comprises a first light source to emit a first light flux having a wavelength of $\lambda 1$; a second light source to emit a second light flux having a wavelength of $\lambda 2$ ($\lambda 1<\lambda 2$); a converging optical system having an objective lens and a diffracting section and to converge the first light flux or the second light flux onto the first optical medium or the second optical medium; and an optical detector. When the converging optical system converges the second light flux onto the second information recording surface so as to conduct reproducing and/or recording the information of the second optical information recording medium, a spherical aberration has at least one discontinuous portion or at least one substantially discontinuous portion.

36 Claims, 43 Drawing Sheets

SPHERICAL ABERRATION (DVD)

SPHERICAL ABERRATION (CD)

SPHERICAL ABERRATION (DVD)

SPHERICAL ABERRATION (CD)

SPHERICAL ABERRATION (DVD)

SPHERICAL ABERRATION (CD)

$\lambda$ = 650mm
$t_1$ = 0.6mm $\lambda_1$ = 780mm
$t_2$ = 1.2mm $t_1 = 0.6$   $\lambda = 650nm$
EXAMPLE 6 (FLARE TYPE)

EXAMPLE 4

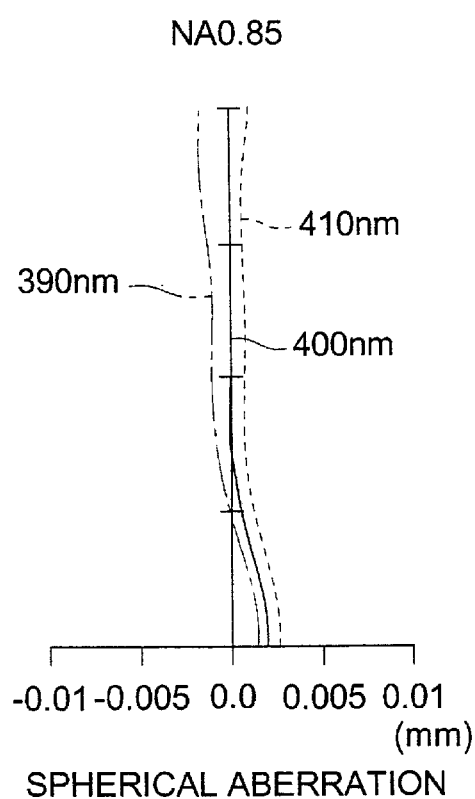 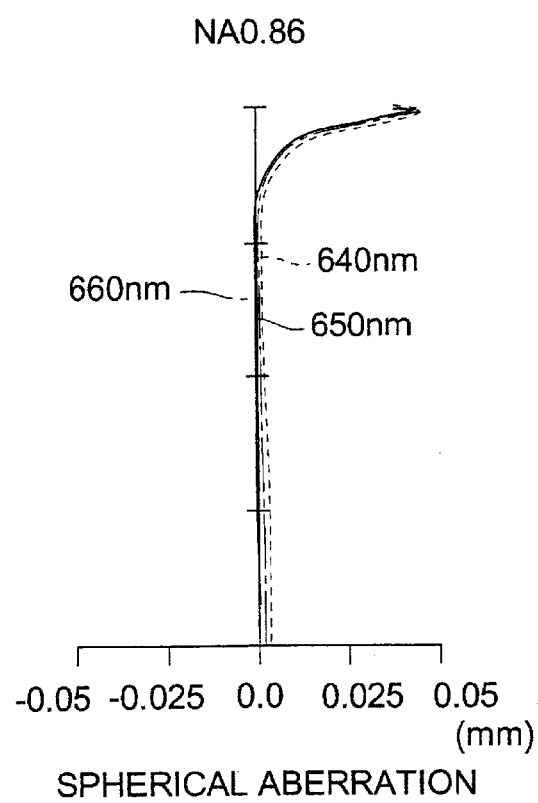

DVD ABERRATION VIEW

CD ABERRATION VIEW

DVD ABERRATION VIEW

CD ABERRATION VIEW

FIG. 42
SPOT DIAGRAM OF LUMINOUS FLUX (NA 0.5 - 0.63) OF DVD EXCLUSIVE-USE AREA WHEN SECOND DEGREE DIFFRACTION LIGHT IS USED
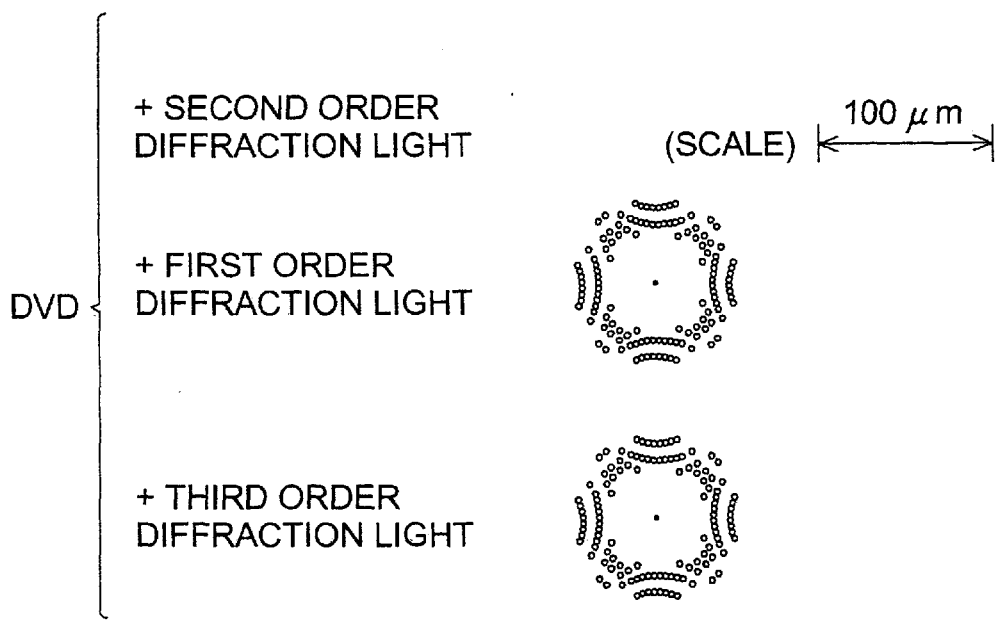
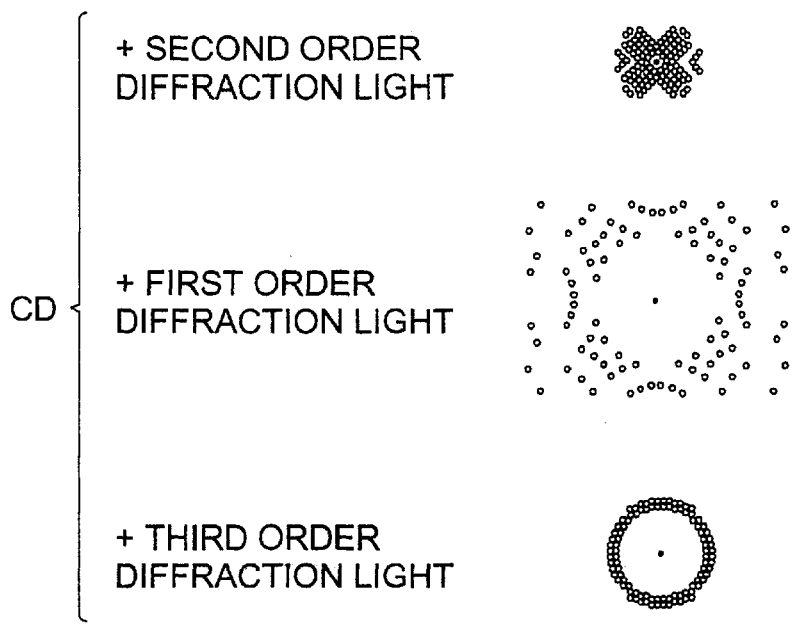

US 6,671,247 B1

OPTICAL PICK-UP APPARATUS, OPTICAL ELEMENT, AND OBJECTIVE LENS HAVING DIFFRACTING SECTION

BACKGROUND OF THE INVENTION

The present invention relates to an optical pick-up apparatus, optical elements, and an objective lens, and specifically to an optical pick-up apparatus which can information-record on two optical information recording media whose transparent substrate thickness are different, or can information-reproduce from two optical information recording media whose transparent substrate (base plate) thickness are different, and to optical elements and an objective lens for use in the apparatus.

Recently, as a short wavelength red semiconductor laser is put to practical use, the development of a DVD (digital video disk) which is a high density optical disk whose size is almost the same as the conventional optical disk, that is, a CD (compact disk) which is an optical information medium, and whose capacity is greatly increased, is advanced. In an optical system of an optical information recording and reproducing apparatus which uses such the optical disk as a medium, in order to attain the high increase of the density of a recording signal, it is required that the diameter of a spot which is converged by an objective lens, is reduced. Therefore, there is a real situation in which the shortening of the wavelength of a laser as a light source and an increase of NA of the objective lens are promoted.

For example, in the optical pick-up apparatus for recording and/or reproducing the information on and from the DVD, when the short wavelength semiconductor laser of 635 nm is used as the light source, the numerical aperture NA of the objective lens to converge the laser light, on the optical disk side, is about 0.6. Incidentally, in the CD, or DVD, there are many kinds of standards of optical disks such as, for example, CD-R (Compact Disk-Recordable), and other than CD, or DVD, MD (Mini Disk)or the like, is put into the market, and comes into wide use.

On the one hand, in the optical pick-up apparatus to record the information and/or to reproduce the information on or from the CD-R, the light source having the wavelength λ=780 nm is necessary, however, for the other optical disks, the light source having the wavelength other than the specific light source wavelength can be used, and in such the case, corresponding to the light source wavelength to be used, the necessary numerical aperture NA is changed. For example, the following values are approximated: in the case of CD, necessary numerical aperture NA=λ (μm)/1.73, and in the case of DVD, the necessary numerical aperture NA=λ (μm)/1.06. The numerical aperture in the present specification is the numerical aperture of a converging optical system viewed from the optical disk side, and the necessary numerical aperture is the numerical aperture calculated from a spot size d required on the recording surface of the optical disk and the wavelength to be used λ, and generally, NA=0.83× λ÷d.

As described above, various optical disks whose transparent substrate thickness, recording density, and wavelength to be used, are different from each other, exist in the market, and to purchase the exclusively used information recording and reproducing apparatus by which the information can be recorded and/or reproduced on or from each of optical disks, is a large burden on the user. Accordingly, an information recording and reproducing apparatus provided with the optical pick-up apparatus which can cope with various optical disks and is interchangeable, is proposed.

In such the optical pick-up apparatus, when the light flux having the different wavelength is entered into the substrates with the different thickness, it is necessary that the spherical aberration is corrected to a smaller amount than a predetermined amount, and in order to appropriately write and read the information, the spot diameter of each light flux is made to be within a predetermined range.

Accordingly, the optical pick-up apparatus which reproduces a plurality of optical disks by using one converging optical system is proposed. For example, in Japanese Tokkaihei No. 7-302437, the optical pick-up apparatus in which the refraction surface of the objective lens is divided into ring-like plural areas, and the information is reproduced when the light beam is image-formed on one of the optical disks with the different thickness, by each of the divided surfaces of the objective lens, is disclosed.

However, in the optical pick-up apparatus disclosed in Japanese Tokkaihei No. 7-302437, because one objective lens has more than 2 focal points simultaneously, and the spot light amount of the focal point per one is reduced, there is a problem that it is necessary to increase the laser output.

On the one hand, in Japanese Tokkaihei No. 10-142494, a 2 composition high NA lens for the pick-up, which can cope with 2 kinds of information recording media with different transparent substrate thickness, is shown. However, in the technique disclosed in this application, because, by changing the interval between 2 lenses, the lens copes with the transparent substrates with different thickness, there is a problem that the structure becomes complicated.

Further, in Japanese Tokkaihei No. 9-54973, an optical system using a hologram optical element by using the transmitted light (0-order diffracted ray) of 635 nm, and −1 order diffracted ray of 785 nm, and an optical system using the hologram optical element by using +1 order diffracted ray of 635 nm, and the transmitted light (0-order diffracted ray) of 785 nm, are disclosed. However, according to this hologram optical element, because the difference in level of the hologram is large, the integration with the objective lens is difficult.

Further, in Japanese Tokkaihei No. 11-96585, the optical pick-up apparatus in which 3 divided surfaces are provided on the refraction surface on the light source side of the objective lens, and in the case of the reproduction of the first optical disk, the light flux passing through the first divided surface and the third divided surface is used, and in the case of the reproduction of the second optical disk whose transparent substrate thickness is different from the first optical disk, the light flux passing through the first divided surface and the second divided surface is used, is disclosed. However, according to this objective lens, the residual aberration becomes large on the optical disk (for example, CD) whose transparent substrate is thicker than the other.

Further, the present inventors previously proposed the optical pick-up apparatus in Japanese Tokuganhei No. 11-312701, in which the action of the diffraction surface and the refraction surface is cancelled for a plurality of light sources with different wavelengths and the spherical aberration is corrected by an objective lens on whose refractive surface the diffracting ring-shaped band is provided. In this case, there is a case where the chromatic aberration is generated, when the wavelength is changed in the light source whose wavelength is shorter than the other.

Incidentally, normally, in the optical pick-up apparatus, a detector to detect a tracking error or the like, when it receives the reflected light from the optical information recording medium, is provided. In the. conventional optical pick-up apparatus, because only the spot light is reflected from the optical information medium, as far as the spot light is irradiated on the correct recording position on the optical information recording medium, the possibility that the light is erroneously detected by the detector, is low. However, when the reflected light passes through the above objective lens, because the light flux more than a predetermined numerical aperture is irradiated on the optical information recording medium as a flare light, when the reflected light is detected by the detector, the possibility of the erroneous detection is generated.

In contrast to this, an optical pick-up apparatus in which respective converging optical systems corresponding to each of different optical disks are provided, and the converging optical systems are switched corresponding to the optical disk to be reproduced, is proposed. According to such the optical pick-up apparatus, when the light flux having different wavelengths are entered into the substrates having the different thickness, the spherical aberration can be corrected to not larger than a predetermined amount, and the spot diameter of each light flux can be within a predetermined range. However, in this optical pick-up apparatus, because a plurality of converging optical systems are necessary, the structure is complicated, and the cost becomes high, therefore, it is not preferable.

SUMMARY OF THE INVENTION

An object of the present invention is to provide an optical pick-up apparatus in which, although a small number of optical elements or objective lenses are used, the information can be recorded and/or reproduced (hereinafter, simply called recording and reproducing) for the information recording medium with the different thickness, and an objective lens and optical elements for use in that.

Further, another object of the present invention is, in the optical pick-up apparatus in which the information can be recorded and/or reproduced for the information recording medium with the different thickness, to provide an optical pick-up apparatus in which, even when the information recording medium whose necessary numerical aperture is not larger than the others is recorded and/or reproduced, the irradiation of unnecessary light to the optical detector can be prevented, and the detection accuracy can be increased.

An object of the present invention is to provide an objective lens, in which at least 2 kinds of optical information recording media having transparent substrates with different thickness can be reproduced or recorded by the light source with at least 2 wavelengths different from each other, and the chromatic aberration of the information recording medium with thinner transparent substrate can be reduced, and simultaneously, the residual aberration of the optical information recording medium with thicker transparent substrate can be reduced to a half, and an optical pick-up apparatus having a converging optical system including the objective lens.

An object of the present invention is to provide an objective lens which, in a high NA objective lens of 2 element-composition, can cope with the information recording media having the different thickness without changing the lens interval, and to provide an optical pick-up apparatus mounted with the objective lens.

An object of the present invention is to provide an optical element appropriate for an optical pick-up apparatus, which can record and/or reproduce the information (hereinafter, simply called recording and reproducing) for the optical information media with different thickness, although a few number of optical elements or objective lenses are used, and can suppresses the erroneous detection, and to provide an optical pick-up apparatus using the optical element.

Above objects can be attained by the following structures.

(1-1) An optical pickup apparatus to conduct reproducing and/or recording information of a first optical information recording medium including a first transparent base plate having a thickness of t1 and a second optical information recording medium including a second transparent base plate having a thickness of t2 (t2>t1), comprises:

a first light source to emit a first light flux having a wavelength of $\lambda 1$;

a second light source to emit a second light flux having a wavelength of $\lambda 2$ ($\lambda 1<\lambda 2$)

a converging optical system to converge the first light flux or the second light flux onto a first information recording surface of the first optical information recording medium or a second information recording surface of the second optical information recording medium, the converging optical system having an objective lens; and an optical detector to receive reflected light from the first optical information recording medium or the second optical information recording medium;

wherein the converging optical system comprises a diffracting section on an entire surface in an effective aperture or an almost entire surface in the effective aperture of at least one surface thereof, the converging optical system generates a m-th order diffracted light ray (m being an integer other than zero) more than other order diffracted light rays when the first light flux passes the diffracting section and converges the m-th order diffracted light ray onto the first information recording surface so as to conduct the reproducing and/or recording information of the first optical information recording medium;

the converging optical system generates a n-th order diffracted light ray (n being an integer other than zero) more than other order diffracted light rays when the second light flux passes the diffracting section and converges the n-th order diffracted light ray onto the second information recording surface so as to conduct the reproducing and/or recording information of the second optical information recording medium; and a spherical aberration has at least one discontinuous portion or at least one substantially discontinuous portion when the converging optical system converges the second light flux onto the second information recording surface so as to conduct reproducing and/or recording the information of the second optical information recording medium.

(1-2) In the optical pickup apparatus of (1-1), the following formula is satisfied:

$$m=n$$

(1-3) In the optical pickup apparatus of (1-1), when an optical path difference function of the diffracting surface is $\phi(h)$ where h is a distance from the optical axis along the direction perpendicular to the optical axis at the surface provided with the diffracting section, $d\phi(h)/dh$ is discontinuous or substantially discontinuous at at least one point, whereby a spherical aberration has at least one discontinuous portion or at least one substantially discontinuous portion when the converging optical system converges the second light flux onto the second information recording surface in order to conduct reproducing and/or recording the information of the second optical information recording medium.

(1-4) In the optical pickup apparatus of (1-3), the diffracting section has plural diffracting ring-shaped bands in which a prescribed ring-shaped band is located at the outermost side among inner ring-shaped bands located on an inside of the point of h where $d\phi(h)/dh$ is discontinuous or substantially discontinuous and a neighbor ring-shaped band neighbors the prescribed ring-shaped band and is located on an outside of the point of h and, and wherein a width of the prescribed ring-shaped band along a direction perpendicular to an optical axis of the surface having the diffracting section is smaller than that of the neighbor ring-shaped band.

(1-5) In the optical pickup apparatus of (1-1), a necessary numerical aperture at an optical information recording medium-side of the converging optical system necessary to conduct recording or reproducing the information of the first optical information recording medium with the first light flux is NA1 and a necessary numerical aperture at an optical information recording medium-side of the converging optical system necessary to conduct recording or reproducing the information of the second optical information recording medium with the second light flux is NA2 (NA1>NA2), and wherein among the second light flux having passed the objective lens, a light flux having passed a portion whose numerical aperture at the optical information recording media-side is not smaller than NA2 and is not larger than NA1 forms a spot on the second information recording surface through the second transparent base plate of the second optical information recording medium, a diameter of the spot is not smaller than w2 and is not larger than w1, and the following conditional formulas are satisfied:

$$10 \ \mu m \leq w2 \leq 50 \ \mu m$$

$$20 \ \mu m \leq w1-w2 \leq 110 \ \mu m$$

(1-6) In the optical pickup apparatus of (1-1), when the diffracting section is provided on an aspheric surface of the objective lens and a length x along an optical axis of the objective lens is x coordinate and a height h perpendicular to the optical axis is h coordinate, dx/dh is discontinuous or substantially discontinuous at at least one point on a basic aspheric surface of the aspheric surface provided with the diffracting section, whereby a spherical aberration has at least one discontinuous portion or at least one substantially discontinuous portion when the converging optical system converges the second light flux onto the second information recording surface in order to conduct reproducing and/or recording the information of the second optical information recording medium.

(1-7) In the optical pickup apparatus of (1-1), the diffracting section is provided on a surface of the objective lens and the objective lens has a stepped portion in an effective aperture.

(1-8) In the optical pickup apparatus of (1-1), a necessary numerical aperture at an optical information recording medium-side of the converging optical system necessary to conduct recording or reproducing the information of the first optical information recording medium with the first light flux is NA1 and a necessary numerical aperture at an optical information recording medium-side of the converging optical system necessary to conduct recording or reproducing the information of the second optical information recording medium with the second light flux is NA2 (NA1>NA2), and wherein among the first light flux having passed the objective lens, when a first light flux having passed a portion of the objective lens whose numerical aperture at the optical information recording media-side is not larger than NA1 passes through the first transparent base plate of the first optical information recording medium, a wave front aberration of the first light flux on the first information recording surface is not larger than $0.07 \ \lambda 1$ rms, and among the second light flux having passed the objective lens, when a second light flux having passed a portion of the objective lens whose numerical aperture at the optical information recording media-side is not larger than NA2 passes through the second transparent base plate of the second optical information recording medium, a wave front aberration of the second light flux on the second information recording surface is not larger than $0.07 \ \lambda 2$ rms.

(1-9) In the optical pickup apparatus of (1-8), among the second light flux having passed the objective lens, when the second light flux having passed a portion the objective lens whose numerical aperture at the optical information recording media-side is not larger than NA2 passes through the second transparent base plate of the second optical information recording medium, a third-order spherical aberration component of the wave front aberration of the second light flux on the second information recording surface shows an over characteristic and an absolute value (WSA2·$\lambda$2 rms) of the third-order spherical aberration component satisfies the following conditional formula:

$$0.02 \ \lambda 2 \ \text{rms} \leq WSA2 \cdot \lambda 2 \ \text{rms} \leq 0.06 \ \lambda 2 \ \text{rms}$$

(1-10) In the optical pickup apparatus of (1-8), among the first light flux having passed the objective lens, when the partial first light flux having passed a portion the objective lens whose numerical aperture at the optical information recording media-side is not larger than NA1 passes through the first transparent base plate of the first optical information recording medium, an absolute value (WSA1·$\lambda$1 rms) of a third-order spherical aberration component of the wave front aberration of the partial first light flux on the first information recording surface satisfies the following conditional formula:

$$WSA1 \cdot \lambda 1 \ \text{rms} \leq 0.04 \ \lambda 1 \ \text{rms}$$

(1-11) In the optical pickup apparatus of (1-1), the spherical aberration has two or more discontinuous portions or two or more substantially discontinuous portions when the converging optical system converges the second light flux onto the second information recording surface in order to conduct reproducing and/or recording the information of the second optical information recording medium.

(1-12) In the optical pickup apparatus of (1-1), the objective lens is a single lens having a positive refracting power.

(1-13) In the optical pickup apparatus of (1-1), the objective lens comprises a first lens having a positive refracting power and a second lens having a positive refracting power.

(1-14) In the optical pickup apparatus of (1-1), the diffracting section comprises plural diffracting ring-shaped bands among which at least one diffracting ring-shaped band satisfies the following conditional formula:

$$1.2 \leq P_{i+1}/P_i \leq 10$$

where $P_i$ is a width of the diffracting ring-shaped band located at i-th place counted from an optical axis of the surface provided with the diffracting section to a periphery of the lens in which the width is along the direction vertical to the optical axis.

(1-15) In the optical pickup apparatus of (1-1), a number m of a ring-shaped band through which a light ray of NA of 0.60 passes satisfies the following conditional formula:

$$22 \leq m \leq 32$$

wherein a number of ring-shaped band located on an optical axis on a surface provided with the diffracting section is 1 and the number m is counted toward the periphery side.

(1-16) In the optical pickup apparatus of (1-1), a necessary numerical aperture at an optical information recording medium-side of the converging optical system necessary to conduct recording or reproducing the information of the first optical information recording medium with the first light flux is NA1 and a necessary numerical aperture at an optical information recording medium-side of the converging optical system necessary to conduct recording or reproducing the information of the second optical information recording medium with the second light flux is NA2 (NA1>NA2), and wherein among the first light flux having passed the objective lens, when a first light flux having passed a portion of the objective lens whose numerical aperture at the optical information recording media-side is not larger than NA1 passes through the second transparent base plate of the second optical information recording medium, a wave front aberration of the first light flux on the first information recording surface is not larger than 0.07 λ1 rms, and among the second light flux having passed the objective lens, when a partial second light flux having passed a portion of the objective lens whose numerical aperture at the optical information recording media-side is not larger than NA2 passes through the second transparent base plate of the second optical information recording medium, a wave front aberration of the partial second light flux on the second information recording surface is not larger than 0.07 λ2 rms, and when another partial second light flux having passed a portion of the objective lens whose numerical aperture at the optical information recording media-side is larger than NA2 passes through the second transparent base plate of the second optical information recording medium, a wave front aberration of the another partial second light flux on the second information recording surface is larger than 0.07 λ2 rms.

(1-17) In the optical pickup apparatus of (1-1), a numerical aperture of NAZ is a predetermined value which satisfies the following conditional formula:

$$0.43 \leq NAZ \leq 0.53, \text{ and}$$

wherein among the second light flux having passed the objective lens, when a partial second light flux having passed a portion of the objective lens whose numerical aperture at the optical information recording media-side is not smaller than NAZ and not larger than 0.7 passes through the second transparent base plate of the second optical information recording medium and when another partial second light flux having passed a portion of the objective lens whose numerical aperture at the optical information recording media-side is smaller than NAZ passes through the second transparent base plate of the second optical information recording medium, an amount of spherical aberration of the partial second light flux is larger by 10 λ2 or more than that of the another partial second light flux.

(1-18) In the optical pickup apparatus of (1-1), the optical detector comprises a light receiving surface arranged at a predetermined position and a numerical aperture of NAZ is a predetermined value which satisfies the following conditional formula:

$$0.43 \leq NAZ \leq 0.53, \text{ and}$$

wherein among the second light flux having passed the objective lens, when a partial second light flux having passed a portion of the objective lens whose numerical aperture at the optical information recording media-side is smaller than NAZ passes through the second transparent base plate of the second optical information recording medium, reflected light of the partial second light flux from the second recording surface proceeds into the light receiving surface of the optical detector and when another partial second light flux having passed a portion of the objective lens whose numerical aperture at the optical information recording media-side is not smaller than NAZ passes through the second transparent base plate of the second optical information recording medium, reflected light of the another partial second light flux from the second recording surface proceeds into a periphery region other than the light receiving surface of the optical detector.

(1-19) In the optical pickup apparatus of (1-1), the optical detector comprises a central light receiving surface and a peripheral light receiving surface arranged at predetermined positions respectively and a numerical aperture of NAZ is a predetermined value which satisfies the following conditional formula:

$$0.43 \leq NAZ \leq 0.53, \text{ and}$$

wherein among the second light flux having passed the objective lens, when a partial second light flux having passed a portion of the objective lens whose numerical aperture at the optical information recording media-side is not smaller than NAZ passes through the second transparent base plate of the second optical information recording medium, reflected light of the another partial second light flux from the second recording surface proceeds into the peripheral light receiving surface of the optical detector other than the central light receiving surface or a periphery region other than the periphery light receiving surface.

(1-20) In the optical pickup apparatus of (1-1), the diffracting section comprises a first diffracting section and a second diffracting section and an order number of a strongest diffracted light ray generated by the first diffracting section for a light flux having a predetermined wavelength and an order number of a strongest diffracted light ray generated by the second diffracting section for the light flux having the predetermined wavelength are different from each other and not zero respectively.

(1-21) In the optical pickup apparatus of (1-1), the diffracting section comprises a first diffracting section and a second diffracting section and an order number of a strongest diffracted light ray generated by the first diffracting section for a light flux having a predetermined wavelength and an order number of a strongest diffracted light ray generated by the second diffracting section for the light flux having the predetermined wavelength are same to each other and not zero respectively.

(1-22) An objective lens for use in an optical pickup apparatus to conduct reproducing and/or recording information of an optical information recording medium having a transparent base plate, comprises:

at least one surface;

wherein a diffracting section is provided on an entire surface of an effective aperture of the surface or an almost entire surface of the effective aperture of the surface, wherein when a light flux having a predetermined wavelength. passes the diffracting section, the objective lens generate a m-th order diffracted light ray (m being an integer other than zero) more than other order light rays and when the m-th order diffracted light ray is converged through a transparent base plate having a predetermined thickness, a spherical aberration has at least one discontinuous portion or at least one substantially discontinuous portion.

(1-23) In the objective lens of (1-21), the optical pickup apparatus conducts reproducing and/or recording information of a first optical information recording medium including a first transparent base plate having a thickness of t1 and a second optical information recording medium including a second transparent base plate having a thickness of t2 (t2>t1), when a first light flux having a wavelength of $\lambda 1$ passes the diffracting section, the objective lens generates the m-th order diffracted light ray (m being an integer other than zero) more than other order diffracted light rays and converges the m-th order diffracted light rays onto a first information recording surface so that the optical pickup apparatus conducts the reproducing and/or recording information of the first optical information recording medium;

when a second light flux having a wavelength of $\lambda 2$ ($\lambda 1<\lambda 2$) passes the diffracting section, the objective lens generates the n-th order diffracted light ray (n being an integer other than zero) more than other order diffracted light rays and converges the n-th order diffracted light rays onto a second information recording surface so that the optical pickup apparatus conducts the reproducing and/or recording information of the second optical information recording medium; and when the objective lens converges the second light flux onto the second information recording surface, a spherical aberration has at least one discontinuous portion or at least one substantially discontinuous portion.

(1-24) In the objective lens of (1-23), the following formula is satisfied:

$$m=n$$

(1-25) In the objective lens of (1-23), when an optical path difference function of the diffracting surface is $\phi(h)$ where h is a distance from the optical axis, $d\phi(h)/dh$ is discontinuous or substantially discontinuous at at least one point, whereby a spherical aberration has at least one discontinuous portion or at least one substantially discontinuous portion when the converging optical system converges the second light flux onto the second information recording surface in order to conduct reproducing and/or recording the information of the second optical information recording medium.

(1-26) In the objective lens of (1-25), the diffracting section has plural diffracting ring-shaped bands in which a prescribed ring-shaped band is located at the outermost side among inner ring-shaped bands located on an inside of the point of h where $d\phi(h)/dh$ is discontinuous or substantially discontinuous and a neighbor ring-shaped band neighbors the prescribed ring-shaped band and is located on an outside of the point of h and, and wherein a width of the prescribed ring-shaped band along a direction perpendicular to an optical axis of the surface having the diffracting section is smaller than that of the neighbor ring-shaped band.

(1-27) In the objective lens of (1-23), when the objective lens has an aspheric surface and a length x along an optical axis of the objective lens is x coordinate and a height h perpendicular to the optical axis is h coordinate, dx/dh is discontinuous or substantially discontinuous at at least one point on a basic aspheric surface of the aspheric surface.

(1-28) In the objective lens of (1-23), the objective lens has a stepped portion in an effective aperture.

(1-29) In the objective lens of (1-23), when the objective lens converges the second light flux onto the second information recording surface in order to conduct reproducing and/or recording the information of the second optical information recording medium, a spherical aberration has at least two discontinuous portion or at least two substantially discontinuous portion.

(1-30) In the objective lens of (1-22), the objective lens is a single lens having a positive refracting power.

(1-31) In the objective lens of (1-22), the objective lens comprises a first lens having a positive refracting power and a second lens having a positive refracting power.

(1-32) In the objective lens of (1-22), the diffracting section comprises plural diffracting ring-shaped bands among which at least one diffracting ring-shaped band satisfies the following conditional formula:

$$1.2 \leq P_{i+1}/P_i \leq 10$$

where $P_i$ is a width of the diffracting ring-shaped band located at i-th place counted from an optical axis of the surface provided with the diffracting section to a periphery of the lens in which the width is along the direction perpendicular to the optical axis.

(1-33) In the objective lens of (1-21), a number m of a ring-shaped band through which a light ray of NA of 0.60 passes satisfies the following conditional formula:

$$22 \leq m \leq 32$$

wherein a number of ring-shaped band located on an optical axis on a surface provided with the diffracting section is 1 and the number m is counted toward the periphery side.

(1-34) In the objective lens of (1-22), the diffracting section comprises a first diffracting section and a second diffracting section and an order number of a strongest diffracted light ray generated by the first diffracting section and an order number of a strongest diffracted light ray generated by the second diffracting section for a light flux having a predetermined wavelength are different from each other and not zero respectively.

(1-35) In the objective lens of (1-22), the diffracting section comprises a first diffracting section and a second diffracting section and an order number of a strongest diffracted light ray generated by the first diffracting section and an order number of a strongest diffracted light ray generated by the second diffracting section for a light flux having a predetermined wavelength are same to each other and not zero respectively.

(1-36) An optical information reproducing and/or recording apparatus to conduct reproducing and/or recording information of a first optical information recording medium. including a first transparent base plate having a thickness of t1 and a second optical information recording medium including a second transparent base plate having a thickness of t2 (t2>t1), comprises:

an optical pickup apparatus comprising:
a first light source to emit a first light flux having a wavelength of $\lambda 1$;
a second light source to emit a second light flux having a wavelength of $\lambda 2$ ($\lambda 1<\lambda 2$);
a converging optical system to converge the first light or the second light flux onto a first information recording surface of the first optical information recording medium or a second information recording surface of the second optical information recording medium, the converging optical system having an objective lens; and an optical detector to receive reflected light from the first optical information recording medium or the second optical information recording medium;

wherein the converging optical system comprises a diffracting section on an entire surface in an effective aperture or an almost entire surface in the effective aperture of at least one surface thereof, the converging optical system generates a m-th order diffracted light ray (m being an integer other than zero) more than other order diffracted light rays when the first light flux passes the diffracting section and converges the m-th diffracted light ray onto the first information recording surface so as to conduct the reproducing and/or recording information of the first optical information recording medium;

the converging optical system generates a n-th order diffracted light ray (n being an integer other than zero) more than other order diffracted light rays when the second light flux passes the diffracting section and converges the n-th diffracted light ray onto the second information recording surface so as to conduct the reproducing and/or recording information of the second optical information recording medium; and a spherical aberration has at least one discontinuous portion or at least one substantially discontinuous portion when the converging optical system converges the second light flux onto the second information recording surface so as to conduct reproducing and/or recording the information of the second optical information recording medium.

Further, above objects can be also attained by the following preferable structures.

(2-1) In an optical element usable in an optical pickup apparatus, at least one surface being a diffracting surface, wherein when an optical path difference function of the diffracting surface is $\phi(h)$ where h is a distance from the optical axis, the optical path difference function is a discontinuous function in which $d\phi(h)/dh$ is discontinuous or substantially discontinuous at a point where h is a predetermined distance.

(2-2) In the optical element described in (2-1), the width in the perpendicular direction to the optical axis in the most outside ring-shaped band in the ring-shaped bands formed inside the predetermined length h of the optical element is not larger than the width in the perpendicular direction to the optical axis in the ring-shaped band which adjoins the most outside ring-shaped band and is formed outside the predetermined length h.

(2-3) In the optical element described in (2-1) or (2-2), when the light is irradiated from the light source with the wavelength $\lambda 2$ located at a predetermined object distance onto the optical information recording medium having the transparent thickness t2 through the optical element, in the numerical aperture NA not larger than the predetermined distance h, the wave-front aberration is not larger than 0.07 $\lambda 2$ rms, and the spherical aberration of the light rays passing through the inside of the predetermined distance h is not larger than the spherical aberration of the light rays passing through the outside of the predetermined distance h by 10 $\lambda 2$–100 $\lambda 2$.

(2-4) In the optical element described in one of (2-1) to (2-3), at least one surface of the optical element is the diffraction surface having the diffracting ring-shaped band, and the i-th diffracting ring-shaped band of the at least one diffraction surface, counted from the optical axis toward the peripheral direction, satisfies the following conditional expression:

$$1.2 \leq P_{i+1}/P_i \leq 10 \quad (2)$$

where, $P_i$: the width in the direction perpendicular to the optical axis of the i-th diffracting ring-shaped band counted from the optical axis toward the peripheral direction.

(2-5) In an optical element usable in an optical pickup apparatus, at least one surface of the optical element is the diffraction surface having the diffracting ring-shaped band, and the i-th diffracting ring-shaped band of the at least one -diffraction surface, counted from the optical axis toward the peripheral direction, satisfies the following conditional expression:

$$1.2 \leq P_{i+1}/P_i \leq 10 \quad (2)$$

where, $P_i$: the width in the direction perpendicular to the optical axis of the i-th diffracting ring-shaped band counted from the optical axis toward the peripheral direction.

(2-6) In the optical element applicable for the optical pick-up apparatus, the number m of the diffracting ring-shaped band of the diffraction surface through which the light rays of NA 0.60 pass, satisfies $$22 \leq m \leq 32,$$

where, the number of the diffracting ring-shaped band of the ring-shaped band on the optical axis is 1, and the number of the diffracting ring-shaped band is counted toward the outside.

(2-7) In the optical element applicable for the optical pick-up apparatus, at least one surface is a diffraction surface having the diffracting ring-shaped band, and the number m of the diffracting ring-shaped band of the diffraction surface through which the light rays of NA 0.60 pass, satisfies $$22 \leq m \leq 32,$$

where, the number of the diffracting ring-shaped band of the ring-shaped band on the optical axis is 1, and the number of the diffracting ring-shaped band is counted toward the outside.

(2-8) In the optical element described in (2-6) or (2-7), light rays of the optical element are almost parallel light flux within the range of the wavelength 630–665 nm, and entered into the optical element.

(2-9) In the optical element described in (2-1) or (2-8), the optical element is the objective lens.

(2-10) In an objective lens applicable for the optical pick-up apparatus having the converging optical system including the objective lens for converging the light flux from the light sources having the different wavelengths, and the light receiving means for detecting the reflected light from the recording surface, which can record or reproduce the information for at least two of the first and the second optical information recording medium whose transparent thickness is different from each other, when two wavelengths different from each other are $\lambda 1$ and $\lambda 2$ ($\lambda 1 < \lambda 2$), and the thickness of the transparent substrates of two optical information recording media different from each other are t1 and t2 (t1<t2), and when the necessary numerical aperture on the image side necessary for recording or reproducing the optical information recording medium with the thickness t1 of the transparent substrate by the light flux of the wavelength λ1 is NA1, and the necessary numerical aperture on the image side necessary for recording or reproducing the optical information recording medium with the thickness t2 of the transparent substrate by the light flux of the wavelength λ2 is NA2 (NA1≧NA2), the wave front aberration is not larger than 0.07 λ1 rms for the combination of the wavelength λ1, thickness t1 of the transparent substrate, and necessary numerical aperture NA1, and the wave front aberration is not larger than 0.07 λ2 rms for the combination of the wavelength λ2, thickness t2 of the transparent substrate, and necessary numerical aperture NA2, and the light flux not smaller than the necessary numerical aperture NA2 is made a flare, for the combination of the wavelength λ2, and thickness t2 of the transparent substrate.

(2-11) In the objective lens described in (2-10), when the light is irradiated from the light source with the wavelength λ2 at a predetermined object distance onto the optical information recording medium with the transparent substrate thickness t2 through the objective lens, the light flux of the numerical aperture not smaller than NA2 and not larger than NA1, is distributed in the range of not smaller than the diameter w2 and not larger than the diameter w1, and satisfies the following conditional expressions:

$$10 \ \mu m \leq w2 \leq 50 \ \mu m \quad (3)$$

$$20 \ \mu m \leq w1-w2 \leq 110 \ \mu m \quad (4)$$

(2-12) In the objective lens described in (2-10) or (2-11), at least one surface of the objective lens is the diffraction surface having the diffracting ring-shaped band, and when the optical path difference function of the diffraction surface is (h is the distance from the optical axis), $\phi(h)/dh$ at a portion of the predetermined distance h is a discontinuous or practically discontinuous function.

(2-13) In the objective lens described in (2-12), the width in the perpendicular direction to the optical axis in the most outside ring-shaped band in the ring-shaped bands formed inside the predetermined distance h of the objective lens is not larger than the width in the perpendicular direction to the optical axis in the ring-shaped band which adjoins the most outside ring-shaped band and is formed outside the predetermined distance h.

(2-14) In the objective lens described in (2-12) or (2-13), when the light is irradiated from the light source of the wavelength λ2 located at a predetermined object distance onto the optical information recording medium with the transparent substrate thickness t2 through the objective lens, in the numerical aperture NA not larger than the predetermined distance h, the spherical aberration is not larger than 0.07 λ2 rms, and the spherical aberration of the light rays passing though the inside of the predetermined distance h is not larger than the spherical aberration of the light rays passing through the outside of the predetermined distance h by 10 λ2–100 λ2.

(2-15) In the objective lens described in one of (2-10) or (2-14), at least one surface of the objective lens is the diffraction surface having the diffracting ring-shaped band, and the i-th diffracting ring-shaped band counted from the optical axis toward the peripheral direction, of the at least one diffraction surface, satisfies the following conditional expression:

$$1.2 \leq P_{i+1}/P_i \leq 10,$$

where, P: the width in the perpendicular direction to the optical axis of the i-th diffracting ring-shaped band, counted from the optical axis toward the peripheral direction.

(2-16) In the objective lens described in one of (2-10) or (2-15), the number m of the diffracting ring-shaped band of the diffraction surface through which the light ray of NA 0.60 of the objective lens passes, satisfies $22 \leq m \leq 32$.

(2-17) In the objective lens described in one of (2-10) or (2-16), because the wavelength λ1 is within the range of 630–665 nm, preferably 635 nm or 650 nm, the wavelength λ2 is within 750–810 nm, preferably 780 nm, the thickness t1 is 0.6 mm, and the thickness t2 is 1.2 mm, the objective lens is appropriate for the optical pick-up apparatus which can record and/or reproduce the information for both of the DVD and CD.

(2-18) In the objective lens described in one of (2-10) or (2-17), because the first optical information recording medium is DVD and the second optical information recording medium is CD, the objective lens appropriate for the optical pick-up apparatus which can record and/or reproduce the information for both of the DVD and CD, can be provided.

(2-19) In an optical pick-up apparatus having the converging optical system including the objective lens for converging the light flux from the light sources having the different wavelengths, and the light receiving means for detecting the reflected light from the recording surface, which can record or reproduce the information for at least two of the first and the second optical information recording media whose transparent thickness is different from each other, when two wavelengths different from each other are λ1 and λ2 (λ1<λ2), and the thickness of the transparent substrates of two optical information recording media different from each other are t1 and t2 (t1<t2), and when the necessary numerical aperture on the image side necessary for recording or reproducing the optical information recording medium with the thickness t1 of the transparent substrate by the light flux of the wavelength λ1 is NA1, and the necessary numerical aperture on the image side necessary for recording or reproducing the optical information recording medium with the thickness t2 of the transparent substrate by the light flux of the wavelength λ2 is NA2 (NA1≧NA2), the wave. front aberration is not larger than 0.07 λ1 rms for the combination of the wavelength λ1, thickness t1 of the transparent substrate, and necessary numerical aperture NA1, and the wave front aberration is not larger than 0.07 λ2 rms for the combination of the wavelength λ2, thickness t2 of the transparent substrate, and necessary numerical aperture NA2, and the light flux not smaller than the necessary numerical aperture NA2 is made a flare, for the combination of the wavelength λ2 and the thickness t2 of the transparent substrate.

(2-20) In the optical pickup apparatus described in (2-19), when the light is irradiated from the light source with the wavelength λ2 located at a predetermined object distance onto the optical information recording medium with the transparent substrate thickness t2 through the objective lens, the light flux of not smaller than numerical aperture NA2 and not larger than NA1 distributes in the range of not smaller than the diameter w2 and not larger than w1, and satisfies the following conditional expressions:

$$10 \ \mu m \leq w2 \leq 50 \ \mu m$$

$$20 \ \mu m \leq w1-w2 \leq 110 \ \mu m$$

(2-21) In the optical pickup apparatus described in (2-19) or (2-20), at least one surface of the objective lens of the optical pick-up apparatus is the diffraction surface having the diffracting ring-shaped band, and when the optical path difference function of the diffraction surface is $\phi(h)$(h is the distance from the optical axis), $\phi(h)/dh$ is the discontinuous or practically discontinuous function at a portion of a predetermined distance h.

(2-22) In the optical pickup apparatus described in (2-21), in the diffracting ring-shaped band of at least one surface of the objective lens of the optical pick-up apparatus, the width in the perpendicular direction to the optical axis in the most outside ring-shaped band in the ring-shaped bands formed inside the predetermined distance h is not larger than the width in the perpendicular direction to the optical axis in the ring-shaped band which adjoins the most outside ring-shaped band and is formed outside the predetermined distance h.

(2-23) In the optical pickup apparatus described in (2-21) or (2-22), when the light is irradiated from the light source of the wavelength $\lambda 2$ located at a predetermined object distance onto the optical information recording medium with the transparent substrate thickness t2 through the objective lens of the optical pick-up apparatus, in the numerical aperture NA not larger than the predetermined distance h, the spherical aberration is not larger than 0.07 $\lambda 2$ rms, and the spherical aberration of the light rays passing though the inside of the predetermined distance h is not larger than the spherical aberration of the light rays passing through the outside of the predetermined distance h by 10 $\lambda 2$–100$\lambda 2$.

(2-24) In the optical pickup apparatus described in one of (2-19) to (2-23), at least one surface of the objective lens is the diffraction surface having the diffracting ring-shaped band, and the i-th diffracting ring-shaped band counted from the optical axis toward the peripheral direction, of the at least one diffraction surface, satisfies the following conditional expression:

$$1.2 \leq P_{i+1}/P_i \leq 10$$

where, P: the width in the perpendicular direction to the optical axis of the i-th diffracting ring-shaped band, counted from the optical axis toward the peripheral direction.

(2-25) In the optical pickup apparatus described in one of (2-19) to (2-24), the number m of the diffracting ring-shaped band of the diffraction surface through which the light ray of NA 0.60 passes, satisfies $22 \leq m \leq 3$.

(2-26) In the optical pickup apparatus described in one of (2-19) to (2-25), the object point of the objective lens for the combination of the wavelength $\lambda 1$ and the thickness t1 of the transparent substrate, is at an optically equal distance to the object point of the objective lens for the combination of the wavelength $\lambda 2$ and the thickness t2 of the transparent substrate.

(2-27) In the optical pickup apparatus described in one of (2-19) to (2-26), the wavelength $\lambda 1$ is within the range of 630–665 nm, preferably 635 nm or 650 nm, the wavelength $\lambda 2$ is within 750–810 nm, preferably 780 nm, the thickness t1 is 0.6 mm, and the thickness t2 is 1.2 mm.

(2-28) In the optical pickup apparatus described in one of (2-19) to (2-28), the first optical information recording medium is DVD and the second optical information recording medium is CD.

(2-29) In an objective lens applicable for the optical pick-up apparatus, at lest one surface is the diffraction surface having the diffracting ring-shaped band, and the spherical aberration when the light flux of the wavelength $\lambda 2$ in the range of the numerical aperture NA of 0.5–0.7 passes through the objective lens is not smaller than the spherical aberration when the light flux of the wavelength $\lambda 2$ in the numerical aperture NA not larger than 0.5 passes through the objective lens by 10 $\lambda 2$–100 $\lambda 2$.

(2-30) In an optical pick-up apparatus having a light source to record and/or reproduce the information on the information recording surface of the optical information recording medium by irradiating the light with different wavelengths corresponding to 2 optical information recording media whose thickness of transparent substrates is different from each other, and an objective lens through which the light from the light source respectively passes, and which outputs the light to the optical information recording medium, at lest one surface of the objective lens is the diffraction surface having the diffracting ring-shaped band, and the spherical aberration when the light flux of a predetermined wavelength $\lambda 2$ in the range of the numerical. aperture NA of 0.5–0.7 passes through the objective lens is not smaller than the spherical aberration when the light flux of the predetermined wavelength $\lambda 2$ in the numerical aperture NA not larger than 0.5 passes through the objective lens by more than 10 $\lambda 2$–100 $\lambda 2$.

(2-31) In an objective lens applicable for the optical pick-up apparatus which has the light source with the wavelength $\lambda$, the converging optical system including the objective lens for converging the light flux from the light source onto the recording surface of the optical information recording medium, and the light receiving means having the light receiving surface for detecting the reflected light from the recording surface, and can record or reproduce the information for the optical information recording medium, the objective lens has the diffraction surface on at least one surface, and when the light flux of the wavelength $\lambda$ of the numerical aperture NA of not larger than 0.5 passes, the light flux reflected from the optical information recording medium is irradiated to the light receiving means so that the light flux is included in the light receiving surface of the light receiving means, and when the light flux of the wavelength $\lambda$ of the numerical aperture NA of not smaller than 0.5 passes, the light flux reflected from the optical information recording medium is irradiated onto the surrounding except the light receiving surface of the light receiving means.

(2-32) In the objective lens applicable for the optical pick-up apparatus described in (2-31), the light receiving means has one to three almost rectangular light receiving surfaces and the spot diameter on the optical information recording surface of the light flux not smaller than the numerical aperture NA of 0.5 is not smaller than 5 $\mu$m.

(2-33) In the objective lens applicable for the optical pick-up apparatus described in (2-31), the light receiving means has 3 rectangular light receiving surfaces aligned almost on a straight line and the spot diameter on the optical information recording surface of the light flux not smaller than the numerical aperture NA of 0.5 is not smaller than 25 $\mu$m.

(2-34) In an objective lens applicable for the optical pick-up apparatus which has the light source with the wavelength $\lambda$, the converging optical system including the objective lens for converging the light flux from the light source onto the recording surface of the optical information recording medium, and the light receiving means having the central light receiving surface and the peripheral light receiving surface for detecting the reflected light from the recording surface, and can record or reproduce the information for the optical information recording medium, the objective lens has the diffraction surface on at least one surface, and when the light flux of the wavelength $\lambda$ of the numerical aperture NA of not smaller than 0.5 passes, the light flux reflected from the optical information recording medium is irradiated to the light receiving means so that the light flux includes only the peripheral light receiving surface.

(2-35) In the objective lens applicable for the optical pick-up apparatus described in (2-34), the light receiving means has at least 2 stripe-like light receiving surfaces and the spot diameter on the optical information recording surface of the light flux not smaller than the numerical aperture NA of 0.5 is not smaller than 20 μm.

(2-36) In the objective lens applicable for the optical pick-up apparatus described in (2-34), the light receiving means has at least 4 stripe-like light receiving surfaces, and the spot diameter on the optical information recording surface of the light flux not smaller than the numerical aperture NA of 0.5 is not smaller than 50 μm.

(2-37) In an optical pick-up apparatus which has the light source with the wavelength λ, the converging optical system including the objective lens for converging the light flux from the light source onto the recording surface of the optical information recording medium, and the light receiving means having the light receiving surface for detecting the reflected light from the recording surface, and can record or reproduce the information for the optical information recording medium, the objective lens has the diffraction surface on at least one surface, and when the light flux of the wavelength λ of the numerical aperture NA of not larger than 0.5 passes, the light flux reflected from the optical information recording medium is irradiated to the light receiving means so that the light flux is included in the light receiving surface of the light receiving means, and when the light flux of the wavelength λ of the numerical aperture NA of not smaller than 0.5 passes, the light flux reflected from the optical information recording medium is irradiated to the surrounding except the light receiving surface of the light receiving means.

(2-38) In the optical pick-up apparatus described in (2-37), the light receiving means has 1 to 3 almost rectangular light receiving surfaces and the spot diameter on the optical information recording surface of the light flux not smaller than the numerical aperture NA of 0.5 is not smaller than 5 μm.

(2-39) In the optical pick-up apparatus described in (2-37), the light receiving means has 3 rectangular light receiving surfaces aligned almost on a straight line and the spot diameter on the optical information recording surface of the light flux not smaller than the numerical aperture NA of 0.5 is not smaller than 25 μm.

(2-40) In an optical pick-up apparatus which has the light source with the wavelength λ, the converging optical system including the objective lens for converging the light flux from the light source onto the recording surface of the optical information recording medium, and the light receiving means having the central light receiving surface and the peripheral light receiving surface for detecting the reflected light from the recording surface, and can record or reproduce the information for the optical information recording medium, the objective lens has the diffraction surface on at least one surface, and when the light flux of the wavelength λ of the numerical aperture NA of not smaller than 0.5 passes, the light flux reflected from the optical information recording medium is irradiated to the light receiving means so that the light flux includes only the peripheral light receiving surface.

(2-41) In the optical pick-up apparatus described in (2-40), the light receiving means has at least 2 stripe-like light receiving surfaces and the spot diameter on the optical information recording surface of the light flux not smaller than the numerical aperture NA of 0.5 is not smaller than 20 μm.

(2-42) In the optical pick-up apparatus described in (2-40), the light receiving means has at least 4 stripe-like light receiving surfaces and the spot diameter on the optical information recording surface of the light flux not smaller than the numerical aperture NA of 0.5 is not smaller than 50 μm.

(3-1) An optical pick-up apparatus is structured such that the light flux from the light source is converged onto the information recording surface by the converging optical system including the objective lens through the transparent substrate of the optical information recording medium, and recording or reproducing of the information is conducted, and the optical pick-up apparatus conducts recording or reproducing of the information of at least 2 kinds of optical information recording media in which the thickness of the transparent substrate and recording density are different; and in the optical pick-up apparatus which has the first light source with the wavelength $\lambda 1$ (nm), the second light source with the wavelength $\lambda 2$ (nm) ($\lambda 2 > \lambda 1$), and a light detector which receives the reflected light from the optical information recording medium of the emitted light flux from the first light source and the second light source, and in which the necessary numerical aperture on the optical information recording medium side of the converging optical system necessary for recording or reproducing the first optical information recording medium whose transparent substrate thickness is t1 by the wavelength $\lambda 1$, is NA1, and the necessary numerical aperture on the optical information recording medium side of the converging optical system necessary for recording or reproducing the second optical information recording medium whose transparent substrate thickness is t2 (herein, t2>t1) by the wavelength $\lambda 2$, is NA2 (herein, NA2<NA1), and when the diffraction pattern is provided on at least one surface of the converging optical system, and m-degree diffraction light (m is an integer) from the diffraction pattern of the converging optical system of the light flux from the first light source is at least used, the first optical information recording medium whose transparent substrate thickness is t1 is recorded and/or reproduced, and when n-degree diffraction light (n is an integer, and n=m=0 is excepted)) from the diffraction pattern of the converging optical system of the light flux from the second light source is at least used, the second optical information recording medium whose transparent substrate thickness is t2 (t2>t1) is recorded and/or reproduced, in the light flux from the second light source passed through the objective lens, the tertiary spherical aberration component of the wave front aberration when the light flux of a portion in which the numerical aperture is lower than NA2, on the optical information recording medium side, passes through the transparent substrate of the second optical information recording medium, is excessive, and when the absolute value is WSA2 $\lambda 2$ rms, then, $$0.02\ \lambda 2\ \mathrm{rms} \leq WSA2 \leq 0.06\ \lambda 2\ \mathrm{rms}.$$

(3-2) In the optical pickup apparatus described in (3-1), m is an integer excluding 0 and n=m.

(3-3) In the optical pickup apparatus described in (3-1) or (3-2), the objective lens is a single lens and the diffraction pattern is provided on the single lens.

(3-4) In the optical pickup apparatus described in (3-1), (3-2) or (3-3), when the. image formation magnification viewed from the optical information recording medium side of the objective lens at the time of recording or reproducing of the information of the first optical information recording medium is M1 and the image formation magnification viewed from the optical information recording medium side of the objective lens at the time of recording or reproducing of the information of the second optical information recording medium is M2, M2 and M1 is nearly equal.

(3-5) In the optical pickup apparatus described in (3-4), M1 and M2 are nearly 0.

(3-6) In the optical pickup apparatus described in one of (3-1) to (3-5), the position onto which the light ray most apart from the optical axis in the light flux from the second light source passed the objective lens, is converged through the transparent substrate of the second optical information recording medium, is far from the objective lens, and farther than the position at which, in the light flux from the second light source passed the objective lens, the wave front aberration is minimum, when the light flux of a portion in which the numerical aperture on the optical information recording medium side is smaller than NA2, passes through the transparent substrate of the second optical information recording medium, and its difference is not smaller than 5 $\mu$m. When the difference is not smaller than 5 $\mu$m.

(3-7) In the optical pickup apparatus described in one of (3-1) to (3-5), the position onto which the light ray most apart from the optical axis in the light flux from the second light source passed the objective lens, is converged through the transparent substrate of the second optical information recording medium, is, far from the objective lens, and farther than the position at which, in the light flux from the second light source passed through the objective lens, the wave front aberration is minimum, when the light flux of a portion in which the numerical aperture on the optical information recording medium side is smaller than NA2, passes through the transparent substrate of the second optical information recording medium, and its difference is not smaller than 15 $\mu$m.

(3-8) An optical pick-up apparatus is structured such that the light flux from the light source is converged onto the information recording surface by the converging optical system including the objective lens through the transparent substrate of the optical information recording medium, and recording or reproducing of the information is conducted, and the optical pick-up apparatus conducts recording or reproducing the information of at least 2 kinds of optical information recording media in which the thickness of the transparent substrates and recording density are different and in the optical pick-up apparatus which has the first light source with the wavelength $\lambda 1$ (nm), the second light source with the wavelength $\lambda 2$ (nm) ($\lambda 2 > \lambda 1$), and a light detector which receives the reflected light from the optical information recording medium of the emitted light flux from the first light source and the second light source, and the necessary numerical aperture on the optical information recording medium side of the converging optical system necessary for recording or reproducing the first optical information recording medium whose transparent substrate thickness is t1, by the wavelength $\lambda 1$, is NA1, and the necessary numerical aperture on the optical information recording medium side of the converging optical system necessary for recording or reproducing the second optical information recording medium whose transparent substrate thickness is t2 (herein, t2>t1) by the wavelength $\lambda 2$, is NA2 (herein, NA2<NA1), and when the almost ring-shaped band-like diffraction pattern is provided on at least one surface of the objective lens of the converging optical system, and m-degree diffraction light (m is an integer) from the diffraction pattern of the converging optical system of the light flux from the first light source is at least used, the first optical information recording medium whose transparent substrate thickness is t1 is recorded and/or reproduced, and when n-degree diffraction light (n is an integer, and n=m=0 is excepted)) from the diffraction pattern of the converging optical system of the light flux from the second light source is at least used, the second optical information recording medium whose transparent substrate thickness is t2 (t2>t1) is recorded and/or reproduced, when the numerical aperture on the optical information recording medium side of the light ray passing the peripheral edge of the almost ting band-like diffraction pattern including the optical axis is NAX, then, $0.2 \leq NAX/NA2 \leq 0.9$.

(3-9) In the optical pickup apparatus described in (3-8), m is an integer excluding 0 and n=m.

(3-10) In the optical pickup apparatus described in (3-8) or (3-9), the objective lens is a single lens.

(3-11) In the optical pickup apparatus described in (3-8), (3-8) or (3-10), when the image formation magnification viewed from the optical information recording medium side of the objective lens at the time of recording or reproducing of the information of the first optical information recording medium is M1 and the image formation magnification viewed from the optical information recording medium side of the objective lens at the time of recording or reproducing of the information of the second optical information recording medium is M2, M2 and M1 is nearly equal.

(3-12) In the optical pickup apparatus described in (3-11), M1 and M2 are nearly 0.

(3-13) In the optical pickup apparatus described in one of (3-8) to (3-12), the number of ring-shaped bands is 7 to 30.

(3-14) In the optical pickup apparatus described in (3-1), (3-2), (3-8) or (3-9), the light flux incident on the information recording surface is divided into at least 3 light flux of the first light flux in the vicinity of the optical axis, the second light flux outside the first light flux, and the third light flux outside the second light flux, and the second light flux is caused not to reach the vicinity of the information recording surface, by the shielding means, and in the m-degree diffraction light from the diffraction pattern of the converging optical system of the light flux from the first light source, the first light flux and the third light flux mainly form the beam spot, and records and/or reproduces the first optical information recording medium, and in the n-degree diffraction light from the diffraction pattern of the converging optical system of the light flux from the second light source, the first light flux mainly forms the beam spot, and records and/or reproduces the second optical information recording medium.

(3-15) In the optical pickup apparatus described in (3-14), the objective lens is single lens and the diffraction pattern is provided on the single lens.

(3-16) In the optical pickup apparatus described in (3-14) or (3-15), the objective lens is single lens and the shielding means is provided on the single lens.

(3-17) In the optical pickup apparatus described in (3-1), (3-2), (3-8) or (3-9), the light flux incident on the information recording surface is divided into at least 3 light flux of the first light flux in the vicinity of the optical axis, the second light flux outside the first light flux, and the third light flux outside the second light flux, and the beam spot is formed and the first optical information recording medium is recorded and/or reproduced, when the first light flux and the third light flux in the light flux from the first light source at least utilize the m-degree diffraction light from the diffraction pattern of the converging optical system, and the beam spot is formed and the second optical information recording medium is recorded and/or reproduced, when the first light flux and the third light flux at least utilize the n-degree diffraction light from the diffraction pattern of the converging optical system of the first light flux of the light flux from the second light source, and the second light flux.

(3-18) In the optical pickup apparatus described in (3-17), the convergent position of a most apart portion from the optical axis in the first light flux of the light flux from the second light source is different from the convergent position of the second light flux.

(3-19) In the optical pickup apparatus described in (3-17), the objective lens is a single lens and the diffraction pattern is provided on the single lens.

(3-20) In the optical pickup apparatus described in (3-17), (3-18) or (3-19), the second light flux is diffracted by the diffraction pattern.

(3-21) In the optical pickup apparatus described in (3-17), (3-18) or (3-19), the second light flux passes through a portion having no diffraction pattern.

(3-22) In the optical pickup apparatus described in (3-1), (3-2), (3-8) or (3-9), in the light flux from the second light source, the light flux in which the numerical aperture on the optical information recording medium side is more than NA3 (NA2≦NA3<NA1), is made not to reach in the vicinity of the information recording surface by the shielding means.

(3-23) In the optical pickup apparatus described in (3-22), the shielding means is preferably a ring-shaped band dichroic filter through which the light flux with the wavelength λ1 passes and on which the light flux with the wavelength λ2 is reflected.

(3-24) In the optical pickup apparatus described in one of (3-1) to (3-23), by the light flux of a portion in which the numerical aperture on the optical information recording medium side, in the n-degree diffraction light from the diffraction pattern of the converging optical system of the light flux from the second source is smaller than almost NA2, the beam spot is formed, and the second optical information recording medium is recorded and/or reproduced, and a portion in which the numerical aperture is larger than almost NA2 is the flare light.

(3-25) In the optical pickup apparatus described in one of (3-1) to (3-24), the first light source and the second light source are formed into a unit, and the light detector is common to the first light source and the second light source.

(3-26) An objective lens for use in an optical pick-up apparatus to conduct the recording or reproducing of the information for the optical information recording medium, has the diffraction pattern at least on one surface, and when the parallel light flux of the wavelength 780 nm are incident on the surface, the tertiary spherical aberration component of the wave front aberration when a portion in which the numerical aperture on the optical information recording medium side, is smaller than 0.45, in the light flux passed through the objective lens, passes through the transparent substrate of the thickness 1.2 mm, and the refractive index 1.57, is excessive, and the absolute value is WSA2 λ2 rms, and in the case where the parallel light flux of the wavelength 650 nm are incident on the surface, when the absolute value of the tertiary spherical aberration component of the wave front aberration when a portion in which the numerical aperture on the optical information recording medium side is smaller than 0.6, in the light flux passed through the objective lens, passes through the transparent substrate of the thickness 0.6 mm and the referactive index 1.58, is WSA1 λ1 rms, the following conditional expressions are satisfied:

0.02 λ2 rms ≦ WSA2 ≦ 0.06 λ2 rms, and

WSA1 ≦ 0.04 λ1 rms.

(3-27) An objective lens for use in an optical pickup apparatus described has almost ring-shaped band-like diffraction pattern on the whole surface of the effective diameter of at least one surface, and when the height from the optical axis of the peripheral edge of the almost ring-shaped band-like diffraction pattern including the optical axis is HX, and the height of the most outer peripheral ring-shaped band is HMAX, the following conditional expression is satisfied:

0.15 ≦ HX/HMAX ≦ 0.65

(3-28) In the objective lens for use in an optical pickup apparatus described in (3-27), the objective lens is a single lens.

(3-29) An objective lens for an optical pick-up has almost ring-shaped band-like diffraction pattern on the whole surface of the effective diameter of at least one surface and the spherical aberration is discontinuous at more than 2 portions at least for the light flux of some wavelength.

(3-30) An objective lens for an optical pick-up is a single lens and has almost ring-shaped band-like diffraction pattern on the whole surface of the effective diameter of one surface, and the other surface is a continuous surface, and the spherical aberration is discontinuous at 2 portions or more at least for the light flux of some wavelength.

(3-31) In an objective lens for an optical pick-up, a plurality of ring-shaped band-like diffraction patterns are provided on the optical axis portion and the periphery of the effective diameter on at least one surface, and the refractive surface is provided between the ring-shaped band and its adjoining ring-shaped band, and the spherical aberration is discontinuous on the boundary of the refractive surface and the diffraction pattern.

(3-32) In the objective lens for an optical pick-up described in (3-31), the objective lens is a single lens.

(3-33) In the objective lens for an optical pick-up described in (26-32), the number of ring-shaped bands of the diffraction is 7 to 30.

(4-1) In an objective lens for use in an optical pick-up apparatus for the information recording and reproducing which has the converging optical system including the objective lens to converge the light flux from the light sources having different wavelengths onto the recording surface of the optical disk, and a light receiving means for detecting the reflected light from the recording surface, and by which the information can be recorded or reproduced for the first and second optical disks whose transparent substrate thickness is different from each other, when the objective lens is formed of the fist lens having the positive refractive power and the second lens having the positive refractive power, in order from the laser light source, and at least one surface is the diffraction surface having the diffracting ring-shaped band, and 2 wavelengths different from each other are $\lambda_1$, $\lambda_2$ ($\lambda_1 < \lambda_2$), the thickness of the transparent substrates, which are different from each other, of 2 information recording media are t1, t2 (t1<t2), the predetermined image side numerical aperture necessary for conducting the recording or reproducing onto the information recording medium with the thickness t1 of the transparent substrate by the light flux of the wavelength $\lambda_1$, is NA1, and the predetermined image side numerical aperture necessary for conducting the recording or reproducing onto the information recording medium with the thickness t2 of the transparent substrate by the light flux of the wavelength $\lambda_2$ is NA2 (NA1≧NA2), then, the wave front aberration is not larger than 0.07$\lambda_1$, rms, for the combination of the wavelength $\lambda_1$, the transparent substrate thickness t1 and the image side numerical aperture NA1, and the wave front aberration is not larger than 0.07 $\lambda_2$ rms, for the combination of the wavelength $\lambda_2$, the transparent substrate thickness t2 and the image side numerical aperture NA2.

(4-2) In the objective lens described in (4-1), the wave front aberration is not larger than 0.07 $\lambda_2$ rms for the combination of the wavelength $\lambda_2$, the transparent substrate thickness t2 and the image side numerical aperture NA2.

(4-3) In the objective lens described in (4-1) or (4-2), the wave front aberration is not smaller than $0.07\lambda_2$ rms for the combination of the wavelength $\lambda_2$, the transparent substrate thickness t2 and the image side numerical aperture NA2.

(4-4) In the objective lens described in one of (4-1) to (4-3), for the combination of a predetermined position of the object point, the wavelength $\lambda_1$, and the transparent substrate thickness t1, the wave front aberration is not larger than $0.07\lambda_1$, rms, and for the combination of the object point at optically equal distance to the predetermined position, the wavelength $\lambda_2$ and the transparent substrate thickness t2, the wave front aberration is not larger than $0.07\lambda_2$ rms.

(4-5) In the objective lens described in one of (4-1) to (4-3), for the combination of a predetermined position of the object point, the wavelength $\lambda_1$ and the transparent substrate thickness t1, the wave front aberration is not larger than $0.07\lambda_1$, rms, and for the combination of the object point at optically not equal distance to the predetermined position, the wavelength 2 and the transparent substrate thickness t2, the wave front aberration is not larger than $0.07\ \lambda_2$ rms ($\lambda$ is respective wavelength).

(4-6) The objective lens described in one of (4-1) to (4-5) satisfies the following conditional expression:

$$0.4 \leq |(Ph/Pf)-2| \leq 25 \quad (5)$$

Where, Pf: the pitch of the diffracting ring-shaped band in the image side numerical aperture NA1 necessary for conducting the recording or reproducing onto the information recording medium with the transparent substrate thickness t1, and Ph: the pitch of the diffracting ring-shaped band in the numerical aperture of ½ of NA1.

(4-7) The objective lens described in (4-6) satisfies the following conditional expression:

$$0.8 \leq (Ph/Pf) \leq 2| \leq 6.0$$

(4-8) The objective lens described in (4-6) satisfies the following conditional expression:

$$0.8 \leq |(Ph/Pf)-2| \leq 6.0$$

(4-9) The objective lens described in one of (4-1) to (4-8) satisfies the following conditional expression:

$$0.70 \leq d1/f \leq 1.70$$

$$0.60 \leq r1/(n1 \cdot f) \leq 1.10$$

$$0.3 \leq (r2+r1)(r2-r1) \leq 2.0$$

Where, d1: the lens thickness on the axis of the first lens,
f: focal distance, ri: the paraxial radius of curvature of each surface, n1: the refractive index of the first lens.

(4-10) The objective lens described in (4-9) satisfies the following conditional expression:

$$1.00 \leq d1/f \leq 1.40$$

$$0.70 \leq r/(n1 \cdot f) \leq 0.90$$

$$0.4 \leq (r2+r1)/(r2-r1) \leq 1.4$$

(4-11) In an optical pick-up apparatus for information recording and reproducing which has the converging optical system including the objective lens to converge the light flux from the light sources having different wavelengths onto the recording surface of the optical disk, and the light receiving means for detecting the reflected light from the recording surface, and by which the information can be recorded or reproduced for the first and second optical disks whose transparent substrate thickness is different from each other, (herein, the necessary numerical aperture for the objective lens of the first optical disk is larger than that of the second optical disk), when the objective lens is formed of the fist lens having the positive refractive power and the second lens having the positive refractive power, in order from the laser light source side, and at least one surface is the diffraction surface having the diffracting ring-shaped band, and when 2 wavelengths different from each other are $\lambda_1$, $\lambda_2$ ($\lambda_1 < \lambda_2$), the thickness of the transparent substrates, which are different from each other, of 2 information recording media are t1, t2 (t1<t2), the redetermined image side numerical aperture necessary for conducting the recording or reproducing onto the information recording medium with the thickness t1 of the transparent substrate by the light flux of the wavelength $\lambda_1$ is NA1, and the predetermined image side numerical aperture necessary for conducting the recording or reproducing onto the information recording medium with the thickness t2 of the transparent substrate by the light flux of the wavelength $\lambda_2$ is NA2 (NA1$\leq$NA2), then, the wave front aberration is not larger than $0.07\lambda_1$ rms, for the combination of the wavelength $\lambda_1$, the transparent substrate thickness t1 and the image side numerical aperture NA1, and the wave front aberration is not larger than $0.07\lambda_2$ rms, for the combination of the wavelength $\lambda_2$, the transparent substrate thickness t2 and the image side numerical aperture NA2.

(4-12) In the optical pickup apparatus described in (4-11), the wave front aberration of the objective lens is not larger than $0.07\lambda_2$ rms for the combination of the wavelength $\lambda_2$, the transparent substrate thickness t2 and the image side numerical aperture NA1.

(4-13) In the optical pickup apparatus described in (4-11) or (4-12), the wave front aberration of the objective lens is not smaller than $0.07\lambda_2$ rms for the combination of the wavelength $\lambda_2$, the transparent substrate thickness t2 and the image side numerical aperture NA1.

(4-14) In the optical pickup apparatus described in one of (4-11) to (4-13), for the combination of a predetermined position of the object point, the wavelength $\lambda_1$ and the transparent substrate thickness t1, the wave front aberration of the objective lens is not larger than $0.07\lambda_1$ rms, and for the combination of the object point at optically equal distance to the predetermined position, the wavelength $\lambda_2$ and the transparent substrate thickness t2, the wave front aberration is not larger than $0.07\lambda_2$ rms.

(4-15) In the optical pickup apparatus described in one of (4-11) to (4-14), for the combination of a predetermined position. of the object point, the wavelength $\lambda_1$ and the transparent substrate thickness t1, the wave front aberration of the objective lens is not larger than $0.07\lambda_1$, rms, and for the combination of the object point at optically not equal distance to the predetermined position, the wavelength $\lambda_2$ and the transparent substrate thickness t2, the wave front aberration is not larger than $0.07\lambda_2$ rms ($\lambda$ is respective wavelength).

(4-16) In the optical pickup apparatus described in one of (4-11) to (4-15), the objective lens satisfies the following conditional expression:

$$0.4 \leq |(Ph/Pf)-2| \leq 25$$

Where, Pf: the pitch of the diffracting ring-shaped band in the image side numerical aperture NA1 necessary for conducting the recording or reproducing onto the information recording medium with the transparent substrate thickness t1, and Ph: the pitch of the diffracting ring-shaped band in the numerical aperture of ½ of NA1.

(4-17) In the optical pickup apparatus described in (4-16), the objective lens satisfies the following conditional expression:

$$0.8 \leq |(Ph/Pf)-2| \leq 6.0$$

(4-18) In the optical pickup apparatus described in (4-16), the objective lens satisfies the following conditional expression:

$$1.2 \leq |(Ph/Pf)-2| \leq 2.0$$

(4-19) In the optical pickup apparatus described in one of (4-11) to (4-18), the objective lens satisfies the following conditional expression:

$$0.70 \leq d1/f \leq 1.70$$

$$0.60 \leq r1/(n1 \cdot f) \leq 1.10$$

$$0.3 \leq (r2+r1)(r2-r1) \leq 2.0$$

Where, d1: the lens thickness on the axis of the first lens, f: focal distance, ri: the paraxial radius of curvature of each surface, n1: the refractive index of the first lens.

(4-20) In the optical pickup apparatus described in (4-19), the objective lens satisfies the following conditional expression:

$$1.00 \leq d1/f \leq 1.40$$

$$0.70 \leq r1/(n1 \cdot f) \leq 0.90$$

$$0.4 \leq (r2+r1)/(r2-r1) \leq 1.4$$

(5-1) An optical-element for use in an optical pick-up apparatus for reproducing the information from the optical information recording medium or recording the information onto the optical information recording medium, has the optical axis and the diffraction portion, and the diffraction portion has a plurality of areas, and the number of degrees of the diffracted light at which the plurality of areas most intensively generate for respective predetermined wavelengths, is not respectively 0, and the absolute value is different from each other.

(5-2) In the optical element described in (5-1), the diffraction portion of the optical element has the diffracting ring-shaped band in each of the plurality of areas, and most intensively generates the diffraction light of the first degree (n1≠0) in the inside of a predetermined distance from the optical axis, and in its outside, most intensively generates the second degree diffraction light (n2≠0, and |n1|≠|n2|), which is different from the fist degree.

(5-3) In the optical element described in (5-1), the diffraction portion of the optical element has the diffracting ring-shaped band for each of the plurality of areas, and the maximum value of the difference in level in the diffracting ring-shaped band and the minimum value of the difference in level are different by more than 1.5 times, thereby, in the inside of the predetermined distance from the optical axis, the diffraction light of the first degree (n1≠0) is generated most intensively, and in its outside, the diffraction light of the second degree, different from the fist degree (n2≠0, and |n1|≠n2|), is generated most intensively.

(5-4) In the optical element described in (5-3), the maximum vale of the difference in level and the minimum value of the difference in level of the optical element are not different from each other more than 6 times.

(5-5) In the optical element described in one of (5-2) to (5-4), when the first degree of the optical element is n1, and the second degree is n2, n1=1 and n2≧2 are realized (herein, the sign of the diffraction degree is determined such that a sign when the light flux is changed in the converging direction by the diffraction is positive).

(5-6) In the optical element described in (5-5), n2=2 is realized.

(5-7) In the optical element described in one of (5-2) to (5-6), the diffracting ring-shaped band of the optical element is blazed so that the diffraction efficiency becomes maximum for the first degree diffraction light of a predetermined wavelength in the inside of the predetermined distance from the optical axis, and it is blazed so that the diffraction efficiency becomes maximum for the second degree diffraction light of a wavelength different from the predetermined wavelength in the outside of a predetermined distance from the optical axis.

(5-8) In the optical element described in one of (5-2) to (5-7), the optical element is an objective lens for use in the optical pick-up apparatus.

(5-9) An optical pickup apparatus reproduces the information from the optical information recording medium, or records the information onto the optical information recording medium, by using the optical element described in one of (5-2) to (5-8).

(5-10) An optical pick-up apparatus which reproduces the information from at least 2 kinds of optical information recording media, or records the information onto the optical information recording media, has: the first light source to emit the first light flux having the first wavelength λ1; the second light source to emit the second light flux having the second wavelength λ2 which is different from the first wavelength λ1; the converging optical system including the objective lens to converge the fist light flux and the second light flux emitted from the first light source and the second light source onto the information recording surfaces through the transparent substrates of the first and the second optical information recording media; and the light detector receiving the reflected light from the first and the second optical information recording media, wherein the objective lens has the optical axis and diffraction portion, the diffraction portion has a plurality of areas, and the degrees in which the plurality of areas most intensively generate respectively for the predetermined wavelength, are respectively not 0, and the absolute values are different from each other, the first light source emits the first light flux for reproducing the information from the first optical information recording medium having the first transparent substrate with the thickness t1, or for recording the information, the second light source emits the second light flux for reproducing the information from the second optical information recording medium having the second transparent substrate with the thickness t2 different from the thickness t1, or for recording the information, the converging optical system can converge the light flux from the first light source onto the information recording surface of the first optical information recording medium, under the condition in which the wave front aberration is not larger than 0.07 λ1 rms in the predetermined numerical aperture NA1 on the image side of the objective lens necessary for recording or reproducing of the first optical information recording medium, by the light flux of the wavelength λ1, and can converge the light flux from the second light source onto the information recording surface of the second optical information recording medium, under the condition in which the wave front aberration is not larger than 0.07 $\lambda 2$ rms in the predetermined numerical aperture NA2 on the image side of the objective lens necessary for recording or reproducing of the second optical information recording medium, by the light flux of the wavelength $\lambda 2$, and further, satisfies the following conditions:

$\lambda 1 < \lambda 2$ $t1 < t2$ $NA1 > NA2$ (5-11) In the optical pickup apparatus described in (5-10), the diffraction portion of the optical element has the diffracting ring-shaped band in each of the plurality of areas, and most intensively generates the diffraction light of the first degree (n1≠0) in the inside of a predetermined distance from the optical axis, and in its outside, most intensively generates the second degree diffraction light (n2≠0, and |n1|≠n2|), which is different from the first degree.

(5-12) In the optical pickup apparatus described in (5-10), the diffraction portion of the optical element has the diffracting ring-shaped band for each of the plurality of areas, and the maximum value of the difference in level in the diffracting ring-shaped band and the minimum value of the difference in level are different by more than 1.5 times, thereby, in the inside of the predetermined distance from the optical axis, the diffraction light of the first degree (n1≠0) is generated most intensively, and in its outside, the diffraction light of the second degree, different from the fist degree (n2≠0, and |n1|≠n2|), is generated most intensively.

(5-13) In the optical pickup apparatus described in (5-11) or (5-12), in the outside of the predetermined distance from the optical axis of the pick-up apparatus, the minimum pitch of the diffracting ring-shaped band in the effective diameter, is not smaller than 10 μm and not larger than 80 μm.

(5-14) In the optical pickup apparatus described in (5-13), the maximum vale of the difference in level and the minimum value of the difference in level of the optical pick-up apparatus are not different from each other more than 6 times.

(5-15) In the optical pickup apparatus described in one of (5-11) to (5-14), when the first degree of the optical pick-up apparatus is n1, and the second degree is n2, n1=1 and n2≧2 are realized (herein, the sign of the diffraction degree is determined such that a sign when the light flux is changed in the converging direction by the diffraction is positive).

(5-16) In the optical pickup apparatus described in (5-15), n2=2 is realized.

(5-17) In the optical pickup apparatus described in one of (5-11) to (5-16), the diffracting ring-shaped band of the optical pick-up apparatus is blazed so that the diffraction efficiency becomes maximum for the first degree diffraction light of a predetermined wavelength in the inside of the predetermined distance from the optical axis, and it is blazed so that the diffraction efficiency becomes maximum for the second degree diffraction light of a wavelength different from the predetermined wavelength in the outside of a predetermined distance from the optical axis.

(5-18) In the optical pickup apparatus described in one of (5-10) to (5-17), the converging optical system converges the light flux from the second light source onto the information recording surface of the second optical information recording medium under the condition that the wave front aberration is not smaller than 0.07 $\lambda 2$ rms in the numerical aperture NA1.

(5-19) In the optical pickup apparatus described in one of (5-10) to (5-18), the predetermined distance of the diffraction portion in the objective lens is almost corresponding to a range through which the light flux of NA2 passes.

(5-20) In the optical pickup apparatus described in one of (5-10) to (5-19), in the converging optical system, the spherical aberration is discontinuous at a predetermined distance from the optical axis for the light flux with the wavelength $\lambda 2$.

BRIEF DESCRIPTION OF THE DRAWINGS

FIG. 34(a) is the spherical aberration view when the light flux whose light source wavelength is in the vicinity of 400 nm, is entered into the objective lens in the example 12, and FIG. 34(b) is the spherical aberration view when the light flux whose light source wavelength is in the vicinity of 650 nm, is entered into the objective lens in the example 12.

FIG. 42 is a spot diagram of the light flux whose numerical aperture is not smaller than NA 0.5, when the information recording or information reproducing is conducted for the CD by the objective lens in the example 13.

DETAILED DESCRIPTION OF THE PREFERRED EMBODIMENT

Figure 1:
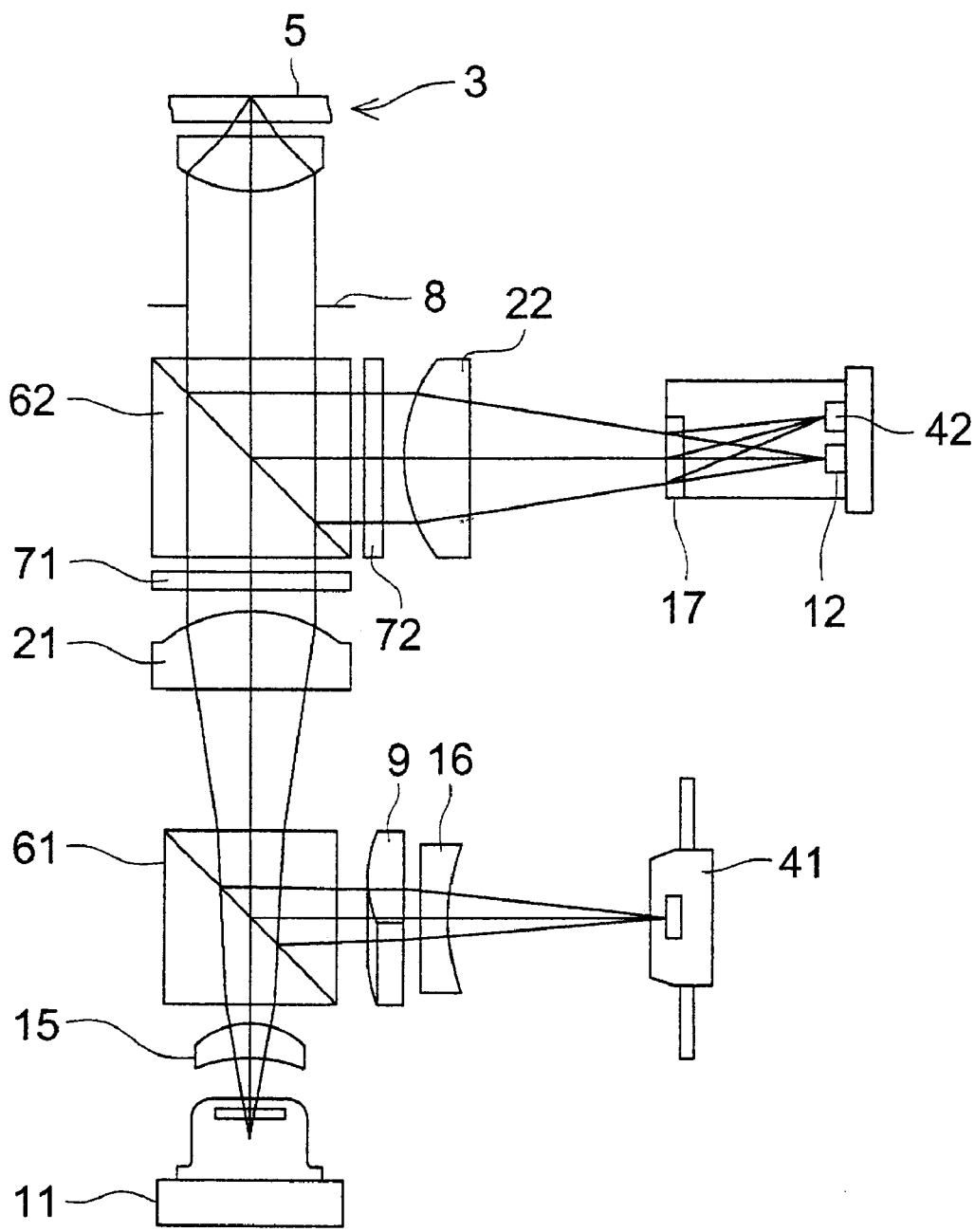
FIG. 1 is an outline structural view of an optical pick up apparatus according to an embodiment of the present invention.

An optical pick-up apparatus of the present invention is an optical pick-up apparatus to reproduce and/or record the information of the first optical information recording medium having the first transparent substrate with the thickness t1, and the second optical information recording medium having the second transparent substrate with the thickness t2 (t2>t1), and has the first light source to emit the first light flux with the wavelength λ1 and the second light source to emit the second light flux with the wavelength λ2 (λ1<λ2), a converging optical system having an objecting lens to converge the light flux emitted from the first or second light source onto the information recording surface of the first optical information recording medium or the second optical information recording medium, and a light detector to receive the reflected light from the first optical information recording medium or the second optical information recording medium. Further, the converging optical system has a diffraction portion on the whole of the effective diameter surface of at least one surface, or almost whole surface of the effective diameter surface. Further, the converging optical system generates m-order diffracted ray (m is an integer other than 0) obtained when the first light flux passes through the diffraction portion, more than the diffraction light of the other orders, and converges it onto the first information recording surface so that the information of the first optical information recording medium can be reproduced and/or recorded. Further, the converging optical system generates n-order diffracted ray (n is an integer other than 0) obtained when the second light flux passes through the diffraction portion, more than the diffraction light of the other orders, and converges it onto the second information recording surface so that the information of the second optical information recording medium can be reproduced and/or recorded. Further, in order to reproduce and/or record the second optical information medium, when the converging optical system converges the second light flux onto the second information recording surface, the converging optical system has a discontinuous portion, in which the spherical aberration exists, at least, at one portion, or a practically discontinuous portion. Incidentally, this structure is applicable to a plurality of optical information recording medium which have the same thickness and are different in necessary numerical aperture.

Incidentally, [the whole of the effective diameter surface (entire surface in an effective aperture)] means a region where light flux passes in the surface of the optical element of a converging optical system, the whole portion through which the light flux satisfying the necessary numerical aperture of the optical information recording medium on which the reproducing and/or recording is conducted by the optical pick-up apparatus, passes. [Almost whole of the effective diameter surface (almost entire surface in an effective aperture)] means more than 80% of the whole of the effective diameter surface, and more preferably, more than 90%. Here, the sentence "a spherical aberration has a discontinuous portion" means that when a spherical aberration is represented by a light ray aberration, a spherical aberration curve becomes discontinuous at a boundary of a certain NA. Also, the sentence "a spherical aberration has a substantially discontinuous portion" means that if a spherical aberration is continuous, a change of a spherical aberration becomes suddenly, for example, a spherical aberration changes by 5 μm or more in a direction of an optical axis when NA changes by 0.01 so that a position of light ray on the disk is substantially separated at a boundary of a certain NA.

By the structure described above, in the optical system of the optical pick-up apparatus to conduct the recording and reproducing the information on a plurality of kinds of optical information recording media with the different thickness, the light flux outside a predetermined numerical aperture is easily made a flare on the operation condition on the small side of the numerical aperture NA, and even when the aperture limitation for the small numerical aperture is not used, the beam diameter is not too narrowed down, and relatively large spot diameter can be obtained. That is, when the optical element in which the diffraction portion is provided as in the present invention, the optical pick-up apparatus to conduct the recording and reproducing the information on a plurality of kinds of optical information recording media with the different thickness can be provided. It is preferable that such the flare is a sufficiently large flare on the outside of the predetermined numerical aperture also for the purpose that the spot of the necessary portion for recording or reproducing the information is not adversely affected. According to the present invention, the following can be attained: on the operation condition on the small side of the numerical aperture, the spherical aberration on the outside of a predetermined numerical aperture is made practically discontinuous, and on the inside of the predetermined numerical aperture, the well narrowed-down spot can be obtained, and the light flux on the outside of it becomes a large flare, and it does not influence on the spot necessary for recording and reproducing.

Further, in order to record and reproduce the first optical information recording medium, even when the converging optical system converges the first light flux onto the first information recording surface, the converging optical system may have the discontinuous portion having at least one spherical aberration portion, or the practically discontinuous portion.

Further, in order to record and reproduce the second optical information recording medium, when the converging optical system converges the second light flux onto the second information recording surface, the converging optical system may have the discontinuous portion having more than 2 spherical aberration portions, or the practically discontinuous portion.

The optical element of the present invention, (preferably, the objective lens for the optical pick-up apparatus to conduct the reproducing and/or recording of the optical information recording medium having the transparent substrate), has at least one surface, and the diffraction portion is provided on the whole of the effective diameter surface of the surface of the optical element, and the optical element generates the m-order diffracted ray (m is an integer other than 0) obtained when the light flux with the predetermined wavelength passes through the diffraction portion, by larger quantity than the diffraction light of the other orders, and when the m-order diffracted ray is converged through the transparent substrate with the predetermined thickness, the optical element has a discontinuous portion having at least one spherical aberration portion, or a practically discontinuous portion.

Incidentally, it is preferable that the diffraction portion is provided on any one of surfaces of the optical element of the converging optical system. As the optical element on which the diffraction portion is provided, it is not specifically limited, however, a lens, prism, mirror, parallel plate, or the like, is listed. As the optical element provided with the diffraction portion, when the lens is used, as a specific example of the optical element, an objective lens, collimator lens, and coupling lens can be listed, and it is preferable that the objective lens is provided with the diffraction portion. Further, when the objective lens is provided with the diffraction portion, the objective lens may be a single lens with the positive refraction power, or may be a two-lens composition objective lens composed of the fist lens with the positive refraction power and the second lens with the positive refraction power. Incidentally, in the two-lens composition objective lens, the diffraction portion is not provided on almost whole surface of the effective diameter portion, but the diffraction portion may also be provided on a portion of the surface. Further, in the two-lens composition objective lens, in order to conduct the recording and reproducing of the second optical information recording medium, when the second light flux is converged onto the second information recording surface, the objective lens may not have the discontinuous portion having at least one spherical aberration portion, or practically discontinuous portion.

Further, the diffraction portion may be an amplitude type diffraction portion, however, from the viewpoint of the light utilization efficiency, the diffraction portion is preferably a phase type diffraction portion. Further, the diffraction pattern of the diffraction portion is preferably the rotation symmetry around the optical axis. Further, the diffraction portion has a plurality of ring-shaped bands viewing from the direction of the optical axis, and it is preferable that the plurality of ring-shaped bands are formed almost concentrically circular around an optical axis, or a point in the vicinity of the optical axis. A circle is preferable, however, an ellipse may be allowable. Specifically, a blazed type ring-shaped band diffraction surface having the difference in level is preferable. Further, the stepwise formed ring-shaped band diffraction surface may also allowable. Further, the ring-shaped band diffraction surface which is stepwise formed as the ring-shaped band, discretely shifting to the direction in which the lens thickness is increased as being separated from the optical axis, may also allowable. Further, when the diffraction shape is viewed in the section parallel to the optical axis direction, a range from step to step is regarded as one ring-shaped band. Incidentally, the diffraction portion is preferably ring-shaped band-like, however, it may be a one-dimensional diffraction grating.

Incidentally, in the order number of the diffraction light, it may be m≠n, and preferably, m=n. Further, because the loss of the amount of light can be suppressed, it is more preferable that m=n=±1. More preferably, m=n=+1.

Further, when the diffraction efficiency of the m-order diffracted ray of the first light flux in the diffraction portion is A%, and the diffraction efficiency of the diffraction light of the other some order number (preferably, in the order number other than n, the order of the largest diffraction efficiency) is B%, it is preferable that A−B≧10, and when the diffraction efficiency of the n-order diffracted ray of the second light flux in the diffraction portion is A'%, and the diffraction efficiency of the diffraction light of the other some order number (preferably, in the order number other than n, the order number of the largest diffraction efficiency) is B'%, it is preferable that A'−B'≧10. Further, it is more preferable that A−B≧30, and A'−B'≧30, and further preferably, A−B≧70, and A'−B'≧70.

Further, in order to conduct the recording and reproducing of the second optical information recording medium, when the converging optical system converges the second light flux onto the second information recording surface, 3 structures by which the converging optical system can have the discontinuous portion having at least one spherical aberration portion, or practically discontinuous portion, will be described below.

The fist structure is as follows: when the optical path difference function of the diffraction portion is φ(h)(h is the distance of the surface having the diffraction portion from the optical axis, and is perpendicular to the optical axis), dφ(h)/dh is made discontinuous at, at least, one portion, or practically discontinuous.

The optical path difference function φ(h) expresses the optical path difference added by the diffraction surface to the first-order diffracted ray of the reference wavelength, and at every time when the value of the optical path difference is changed by mλ (m is the diffraction order number), for example, the diffracting ring-shaped band is provided. The reference wavelength is the wavelength in which the diffraction efficiency becomes maximum.

Incidentally, the phrase (dφ(h)/dh is practically discontinuous) means, even when dφ(h)/dh is the continuous function, when the pitch of the diffracting ring-shaped band is obtained from the optical path difference function, a condition that the pitch of the diffracting ring-shaped band is suddenly changed, and means a condition in which, preferably, |d²φ(h)/dh²| is so large that it satisfies more than 0.20.

The second structure is as follows: the diffraction portion is provided on the surface of the objective lens, and when the length of the objective lens in the axial direction is x, and the height of the objective lens in the perpendicular direction to the optical axis is h, in the mother aspherical surface (basic aspherical surface), at least one discontinuous portion, or practically discontinuous portion is provided in dx/dh. Incidentally, it is preferable that the diffraction portion is provided on the mother aspherical surface, however, the diffraction portion may not be provided on the mother aspherical surface. Here, the sentence "dx/dh is discontinuous" means a condition that a change in a direction of a tangent line to a basic surface of an aspherical surface becomes discontinuous at a certain distance H from an optical axis along a vertical direction, that is, a shape of the basic surface of an aspherical surface is sharply bent. Also, "dx/dh is substantially (practically) discontinuous" means a condition that a direction of a tangent line to a basic surface of an aspherical surface suddenly changes.

The third structure is as follows: the diffraction portion is provided on the surface of the objective lens, and the objective lens has at least one difference in level (stepped portion) in the effective diameter surface.

Incidentally, it is preferable that the diffraction portion is provided on the surface having the difference in level, however, the diffraction portion may be provided on the surface having no difference in level. Here, it may be preferable that a flat section of the stepped portion is provided to be parallel to an optical axis of the objective lens. Further, in the case that the objective lens has a stepped portion, it is not necessary to conform the position of the stepped portion with the position where a spherical aberration becomes discontinuous. In other words, a spherical aberration may be not discontinuous at the stepped portion.

Incidentally, in the first structure, in the diffracting ring-shaped bands of the diffraction portion in which dφ(h)/dh is discontinuous at least at one portion or practically discontinuous and which is formed inside h, it is preferable that the width in the perpendicular to the optical axis of the surface having the diffraction portion, in the most outside diffracting ring-shaped band, is not larger than the width in the perpendicular direction to the optical axis of the surface having the diffraction portion, in the diffracting ring-shaped bands which adjoins the most outside diffracting ring-shaped band and is formed on the outside of h. When it is described by using FIG. 9, the width P1 of the most outside diffracting ring-shaped band 3f inside H, is not larger than the width P2 of the diffracting ring-shaped band 3g which adjoins 3f and is the outside of H.

More preferably, at least one diffracting ring-shaped band in the diffraction portion satisfies the following condition: $1.2 \leq P_{i+1}/P_i \leq 10$. Pi: the width in the perpendicular direction to the optical axis, of the i-th diffracting ring-shaped band, counted from the optical axis of the surface having the diffraction portion to the peripheral direction.

Preferably, in the diffracting ring-shaped bands of the diffraction portion which is formed inside h in which dφ(h)/dh is discontinuous at least at one portion, or practically discontinuous, the most outside diffracting ring-shaped band is i-th diffracting ring-shaped band.

More preferably, $1.2 \leq P_{i+1}/P_i \leq 4.0$, and further preferably, $1.2 \leq P_{i+1}/P_i \leq 2.8$.

Further, in the optical element having the diffraction portion, it is preferable that the number m of the diffracting ring-shaped band of the diffraction portion through which the rays of light of NA 0.60 pass, satisfies $22 \leq m \leq 32$. Herein, the number of the diffracting ring-shaped band is determined such that the diffracting ring-shaped band on the optical axis of the surface having the diffraction portion is 1, and is counted in order toward the outside.

Incidentally, in the following description, the necessary numerical aperture on the optical information recording medium side of the converging optical system necessary for recording or reproducing the first optical information recording medium by the first light flux is defined as NA1, and the necessary numerical aperture on the optical information recording medium side of the converging optical system necessary for recording or reproducing the second optical information recording medium by the second. light flux is defined as NA2 (NA1>NA2).

In the optical pick-up apparatus of the present invention, it is preferable that: in the first light flux passed though the objective lens, the wave-front aberration on the first information recording surface when the light flux of a portion in which the numerical aperture on the optical information recording medium side is not larger than NA1, passes through the first transparent substrate of the first optical information recording medium, is not larger than 0.07 λ1 rms; and in the second light flux passed though the objective lens, the wave-front aberration on the second information recording surface when the light flux of a portion in which the numerical aperture on the optical information recording medium side is not larger than NA2, passes through the second transparent substrate of the second optical information recording medium, is not larger than 0.07 λ2 rms.

Further, in the second light flux passed though the objective lens, the tertiary spherical aberration component of the wave-front aberration on the second information recording surface when the light flux of a portion in which the numerical aperture on the optical information recording medium side is not larger than NA2, passes through the second transparent substrate of the second optical information recording medium, is excessive, and when its absolute value is WSA2 λ2 rms, it is preferable that, 0.02 λ2 rms≦WSA2≦0.06 λ2 rms. Incidentally, when it satisfies 0.02 λ2 rms≦WSA2≦0.06 λ2 rms, the diffraction portion is not provided on almost whole surface of the effective diameter portion, but the diffraction portion may be provided on a portion of the surface. Alternatively, when it satisfies 0.02 λ2 rms≦WSA2≦0.06 λ2 rms, in order to conduct the recording and reproducing on the second optical information recording medium, when the second light flux is converged onto the second information recording surface, the discontinuous portion having at least one spherical aberration portion, or practically discontinuous portion may not be provided.

By the structure satisfying the condition 0.02 λ2 rms≦WSA2≦0.06 λ2 rms, the worsening of the chromatic aberration can be decreased, and further, the number of ring-shaped bands can be decreased, thereby, the production of the diffraction optical element such as the diffraction lens becomes easy, and the diffraction optical element such as the diffraction lens having well light utilization efficiency can be obtained. Accordingly, it is preferable that, when the condition is 0.02 λ2 rms≦WSA2≦0.06 λ2 rms, the number of the ring-shaped bands of the diffraction portion is 7–32 (more preferably, 7–30).

In the case where the condition 0.02 λ2 rms≦WSA2≦0.06 λ2 rms is satisfied, when the image formation magnification viewed from the optical information recording medium side of the objective lens at the time of the information recording or reproducing of the first optical image formation recording medium is M1, and the image formation magnification viewed from the optical information recording medium side of the objective lens at the time of the information recording or reproducing of the second optical image formation recording medium is M2, it is preferable that M1 and M2 are almost equal to each other. More preferably, M1 and M2 are almost 0.

Further, when the absolute value of the tertiary spherical aberration component of the wave-front aberration on the first information recording surface when the light flux of a portion in which the numerical aperture on the optical information recording medium side is not larger than NA1, in the first light flux passed through the objective lens, passes through the first transparent substrate of the first optical information recording medium is WSA1 λ1 rms, WSA1≦0.04 λ1 rms is preferable.

More preferably, in the second light flux passed through the objective lens, the wave-front aberration on the second information recording surface when the light flux of a portion in which the numerical aperture on the optical information recording medium side is not larger than NA2, passes through the second transparent substrate of the second optical information recording medium is not larger than 0.07 λ2 rms, and the wave-front aberration on the second information recording surface when the light flux of a portion in which the numerical aperture on the optical information recording medium side is not smaller than NA2, passes through the second transparent substrate of the second optical information recording medium, is not smaller than 0.07 λ2 rms, (more preferably, not smaller than 0.1 λ rms). Incidentally, when NA having the discontinuous portion having at least one spherical aberration portion or practically discontinuous portion is NAZ, it is preferable that: in the second light flux passed through the objective lens, the wave-front aberration on the second information recording surface when the light flux of a portion in which the numerical aperture on the optical information recording medium side is not larger than NAZ, passes through the second transparent substrate of the second optical information recording medium, is not larger than 0.07 λ2 rms; and the wave-front aberration on the second information recording surface when the light flux of a portion in which the numerical aperture on the optical information recording medium side is not smaller than NAZ, passes through the second transparent substrate of the second optical information recording medium, is not smaller than 0.07 λ2 rms, (more preferably, not smaller than 0.1 λ2 rms).

Further, when NAZ is 0.43≦NAZ≦0.53, it is preferable that: in the second light flux passed through the objective lens, the spherical aberration amount when the light flux of a portion, in which the numerical aperture on the optical information recording medium side is not smaller than NAZ and not larger than NA 0.7, passes through the second transparent substrate of the second optical information recording medium, is not smaller than the spherical aberration amount when the light flux of a portion, in which the numerical aperture on the optical information recording medium side is not larger than NAZ, passes through the second transparent substrate of the second optical information recording medium, in the second light flux passed through the objective lens, by more than 10 λ2. More preferably, it is larger by 10 λ2–100 λ2. Incidentally, it is preferable that NA having the discontinuous portion having at least one spherical aberration portion or practically discontinuous portion is NAZ.

It is preferable that: in the second light flux passed through the objective lens, the spot diameter on the second information recording surface when the light flux of a portion, in which the numerical aperture on the optical information recording medium side is not smaller than NA2 and not larger than NA1, passes through the second transparent substrate of the second optical information recording medium, is not smaller than w2, and not larger than w1, and satisfies the following conditions:

10 μm≦w2≦50 μm

20 μm≦w1−w2≦110 μm.

Further, it is preferable that, in the second light flux passed through the objective lens, the position onto which the light flux passing through NA1 is converged through the second transparent substrate of the second optical information recording medium, is, in the second light flux passed through the objective lens, more separated from the objective lens than the position onto which the light flux passing through NA2, is converged through the second transparent substrate of the second optical information recording medium, and the difference is more than 5 μm (more preferably, 15 μm).

Further, in the case where the light detector has the light receiving surface, when NAZ is 0.43≦NAZ≦0.53, it is preferable that, in the second light flux transmitted the objective lens, when the light flux of a portion, in which the numerical aperture on the optical information recording medium side is not larger than NAZ, passes through the second transparent substrate of the second optical information recording medium, the light flux reflected by the second optical information recording medium is included in the light receiving surface of the light detector, and in the second light flux transmitted through the objective lens, when the light flux of a portion, in which the numerical aperture on the optical information recording medium side is not smaller than NAZ, passes through the second transparent substrate of the second optical information recording medium, the light flux reflected by the second optical information recording medium is irradiated onto the surrounding except the light receiving surface of the light detector. Further, when the light receiving surface is 1 to 3 rectangular light receiving surfaces, the inner diameter of the donut-like spot diameter on the information recording surface of the second optical information recording medium is preferably not smaller than 5 μm. More preferably, not smaller than 25 μm.

Further, when the light detector has a central light receiving surface and a peripheral light receiving surface, when NAZ is 0.43≦NAZ≦0.53, in the second light flux transmitted through the objective lens, when the light flux of a portion, in which the numerical aperture on the optical information recording medium side is not smaller than NAZ, passes through the second transparent substrate of the second optical information recording medium, it is preferable that the light flux reflected by the second optical information recording medium is irradiated on the peripheral light receiving surface or its periphery except for the central light receiving surface of the light detector. Further, when the light receiving surface has more than 2 stripe-like light receiving surfaces, the inner diameter of the donut-like spot diameter of the light flux not smaller than NAZ on the information recording surface of the second optical information recording medium is preferably not smaller than 20 μm. When the light receiving surface has more than 4 stripe-like light receiving surfaces, the inner diameter of the donut-like spot diameter of the light flux not smaller than NAZ on the information recording surface of the second optical information recording medium is preferably not smaller than 50 μm.

Further, the diffraction portion of the optical element has the first diffraction portion and the second diffraction portion, and the order of the diffraction light generated most intensively in the first diffraction portion and the second diffraction portion to the respective predetermined wavelengths is not respectively 0, and the values of the order may be different from each other. Further, the absolute values of the order may be different from each other or the absolute values of the orders may be the same to each other. In this case, the refraction surface may be provided between the first diffraction portion and the second diffraction portion. Further, in the case that a refractive surface having not a diffractive portion is located between the first diffractive portion and the second diffractive portion, it may be preferable that a spherical aberration has two discontinuous portions in the boundary between the diffractive surface and the refractive surface when the converging optical system converges the second flux onto a second optical information recording surface so as to conduct recording/reproducing the second optical information recording medium. An aberration of the refractive surface on the second optical information recording surface may be larger than the first diffractive portion or may be smaller than the first diffractive portion. Further, in order to conduct the recording and reproducing of the second optical information recording medium, when the second light flux is converged onto the second information recording surface, the discontinuous portion having at least one spherical aberration portion or practically discontinuous portion may not be provided.

Further, the light source is preferably the laser light source such as a semiconductor laser. For example, an example in which, as the first light source, the laser light source emitting the first light flux of the wavelength of 630–665 nm is used, and as the second light source, the laser light source emitting the second light flux of the wavelength of 750–810 nm is used, is given. In this case, it is preferable that the thickness of the transparent substrate of the first optical information recording medium is 0.6 mm, and the thickness of the transparent substrate of the second optical information recording medium is 1.2 mm. Specifically, it is preferable that the first optical information recording medium is DVD, and the second optical information recording medium is CD. Further, in the case of the objective lens of 2 composition lens, the wavelength of the first light source is preferably 350–550 nm. In that case, the wavelength of the second light source may be 630–665 nm, or 750–810 nm.

The width in the perpendicular direction to the optical axis in the most outside ring-shaped band in the ring-shaped bands formed inside the predetermined length h of the optical element is not larger than the width in the perpendicular direction to the optical axis in the ring-shaped band which adjoins the most outside ring-shaped band and is formed outside the predetermined length h.

Figure 9:
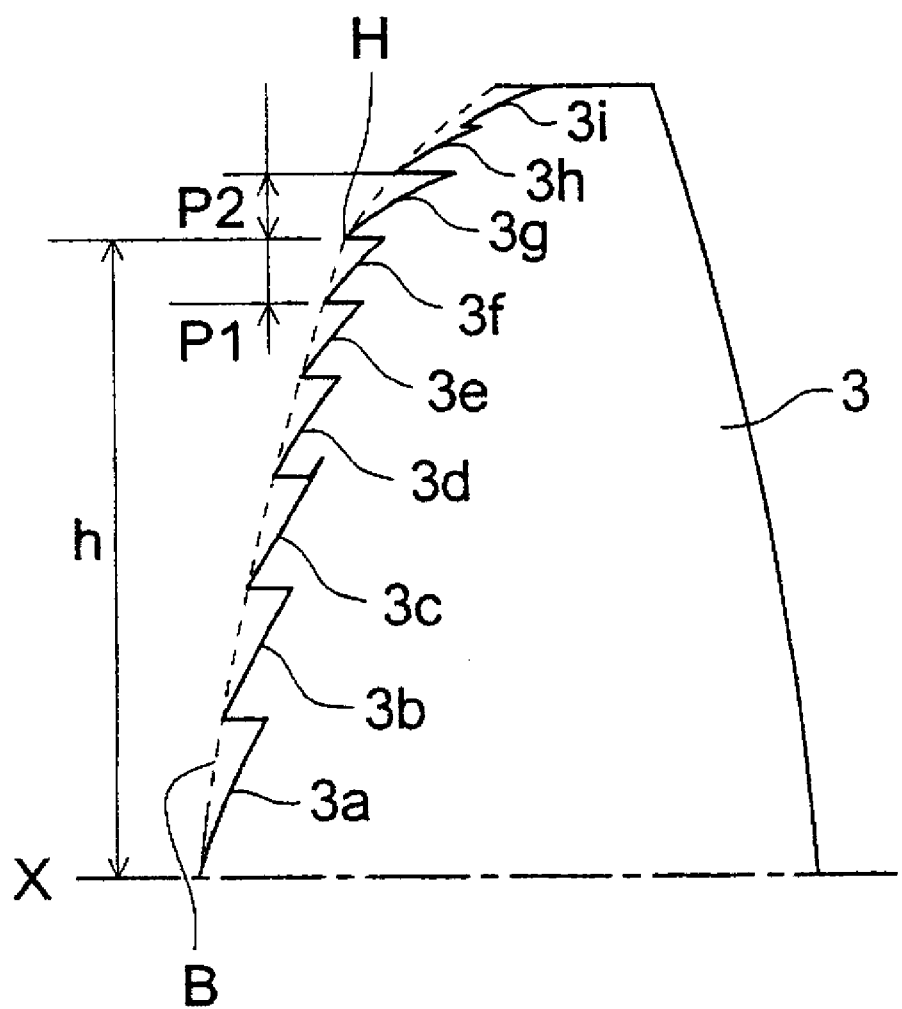
FIG. 9 is a typical view showing an example of a lens as an optical element in which a diffracting ring-shaped band is provided.

FIG. 9 is a typical view showing an example of the lens as an optical element provided with the diffracting ring-shaped band. In FIG. 9, the pitch and the difference in level of the diffracting ring-shaped band is drawn not smaller than the actual one so as to be easily understood.

The left optical surface of a lens 3 shown in FIG. 9, has a point H in which the differential function dφ(h)/dh which differentiates the optical path difference function φ(h) at the portion of the predetermined distance h, is discontinuous or practically discontinuous, when the distance from the optical axis X is defined as h, and the optical path difference function is expressed as φ(h). On the surface inside the point H, the diffracting ring-shaped bands 3a–3f are provided in such a manner that these are located along the mother aspherical surface B and the pitch (the width in the right angled direction to the optical axis) is gradually decreased, and on the surface outside the inflection point H, the diffracting ring-shaped bands 3g–3i are provided in such a manner that these are located along the mother aspherical surface B and the pitch is gradually decreased. Further, the mother aspherical surface B also has the shape in which it is bent at the point H, or practically bent.

Herein, being bounded by the point H, the pitch of the diffracting ring-shaped band changes. More specifically, the pitch is gradually decreased to the diffracting ring-shaped bands 3a–3f, however, the pitch P1 of the diffracting ring-shaped band 3f nearest to the point H in the inside the point H, is not larger than the pitch P2 of the diffracting ring-shaped band 3g which is in contact with the diffracting ring-shaped band 3f and outside the point H. In such the structure, the light with a predetermined wavelength passing through the outside of the point H can be effectively converted into the flare light.

When the light is irradiated from the light source with the wavelength λ2 located at a predetermined object distance onto the optical information recording medium having the transparent thickness t2 through the optical element, in the numerical aperture NA not larger than the predetermined distance h, the wave-front aberration is not larger than 0.07 λ2 rms, and the spherical aberration of the light rays passing through the inside of the predetermined distance h is not larger than the spherical aberration of the light rays passing through the outside of the predetermined distance h by 10 λ2–100 λ2.

As described above, when the spherical aberration of the light rays passing through the inside of the predetermined distance h is not larger than the spherical aberration of the light rays passing through the outside of the predetermined distance h by 10 λ2–100 λ2, the light rays passing through the outside of the predetermined distance h can be regarded as the flare, and the beam diameter is not too narrowed down even when the aperture limitation for the small numerical aperture NA is not used, thereby, because the relatively large spot diameter can be obtained, it is preferable.

At least one surface of the optical element is the diffraction surface having the diffracting ring-shaped band, and the i-th diffracting ring-shaped band of the at least one diffraction surface, counted from the optical axis toward the peripheral direction, satisfies the following conditional expression:

$$1.2 \leq P_{i+1}/P_i \leq 10 \tag{1}$$

Where, $P_i$: the width in the direction perpendicular to the optical axis of the i-th diffracting ring-shaped band counted from the optical axis toward the peripheral direction.

In the optical element applicable for the optical pick-up apparatus, at least one surface of the optical element is the diffraction surface having the diffracting ring-shaped band, and the i-th diffracting ring-shaped band of the at least one diffraction surface, counted from the optical axis toward the peripheral direction, satisfies the following conditional expression:

$$1.2 \leq P_{i+1}/P_i \leq 10 \tag{1}$$

Where, $P_i$: the width in the direction perpendicular to the optical axis of the i-th diffracting ring-shaped band counted from the optical axis toward the peripheral direction.

Incidentally, as the i-th diffracting ring-shaped band, it is preferable that, when the ring-shaped band on the optical axis is 1, it is the 14-th–22-th ring-shaped band.

According to the present invention, under the operation condition on the smaller numerical aperture side, the spherical aberration on the outside of a predetermined numerical aperture can be made a sufficiently large flare. That is, under the operation condition on the smaller NA side, the spherical aberration is made practically discontinuous, and a well-narrowed down spot is obtained inside the predetermined numerical aperture, and the light flux outside it becomes a large flare, and does not influence on the spot of the necessary portion for the recording and reproducing. When the value $P_{i+1}/P_i$ is not smaller than the lower limit value of the expression (1), the sufficiently large flare can be obtained. On the one hand, when the value $P_{i+1}/P_i$ is not larger than the upper limit value of the expression (1), the ring-shaped band pitch is not too small, and the production of the diffraction surface becomes easy.

In the optical element applicable for the optical pick-up apparatus, the number m of the diffracting ring-shaped band of the diffraction surface through which the light rays of NA 0.60 pass, satisfies $$22 \leq m \leq 32. \tag{2}$$

Where, the number of the diffracting ring-shaped band of the ring-shaped band on the optical axis is 1, and the number of the diffracting ring-shaped band is counted toward the outside.

In the optical element applicable for the optical pick-up apparatus, at least one surface is a diffraction surface having the diffracting ring-shaped band, and the number m of the diffracting ring-shaped band of the diffraction surface through which the light rays of NA 0.60 pass, satisfies $$22 \leq m \leq 32. \tag{2}$$

Where, the number of the diffracting ring-shaped band of the ring-shaped band on the optical axis is 1, and the number of the diffracting ring-shaped band is counted toward the outside.

The light rays of the optical element are almost parallel light flux within the range of the wavelength 630–665 nm, and entered into the optical element.

According to the present invention, when the number m is not smaller than the lower limit value of the expression (2), the spherical aberration generated due to the thickness of the substrate of the optical information recording medium (for example, CD and DVD), can be sufficiently corrected, and on the on hand, when the number m is not larger than the upper limit value of the expression (2), there is an advantage that the production of the lens with the good diffraction efficiency is easy.

The optical element is the objective lens.

In the objective lens applicable for the optical pick-up apparatus having the converging optical system including the objective lens for converging the light flux from the light sources having the different wavelengths, and the light receiving means for detecting the reflected light from the recording surface, which can record or reproduce the information for at least two of the first and the second optical information recording medium whose transparent thickness is different from each other, when two wavelengths different from each other are λ1 and λ2 (λ1>λ2), and the thickness of the transparent substrates of two optical information recording media different from each other are t1 and t2 (t1<t2), and when the necessary numerical aperture on the image side necessary for recording or reproducing the optical information recording medium with the thickness t1 of the transparent substrate by the light flux of the wavelength λ1 is NA1, and the necessary numerical aperture on the image side necessary for recording or reproducing the optical information recording medium with the thickness t2 of the transparent substrate by the light flux of the wavelength λ2 is NA2 (NA1≧NA2), the wave front aberration is not larger than 0.07 λ1 rms for the combination of the wavelength λ1, thickness t1 of the transparent substrate, and necessary numerical aperture NA1, and the wave front aberration is not larger than 0.07 λ2 rms for the combination of the wavelength λ2, thickness t2 of the transparent substrate, and necessary numerical aperture NA2, and the light flux not smaller than the necessary numerical aperture NA2 is made a flare, for the combination of the wavelength λ2, and thickness t2 of the transparent substrate.

When the light is irradiated from the light source with the wavelength λ2 at a predetermined object distance onto the optical information recording medium with the transparent substrate thickness t2 through the objective lens, the light flux of the numerical aperture not smaller than NA2 and not larger than NA1, is distributed in the range of not smaller than the diameter w2 and not larger than the diameter w1, and satisfies the following conditional expressions:

$$10\ \mu m \leq w2 \leq 50\ \mu m \quad (3)$$

$$20\ \mu m \leq w1 - w2 \leq 110\ \mu m \quad (4)$$

When the diameter w2 is not smaller than the lower limit of the expression (3), the beam diameter equal to the ideal lens of the numerical aperture NA2 can be obtained for the optical information recording medium with the transparent substrate thickness t2, and the light flux not smaller than NA2 becomes a flare and the possibility that the bad influence is given onto writing and/or reading of the information, is small.

When the value (w1−w2) is not smaller than the lower limit of the expression (4), the light flux not smaller than the numerical aperture NA2 becomes a wide range flare, and a good focus signal can be obtained.

When the diameter W2 is not larger than the upper limit value of the expression (3), and when the value (w1−w2) is not larger than the upper limit of the expression (4), in the case of the objective lens composed of the plastic lens, the deterioration of the spherical aberration due to change of the referactive index by the change of the temperature can be corrected to some order number by the change of the spherical aberration by the diffraction surface by utilizing the change of the oscillation wavelength of the semiconductor laser due to the change of the temperature. Making the flare large for the light flux met smaller than the numerical aperture NA2, corresponds to that the action of the diffraction to correct the spherical aberration by the substrate thickness is decreased, and the above effect in which the deterioration of the spherical aberration due to the change of the temperature is corrected, is decreased, therefore, it is not preferable that the flare is made too much large.

At least one surface of the objective lens is the diffraction surface having the diffracting ring-shaped band, and when the optical path difference function of the diffraction surface is (h is the distance from the optical axis), $\phi(h)/dh$ at a portion of the predetermined distance h is a discontinuous or practically discontinuous function.

The width in the perpendicular direction to the optical axis in the most outside ring-shaped band in the ring-shaped bands formed inside the predetermined distance h of the objective lens is not larger than the width in the perpendicular direction to the optical axis in the ring-shaped band which adjoins the most outside ring-shaped band and is formed outside the predetermined distance h.

When the light is irradiated from the light source of the wavelength $\lambda 2$ located at a predetermined object distance onto the optical information recording medium with the transparent substrate thickness t2 through the objective lens, in the numerical aperture NA not larger than the predetermined distance h, the spherical aberration is not larger than 0.07 $\lambda 2$ rms, and the spherical aberration of the light rays passing though the inside of the predetermined distance h is not larger than the spherical aberration of the light rays passing through the outside of the predetermined distance h by 10 $\lambda 2$–100 $\lambda 2$.

At least one surface of the objective lens is the diffraction surface having the diffracting ring-shaped band, and the i-th diffracting ring-shaped band counted from the optical axis toward the peripheral direction, of the at least one diffraction surface, satisfies the following conditional expression:

$$1.2 \leq P_{i+1}/P_i \leq 10. \quad (1)$$

Where, P: the width in the perpendicular direction to the optical axis of the i-th diffracting ring-shaped band, counted from the optical axis toward the peripheral direction.

The number m of the diffracting ring-shaped band of the diffraction surface through which the light ray of NA 0.60 of the objective lens passes, satisfies $$22 \leq m \leq 32. \quad (2)$$

Because the wavelength $\lambda 1$ is within the range of 630–665 nm, preferably 635 nm or 650 nm, the wavelength $\lambda 2$ is within 750–810 nm, preferably 780 nm, the thickness t1 is 0.6 mm, and the thickness t2 is 1.2 mm, the objective lens is appropriate for the optical pick-up apparatus which can record and/or reproduce the information for both of the DVD and CD.

Because the first optical information recording medium is DVD and the second optical information recording medium is CD, the objective lens appropriate for the optical pick-up apparatus which can record and/or reproduce the information for both of the DVD and CD, can be provided.

In the optical pick-up apparatus having the converging optical system including the objective lens for converging the light flux from the light sources having the different wavelengths, and the light receiving means for detecting the reflected light from the recording surface, which can record or reproduce the information for at least two of the first and the second optical information recording media whose transparent thickness is different from each other, when two wavelengths different from each other are $\lambda 1$ and $\lambda 2$ ($\lambda 1 < \lambda 2$), and the thickness of the transparent substrates of two optical information recording media different from each other are t1 and t2 (t1<t2), and when the necessary numerical aperture on the image side necessary for recording or reproducing the optical information recording medium with the thickness t1 of the transparent substrate by the light flux of the wavelength $\lambda 1$ is NA1, and the necessary numerical aperture on the image side necessary for recording or reproducing the optical information recording medium with the thickness t2 of the transparent substrate by the light flux of the wavelength $\lambda 2$ is NA2 (NA1$\geq$NA2), the wave front aberration is not larger than 0.07 $\lambda 1$ rms for the combination of the wavelength $\lambda 1$, thickness t1 of the transparent substrate, and necessary numerical aperture NA1, and the wave front aberration is not larger than 0.07 $\lambda 2$ rms for the combination of the wavelength $\lambda 2$, thickness t2 of the transparent substrate, and necessary numerical aperture NA2, and the light flux not smaller than the necessary numerical aperture NA2 is made a flare, for the combination of the wavelength $\lambda 2$ and the thickness t2 of the transparent substrate.

In the optical system of the optical pick-up apparatus to conduct the recording and reproducing of the information for a plurality of kinds of the optical information recording media with different thickness, when the light flux not smaller than the necessary numerical aperture NA2 is made a flare for the combination of the wavelength $\lambda 2$ and the thickness t2 of the transparent substrate, the beam diameter is not too narrowed down and relatively large spot diameter can be obtained without using the aperture limitation. Accordingly, when the optical element provided with the diffracting ring-shaped band is used as in the present invention, the optical pick-up apparatus which records and reproduces the information for a plurality of kinds of the optical information recording media with different thickness, can be provided.

When the light is irradiated from the light source with the wavelength λ2 located at a predetermined object distance onto the optical information recording medium with the transparent substrate thickness t2 through the objective lens, the light flux of not smaller than numerical aperture NA2 and not larger than NA1 distributes in the range of not smaller than the diameter w2 and not larger than w1, and satisfies the following conditional expressions:

$$10 \ \mu m \leq w2 \leq 50 \ \mu m \quad (3)$$

$$20 \ \mu m \leq w1 - 1w2 \leq 110 \ \mu m. \quad (4)$$

At least one surface of the objective lens of the optical pick-up apparatus is the diffraction surface having the diffracting ring-shaped band, and when the optical path difference function of the diffraction surface is φ(h)(h is the distance from the optical axis), dφ(h)/dh is the discontinuous or practically discontinuous function at a portion of a predetermined distance h.

In the diffracting ring-shaped band of at least one surface of the objective lens of the optical pick-up apparatus, the width in the perpendicular direction to the optical axis in the most outside ring-shaped band in the ring-shaped bands formed inside the predetermined distance h is not larger than the width in the perpendicular direction to the optical axis in the ring-shaped band which adjoins the most outside ring-shaped band and is formed outside the predetermined distance h.

When the light is irradiated from the light source of the wavelength λ2 located at a predetermined object distance onto the optical information recording medium with the transparent substrate thickness t2 through the objective lens of the optical pick-up apparatus, in the numerical aperture NA not larger than the predetermined distance h, the spherical aberration is not larger than 0.07 λ2 rms, and the spherical aberration of the light rays passing though the inside of the predetermined distance h is not larger than the spherical aberration of the light rays passing through the outside of the predetermined distance h by 10 λ2–100 λ2.

In the optical pick-up apparatus, at least one surface of the objective lens is the diffraction surface having the diffracting ring-shaped band, and the i-th diffracting ring-shaped band counted from the optical axis toward the peripheral direction, of the at least one diffraction surface, satisfies the following conditional expression:

$$1.223 \ P_{i+1}/P_i \leq 10. \quad (1)$$

Where, P: the width in the perpendicular direction to the optical axis of the i-th diffracting ring-shaped band, counted from the optical axis toward the peripheral direction.

In the optical pick-up apparatus, the number m of the diffracting ring-shaped band of the diffraction surface through which the light ray of NA 0.60 passes, satisfies $22 \leq m \leq 32$.

In the optical pick-up apparatus, the object point of the objective lens for the combination of the wavelength λ1 and the thickness t1 of the transparent substrate, is at an optically equal distance to the object point of the objective lens for the combination of the wavelength λ2 and the thickness t2 of the transparent substrate.

In the optical pick-up apparatus, the wavelength λ1 is within the range of 630–665 nm, preferably 635 nm or 650 nm, the wavelength λ2 is within 750–810 nm, preferably 780 μm, the thickness t1 is 0.6 mm, and the thickness t2 is 1.2 mm.

In the optical pick-up apparatus, the first optical information recording medium is DVD and the second optical information recording medium is CD.

In the objective lens applicable for the optical pick-up apparatus, at lest one surface is the diffraction surface having the diffracting ring-shaped band, and the spherical aberration when the light flux of the wavelength λ2 in the range of the numerical aperture NA of 0.5–0.7 passes through the objective lens is not smaller than the spherical aberration when the light flux of the wavelength λ2 in the numerical aperture NA not larger than 0.5 passes through the objective lens by 10 λ2–100 λ2.

As described above, when the spherical aberration of the light ray passing through the inside of the predetermined distance h is not larger than the spherical aberration of the light ray passing through the outside of the predetermined distance h by 10 λ2–100 λ2, it is preferable because the light ray passing through the outside of the predetermined distance h can be regarded as a flare, and the beam diameter is not too narrowed down and relatively large spot diameter can be obtained without using the aperture limitation for the small numerical aperture NA.

In the optical pick-up apparatus having a light source to record and/or reproduce the information on the information recording surface of the optical information recording medium by irradiating the light with different wavelengths corresponding to 2 optical information recording media whose thickness of transparent substrates is different from each other, and an objective lens through which the light from the light source respectively passes, and which outputs the light to the optical information recording medium, at lest one surface of the objective lens is the diffraction surface having the diffracting ring-shaped band, and the spherical aberration when the light flux of a predetermined wavelength λ2 in the range of the numerical aperture NA of 0.5–0.7 passes through the objective lens is not smaller than the spherical aberration when the light flux of the predetermined wavelength λ2 in the numerical aperture NA not larger than 0.5 passes through the objective lens by more than 10 λ2–100 λ2.

In the objective lens applicable for the optical pick-up apparatus which has the light source with the wavelength λ, the converging optical system including the objective lens for converging the light flux from the light source onto the recording surface of the optical information recording medium, and the light receiving means having the light receiving surface for detecting the reflected light from the recording surface, and can record or reproduce the information for the optical information recording medium, the objective lens has the diffraction surface on at least one surface, and when the light flux of the wavelength λ of the numerical aperture NA of not larger than 0.5 passes, the light flux reflected from the optical information recording medium is irradiated to the light receiving means so that the light flux is included in the light receiving surface of the light receiving means, and when the light flux of the wavelength λ of the numerical aperture NA of not smaller than 0.5 passes, the light flux reflected from the optical information recording medium is irradiated onto the surrounding except the light receiving surface of the light receiving means.

Figure 8:
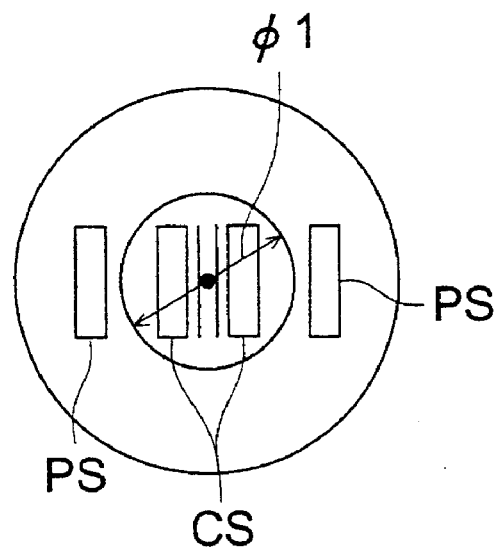
FIG. 8(a) is a typical view showing a light receiving surface of an integration type light receiving means.
FIG. 8(b) is a typical view showing the light receiving surface of a separation type light receiving means.
Figure 8:
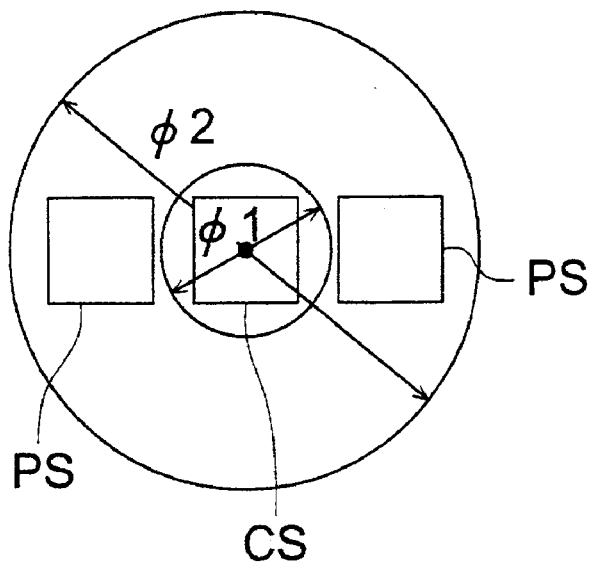

Relating to the light receiving means used for the optical pick-up apparatus, there are a case where a module in which the laser light source and the light receiving means are integrated into a unit, is used, and a case where the laser light source and the light receiving means are separately provided. The former is called integrated light receiving means and the latter is called separated light receiving means herein. FIG. 8(a) is a typical view showing the light receiving surface of the integrated light receiving means, and FIG. 8(b) is a typical view showing the light receiving surface of the separated light receiving means. In FIG. 8(b), the light receiving surface of the light receiving means normally structured by almost 3 rectangular light receiving surfaces has a central light receiving surface CS, and a pair of peripheral light receiving surfaces PS arranged both sides of it. The central light receiving surface CS has a function to detect whether the writing and or reading error of the recording signal is not generated, and the peripheral light receiving surfaces PS has a function to detect whether tracking error is not generated.

In the present invention, for the optical information recording medium of the small necessary numerical aperture in 2 optical information recording media of DVD and CD, that is the CD, when the light flux with the wavelength $\lambda$ of the numerical aperture NA of not smaller than 0.5 passes through the objective lens, the flare is formed by the diffraction surface. As shown in FIG. 8(b), the light flux with the wavelength $\lambda$ of the numerical aperture NA of not larger than 0.5 forms a spot on the center of the central light receiving surface CS, and the light flux with the wavelength $\lambda$ of the numerical aperture NA of not smaller than 0.5 is irradiated as the donut-like flare light of the inner diameter of $\phi 1$. In this case, when the inner diameter $\phi 1$ is sufficiently large and the central light receiving surface CS is perfectly involved, the light flux with the wavelength $\lambda$ of the numerical aperture NA of not smaller than 0.5 is irradiated only onto the peripheral light receiving surface PS, and it is prevented that the unnecessary light is detected on the central light receiving surface CS as the light receiving surface in the present invention, and the erroneous detection can be prevented.

Further, when the inner diameter of the flare light is $\phi 2$ larger than $\phi 1$, and it perfectly involves even the peripheral light receiving surface PS, in the light flux with the wavelength $\lambda$ of the numerical aperture NA of not smaller than 0.5, it is prevented that the unnecessary light is detected on the central light receiving surface CS and the peripheral light receiving surface PS as the light receiving surface in the present invention, and the erroneous detection can be prevented.

In the case where the light receiving means has one to three almost rectangular light receiving surfaces, when the spot diameter on the optical information recording surface of the light flux not smaller than the numerical aperture NA of 0.5 is not smaller than 5 $\mu$m, in the separated light receiving means, it is difficult that the unnecessary light enters into the central light receiving surface CS, and the erroneous detection can be prevented.

When the light receiving means has 3 rectangular light receiving surfaces aligned almost on a straight line, and the spot diameter on the optical information recording surface of the light flux not smaller than the numerical aperture NA of 0.5 is not smaller than 25 $\mu$m, in the separated light receiving means, it is more difficult that the unnecessary light enters into the peripheral light receiving surface PS, and the erroneous detection can be further prevented.

In the objective lens applicable for the optical pick-up apparatus which has the light source with the wavelength $\lambda$, the converging optical system including the objective lens for converging the light flux from the light source onto the recording surface of the optical information recording medium, and the light receiving means having the central light receiving surface and the peripheral light receiving surface for detecting the reflected light from the recording surface, and can record or reproduce the information for the optical information recording medium, the objective lens has the diffraction surface on at least one surface, and when the light flux of the wavelength $\lambda$ of the numerical aperture NA of not smaller than 0.5 passes, the light flux reflected from the optical information recording medium is irradiated to the light receiving means so that the light flux includes only the peripheral light receiving surface.

As shown in FIG. 8(a), the integrated light receiving means is composed of more than at least 2, normally, more than 4 stripe-like light receiving surfaces. The light flux with the wavelength $\lambda$ not larger than the numerical aperture NA of 0.5 forms the spot between the central light receiving surface group CS, and light flux with the wavelength $\lambda$ not smaller than the numerical aperture NA of 0.5 becomes the flare light of the inner diameter $\phi 1$ and is irradiated. In this case, when the inner diameter $\phi 1$ is sufficiently large and the central light receiving surface CS is perfectly involved, the light flux with the wavelength $\lambda$ of the numerical aperture NA of not smaller than 0.5 is irradiated only onto the peripheral light receiving surface PS, and it is prevented that the unnecessary light is detected on the central light receiving surface CS as the light receiving surface in the present invention, and the erroneous detection can be prevented.

When the light receiving means has at least 2 stripe-like light receiving surfaces, and the spot diameter on the optical information recording surface of the light flux not smaller than the numerical aperture NA of 0.5 is not smaller than 20 $\mu$m, in the integrated light receiving means, it is more difficult that the unnecessary light enters into the central light receiving surface CS, and the erroneous detection can be prevented.

When the light receiving means has at least 4 stripe-like light receiving surfaces, and the spot diameter on the optical information recording surface of the light flux not smaller than the numerical aperture NA of 0.5 is not smaller than 50 $\mu$m, in the integrated light receiving means, it is more difficult that the unnecessary light enters into the peripheral light receiving surface PS, and the erroneous detection can be further prevented.

In the optical pick-up apparatus which has the light source with the wavelength $\lambda$, the converging optical system including the objective lens for converging the light flux from the light source onto the recording surface of the optical information recording medium, and the light receiving means having the light receiving surface for detecting the reflected light from the recording surface, and can record or reproduce the information for the optical information recording medium, the objective lens has the diffraction surface on at least one surface, and when the light flux of the wavelength $\lambda$ of the numerical aperture NA of not larger than 0.5 passes, the light flux reflected from the optical information recording medium is irradiated to the light receiving means so that the light flux is included in the light receiving surface of the light receiving means, and when the light flux of the wavelength $\lambda$ of the numerical aperture NA of not smaller than 0.5 passes, the light flux reflected from the optical information recording medium is irradiated to the surrounding except the light receiving surface of the light receiving means.

In the optical pick-up apparatus, in the case where the light receiving means has 1 to 3 almost rectangular light receiving surfaces, when the spot diameter on the optical information recording surface of the light flux not smaller than the numerical aperture NA of 0.5 is not smaller than 5 $\mu$m, in the separated light receiving means, it is difficult that the unnecessary light enters into the central light receiving surface CS, and the erroneous detection can be prevented.

In the optical pick-up apparatus, when the light receiving means has 3 rectangular light receiving surfaces aligned almost on a straight line, and the spot diameter on the optical information recording surface of the light flux not smaller than the numerical aperture NA of 0.5 is not smaller than 25 μm, in the separated light receiving means, it is more difficult that the unnecessary light enters into the peripheral light receiving surface PS, and the erroneous detection can be further prevented.

In the optical pick-up apparatus which has the light source with the wavelength λ, the converging optical system including the objective lens for converging the light flux from the light source onto the recording surface of the optical information recording medium, and the light receiving means having the central light receiving surface and the peripheral light receiving surface for detecting the reflected light from the recording surface, and can record or reproduce the information for the optical information recording medium, the objective lens has the diffraction surface on at least one surface, and when the light flux of the wavelength λ of the numerical aperture NA of not smaller than 0.5 passes, the light flux reflected from the optical information recording medium is irradiated to the light receiving means so that the light flux includes only the peripheral light receiving surface.

In the optical pick-up apparatus, when the light receiving means has at least 2 stripe-like light receiving surfaces, and the spot diameter on the optical information recording surface of the light flux not smaller than the numerical aperture NA of 0.5 is not smaller than 20 μm, in the integrated light receiving means, it is difficult that the unnecessary light enters into the central light receiving surface CS, and the erroneous detection can be prevented.

In the optical pick-up apparatus, when the light receiving means has at least 4 stripe-like light receiving surfaces, and the spot diameter on the optical information recording surface of the light flux not smaller than the numerical aperture NA of 0.5 is not smaller than 50 μm, in the separated light receiving means, it is more difficult that the unnecessary light enters into the peripheral light receiving surface PS, and the erroneous detection can be further prevented.

In order to attain the above objects, the optical pick-up apparatus according to the present invention is structured such that: the light flux from the light source is converged onto the information recording surface by the converging optical system including the objective lens through the transparent substrate of the optical information recording medium, and recording or reproducing of the information is conducted, and the optical pick-up apparatus conducts recording or reproducing of the information of at least 2 kinds of optical information recording media in which the thickness of the transparent substrate and recording density are different; and in the optical pick-up apparatus which has the first light source with the wavelength λ1 (nm), the second light source with the wavelength λ2 (nm) (λ2>λ1), and a light detector which receives the reflected light from the optical information recording medium of the emitted light flux from the first light source and the second light source, and in which the necessary numerical aperture on the optical information recording medium side of the converging optical system necessary for recording or reproducing the first optical information recording medium whose transparent substrate thickness is t1 by the wavelength λ1, is NA1, and the necessary numerical aperture on the optical information recording medium side of the converging optical system necessary for recording or reproducing the second optical information recording medium whose transparent substrate thickness is t2 (herein, t2>t1) by the wavelength λ2, is NA2 (herein, NA2<NA1), and when the diffraction pattern is provided on at least one surface of the converging optical system, and m-order diffracted ray (m is an integer) from the diffraction pattern of the converging optical system of the light flux from the first light source is at least used, the first optical information recording medium whose transparent substrate thickness is t1 is recorded and/or reproduced, and when n-order diffracted ray (n is an integer, and n=m=0 is excepted)) from the diffraction pattern of the converging optical system of the light flux from the second light source is at least used, the second optical information recording medium whose transparent substrate thickness is t2 (t2>t1) is recorded and/or reproduced, in the light flux from the second light source passed through the objective lens, the tertiary spherical aberration component of the wave front aberration when the light flux of a portion in which the numerical aperture is lower than NA2, on the optical information recording medium side, passes through the transparent substrate of the second optical information recording medium, is excessive, and when the absolute value is WSA2 λ2 rms, then, $$0.02\lambda 2 \text{ rms} \leq WSA2 \leq 0.06\lambda 2 \text{ rms}.$$

According to this optical pick-up apparatus, even when the diffraction pattern is provided, the chromatic aberration can be decreased, and the spherical aberration in the second optical information recording medium whose transparent substrate is thick, is decreased.

Further, m is an integer excluding 0, and preferably n=m. Further, the objective lens is a single lens, and the diffraction pattern is preferably provided on the single lens.

Further, when the image formation magnification viewed from the optical information recording medium side of the objective lens at the time of recording or reproducing of the information of the first optical information recording medium is M1, and the image formation magnification viewed from the optical information recording medium side of the objective lens at the time of recording or reproducing of the information of the second optical information recording medium is M2, it is preferable that M2 and M1 is nearly equal. According to this, a light receiving device can be formed into a unit, and the first light source and the second light source can be formed into 1 package, and the apparatus can be structured compactly. Further, it is preferable that M1 and M2 are nearly 0, and according to this, the position adjustment of the light source becomes easy.

Further, it is preferable that the position onto which the light ray most apart from the optical axis in the light flux from the second light source passed the objective lens, is converged through the transparent substrate of the second optical information recording medium, is, far from the objective lens, and farther than the position at which, in the light flux from the second light source passed the objective lens, the wave front aberration is minimum, when the light flux of a portion in which the numerical aperture on the optical information recording medium side is smaller than NA2, passes through the transparent substrate of the second optical information recording medium, and its difference is not smaller than 5 μm. When the difference is not smaller than 5 μm, in the light flux from the second light source, because the aberration of the light flux in the vicinity of the numerical aperture of NA1 becomes large, the beam spot is not narrowed-down by the objective lens.

Further, it is more preferable that the position onto which the light ray most apart from the optical axis in the light flux from the second light source passed the objective lens, is converged through the transparent substrate of the second optical information recording medium, is, far from the objective lens, and farther than the position at which, in the light flux from the second light source passed through the objective lens, the wave front aberration is minimum, when the light flux of a portion in which the numerical aperture on the optical information recording medium side is smaller than NA2, passes through the transparent substrate of the second optical information recording medium, and its difference is not smaller than 15 μm. When the difference is not smaller than 15 μm, in the light flux from the second light source, because the light flux whose numerical aperture is almost larger than NA2, becomes the flare, the beam spot is not only narrowed-down by the objective lens, but also the aperture limitation is not necessary, and the converging optical system becomes simple.

Further, the optical pick-up apparatus according to the present invention is structured such that the light flux from the light source is converged onto the information recording surface by the converging optical system including the objective lens through the transparent substrate of the optical information recording medium, and recording or reproducing of the information is conducted, and the optical pick-up apparatus conducts recording or reproducing the information of at least 2 kinds of optical information recording media in which the thickness of the transparent substrates and recording density are different, and in the optical pick-up apparatus which has the first light source with the wavelength $\lambda 1$ (nm), the second light source with the wavelength $\lambda 2$ (nm) ($\lambda 2 > \lambda 1$), and a light detector which receives the reflected light from the optical information recording medium of the emitted light flux from the first light source and the second light source, and the necessary numerical aperture on the optical information recording medium side of the converging optical system necessary for recording or reproducing the first optical information recording medium whose transparent substrate thickness is t1, by the wavelength $\lambda 1$, is NA1, and the necessary numerical aperture on the optical information recording medium side of the converging optical system necessary for recording or reproducing the second optical information recording medium whose transparent substrate thickness is t2 (herein, t2>t1) by the wavelength $\lambda 2$, is NA2 (herein, NA2<NA1), and when the almost ring-shaped band-like diffraction pattern is provided on at least one surface of the objective lens of the converging optical system, and m-order diffracted ray (m is an integer) from the diffraction pattern of the converging optical system of the light flux from the first light source is at least used, the first optical information recording medium whose transparent substrate thickness is t1 is recorded and/or reproduced, and when n-order diffracted ray (n is an integer, and n=m=0 is excepted)) from the diffraction pattern of the converging optical system of the light flux from the second light source is at least used, the second optical information recording medium whose transparent substrate thickness is t2 (t2>t1) is recorded and/or reproduced, when the numerical aperture on the optical information recording medium side of the light ray passing the peripheral edge of the almost ting band-like diffraction pattern including the optical axis is NAX, then, $0.2 \leq NAX/NA2 \leq 0.9$.

Further, m is an integer excluding 0, and preferably n=m. Further, the objective lens is preferably a single lens.

Further, when the image formation magnification viewed from the optical information recording medium side of the objective lens at the time of recording or reproducing of the information of the first optical information recording medium is M1, and the image formation magnification viewed from the optical information recording medium side of the objective lens at the time of recording or reproducing of the information of the second optical information recording medium is M2, it is preferable that M2 and M1 is nearly equal. Further, it is preferable that M1 and M2 are nearly 0.

Further, it is preferable that the number of ring-shaped bands is 7 to 30, and the number of ring-shaped bands can be more reduced than in the case where the spherical aberration is perfectly corrected by the diffraction, and the production becomes easy.

Further, the light flux incident on the information recording surface is divided into at least 3 light flux of the first light flux in the vicinity of the optical axis, the second light flux outside the first light flux, and the third light flux outside the second light flux, and the second light flux is caused not to reach the vicinity of the information recording surface, by the shielding means, and it is preferable that, in the m-order diffracted ray from the diffraction pattern of the converging optical system of the light flux from the first light source, the first light flux and the third light flux mainly form the beam spot, and records and/or reproduces the first optical information recording medium, and in the n-order diffracted ray from the diffraction pattern of the converging optical system of the light flux from the second light source, the first light flux mainly forms the beam spot, and records and/or reproduces the second optical information recording medium.

Further, it is preferable that the objective lens is single lens, and the diffraction pattern is provided on the single lens.

Further, it is preferable that the objective lens is single lens, and the shielding means is provided on the single lens.

Further, the light flux incident on the information recording surface is divided into at least 3 light flux of the first light flux in the vicinity of the optical axis, the second light flux outside the first light flux, and the third light flux outside the second light flux, and it is preferable that the beam spot is formed and the first optical information recording medium is recorded and/or reproduced, when the first light flux and the third light flux in the light flux from. the first light source at least utilize the m-order diffracted ray from the diffraction pattern of the converging optical system, and the beam spot is formed and the second optical information recording medium is recorded and/or reproduced, when the first light flux and the third light flux at least utilize the n-order diffracted ray from the diffraction pattern of the converging optical system of the first light flux of the light flux from the second light source, and the second light flux.

Further, the convergent position of a most apart portion from the optical axis in the first light flux of the light flux from the second light source is preferably different from the convergent position of the second light flux.

Further, the objective lens is a single lens, and the diffraction pattern is preferably provided on the single lens. Further, the second light flux is preferably diffracted by the diffraction pattern.

Further, the second light flux can pass through a portion having no diffraction pattern. Further, in the light flux from the second light source, the light flux in which the numerical aperture on the optical information recording medium side is more than NA3 ($NA2 \leq NA3 < NA1$), can be made not to reach in the vicinity of the information recording surface by the shielding means.

Further, the shielding means is preferably a ring-shaped band dichroic filter through which the light flux with the wavelength λ1 passes and on which the light flux with the wavelength λ2 is reflected.

Further, the following can be attained: by the light flux of a portion in which the numerical aperture on the optical information recording medium side, in the n-order diffracted ray from the diffraction pattern of the converging optical system of the light flux from the second source is smaller than almost NA2, the beam spot is formed, and the second optical information recording medium is recorded and/or reproduced, and a portion in which the numerical aperture is larger than almost NA2 is the flare light.

Further, it is preferable that the first light source and the second light source are formed into a unit, and the light detector is common to the first light source and the second light source.

Further, the objective lens according to the present invention is an objective lens for use in the optical pick-up apparatus to conduct the recording or reproducing of the information for the optical information recording medium, and at least on one surface, it has the diffraction pattern, and when the parallel light flux of the wavelength 780 nm are incident on the surface, the tertiary spherical aberration component of the wave front aberration when a portion in which the numerical aperture on the optical information recording medium side, is smaller than 0.45, in the light flux passed through the objective lens, passes through the transparent substrate of the thickness 1.2 mm, and the refractive index 1.57, is excessive, and the absolute value is WSA2 λ2 rms, and in the case where the parallel light flux of the wavelength 650 nm are incident on the surface, when the absolute value of the tertiary spherical aberration component of the wave front aberration when a portion in which the numerical aperture on the optical information recording medium side is smaller than 0.6, in the light flux passed through the objective lens, passes through the transparent substrate of the thickness 0.6 mm and the refractive index 1.58, is WSA1 λ1 rms, the following conditional expressions are satisfied: 0.02 λ2 rms≦WSA2≦0.06 λ2 rms, and WSA1≦0.04 λ1 rms.

Further, the objective lens according to the present invention has almost ring-shaped band-like diffraction pattern on the whole surface of the effective diameter of at least one surface, and when the height from the optical axis of the peripheral edge of the almost ring-shaped band-like diffraction pattern including the optical axis is HX, and the height of the most outer peripheral ring-shaped band is HMAX, the following conditional expression is satisfied: 0.15≦HX/HMAX≦0.65.

Further, the objective lens is preferably a single lens.

Further, another objective lens for the optical pick-up according to the present invention has almost ring-shaped band-like diffraction pattern on the whole surface of the effective diameter of at least one surface, and the spherical aberration is discontinuous at more than 2 portions at least for the light flux of some wavelength.

Further, still another objective lens for the optical pick-up according to the present invention is a single lens, and has almost ring-shaped band-like diffraction pattern on the whole surface of the effective diameter of one surface, and the other surface is a discontinuous surface, and the spherical aberration is discontinuous at more than 2 portions at least for the light flux of some wavelength.

Further, yet another objective lens for the optical pick-up according to the present invention is characterized in that: a plurality of ring-shaped band-like diffraction patterns are provided on the optical axis portion and the periphery of the effective diameter on at least one surface, and the refractive surface is provided between the ring-shaped band and its adjoining ring-shaped band, and the spherical aberration is discontinuous on the boundary of the refractive surface and the diffraction pattern. In this case, the objective lens is preferably a single lens. Further, the number of ring-shaped bands of the diffraction pattern may be adjusted to 7–30.

Incidentally, the converging optical system in the present invention means more than 1 sets of the optical system by which, for example, CD and DVD can be recorded or reproduced, and not only the whole of the optical system by which the information can be recorded onto the information recording medium and/or the information on the information recording medium can be reproduced, but may also be a portion of the optical system, and includes the objective lens.

In the objective lens for use in the optical pick-up apparatus for the information recording and reproducing which has the converging optical system including the objective lens to converge the light flux from the light sources having different wavelengths onto the recording surface of the optical disk, and the light receiving means for detecting the reflected light from the recording surface, and by which the information can be recorded or reproduced for the first and second optical disks whose transparent substrate thickness is different from each other, (herein, the necessary numerical aperture for the objective lens of the first optical disk is larger than that of the second optical disk), when the objective lens is formed of the fist lens having the positive refractive power and the second lens having the positive refractive power, in order from the laser light source, and at least one surface is the diffraction surface having the diffracting ring-shaped band, and 2 wavelengths different from each other are $\lambda_1$, $\lambda_2$ ($\lambda_1 < \lambda_2$), the thickness of the transparent substrates, which are different from each other, of 2 information recording media are t1, t2 (t1<t2), the predetermined image side numerical aperture necessary for conducting the recording or reproducing onto the information recording medium with the thickness t1 of the transparent substrate by the light flux of the wavelength $\lambda_1$, is NA1, and the predetermined image side numerical aperture necessary for conducting the recording or reproducing onto the information recording medium with the thickness t2 of the transparent substrate by the light flux of the wavelength 2 is NA2 (NA1≧NA2), then, the wave front aberration is not larger than $0.07\lambda_1$ rms, for the combination of the wavelength $\lambda_1$, the transparent substrate thickness t1 and the image side numerical aperture NA1, and the wave front aberration is not larger than $0.07\lambda_2$ rms, for the combination of the wavelength $\lambda_2$, the transparent substrate thickness t2 and the image side numerical aperture NA2.

In the objective lens, because the wave front aberration is not larger than $0.07\lambda_1$ rms, for the combination of the wavelength $\lambda_1$, the transparent substrate thickness t1 and the image side numerical aperture NA1, and the wave front aberration is not larger than $0.07\lambda_2$ rms, for the combination of the wavelength $\lambda_2$, the transparent substrate thickness t2 and the image side numerical aperture NA2, the recording and/or reproducing of the information can be appropriately conducted onto the optical disks with different substrate thickness by using the light sources having the different wavelengths.

In the objective lens, because the wave front aberration is not larger than $0.07\lambda_2$ rms, for the combination of the wavelength $\lambda_2$, the transparent substrate thickness t2 and the image side numerical aperture NA1, even when the combination of the light source wavelength and the substrate thickness is changed, the wave front aberration can be suppressed, thereby, the recording and/or reproducing of the information can be appropriately conducted.

However, as the objective lens described in item 3, for the combination of the wavelength $\lambda_2$, the transparent substrate thickness t2 and the image side numerical aperture NA1, the wave front aberration may be not smaller than $0.07\lambda_2$ rms.

In the objective lens, for the combination of a predetermined position of the object point, the wavelength $\lambda_1$ and the transparent substrate thickness t1, the wave front aberration is not larger than $0.07\lambda_1$ rms, and for the combination of the object point at optically equal distance to the predetermined position, the wavelength $\lambda_2$ and the transparent substrate thickness t2, the wave front aberration is not larger than $0.07\lambda_2$ rms.

In the objective lens, for the combination of a predetermined position of the object point, the wavelength $\lambda_1$ and the transparent substrate thickness t1, the wave front aberration is not larger than $0.07\lambda_1$ rms, and for the combination of the object point at optically not equal distance to the predetermined position, the wavelength $\lambda_2$ and the transparent substrate thickness t2, the wave front aberration is not larger than $0.7\lambda_2$ rms ($\lambda$ is respective wavelength).

The objective lens satisfies the following conditional expression:

$$0.4 \leq |(Ph/Pf)-2| 25 \tag{5}$$

Where, Pf: the pitch of the diffracting ring-shaped band in the image side numerical aperture NA1 necessary for conducting the recording or reproducing onto the information recording medium with the transparent substrate thickness t1, Ph: the pitch of the diffracting ring-shaped band in the numerical aperture of ½ of NA1.

The conditional expression (5) relates to a pitch of the diffracting ring-shaped band, that is, to an interval between ring-shaped bands in the perpendicular direction to the optical axis. When the optical path difference function has only the square term of h, (Ph/Pf)−2=0, however, in the present invention, in order to satisfactorily correct the difference of the spherical aberration generated due to the difference between two substrate thickness by using the diffraction, it is preferable to use the higher degree term of the optical path difference function, and in this case, it is preferable that the term (Ph/Pf)−2 has a value separated from 0 to some extent. When the value goes lower than the lower limit in the expression (5), the action of the diffraction to correct the higher degree of spherical aberration is decreased, and it becomes difficult to correct the difference of the spherical aberration between 2 wavelengths generated due to the difference of the substrate thickness by the action of the diffraction. When the value goes over the upper limit in the expression (5), a portion at which the pitch of the diffracting ring-shaped band becomes too small is generated, and it is difficult to produce the lens having the high diffraction efficiency.

When the objective lens satisfies the following conditional expression, it is preferable.

$$0.8 \leq |(Ph/Pf)-2| \leq 6.0 \tag{6}$$

It is more preferable when the objective lens satisfies the following conditional expression.

$$1.2 \leq |(Ph/Pf)-2| \leq 2.0 \tag{7}$$

It is more preferable when the objective lens satisfies the following conditional expressions.

$$0.70 \leq d1/f \leq 1.70 \tag{8}$$

$$0.60 \leq r1/(n1 \cdot f) \leq 1.10 \tag{9}$$

$$0.3 \leq (r2+r1)(r2-r1) \leq 2.0 \tag{10}$$

Where, d1: the lens thickness on the axis of the first lens, f: focal distance, ri: the paraxial radius of curvature of each surface, n1: the refractive index of the first lens.

The expression (8) relates to the thickness of the center of the first lens, and when the value goes lower than the lower limit, the image height characteristic is lowered. On the one hand, when the value goes over the upper limit, the lens becomes a thick wall and the size of the pick-up increases. The expression (9) relates to the radius of curvature of the first lens, and when the value goes lower the lower limit and r1 becomes small, the shift sensitivity or the tilt sensitivity of the first lens is increased. On the one hand, when the value goes over the upper limit and r1 is increased, the power burden of the second lens is increased, and the error sensitivity to the lens thickness of the second lens is increased. The expression (10) relates to the shape of the first lens, and when the value goes lower than the lower limit and its shape becomes near to the double convex symmetrical shape, the correction of the spherical aberration is difficult. On the one hand, when the value goes over the upper limit and the degree of the meniscus is increased, the aberration deterioration due to the dislocation of the axis between the first surface and the second surface of the first lens is large.

It is more preferable when the objective lens satisfies the following conditional expressions.

$$1.00 \leq d1/f \leq 1.40 \tag{11}$$

$$0.70 \leq r1/(n1 \cdot f) \leq 0.90 \tag{12}$$

$$0.4 \leq (r2+r1)/(r2-r1) \leq 1.4 \tag{13}$$

In the optical pick-up apparatus for the information recording and reproducing which has the converging optical system including the objective lens to converge the light flux from the light sources having different wavelengths onto the recording surface of the optical disk, and the light receiving means for detecting the reflected light from the recording surface, and by which the information can be recorded or reproduced for the first and second optical disks whose transparent substrate thickness is different from each other, (herein, the necessary numerical aperture for the objective lens of the first optical disk is larger than that of the second optical disk), when the objective lens is formed of the fist lens having the positive refractive power and the second lens having the positive refractive power, in order from the laser light source side, and at least one surface is the diffraction surface having the diffracting ring-shaped band, and when 2 wavelengths different from each other are $\lambda_1$, $\lambda_2$ ($\lambda_1 < \lambda_2$), the thickness of the transparent substrates, which are different from each other, of 2 information recording media are t1, t2 (t1<t2), the predetermined image side numerical aperture necessary for conducting the recording or reproducing onto the information recording medium with the thickness t1 of the transparent substrate by the light flux of the wavelength $\lambda_1$ is NA1, and the predetermined image side numerical aperture necessary for conducting the recording or reproducing onto the information recording medium with the thickness t2 of the transparent substrate by the light flux of the wavelength $\lambda_2$ is NA2 (NA1≧NA2), then, the wave front aberration is not larger than $0.07\lambda_1$ rms, for the combination of the wavelength $\lambda_1$, the transparent substrate thickness t1 and the image side numerical aperture NA1, and the wave front aberration is not larger than $0.07\lambda_2$ rms, for the combination of the wavelength $\lambda_2$, the transparent substrate thickness t2 and the image side numerical aperture NA2.

In the objective lens of the optical pick-up apparatus, because the wave front aberration is not larger than $0.07\lambda_1$ rms, for the combination of the wavelength $\lambda_1$, the transparent substrate thickness t1 and the image side numerical aperture NA1, and the wave front aberration is not larger than $0.07\lambda_2$ rms, for the combination of the wavelength $\lambda_2$, the transparent substrate thickness t2 and the image side numerical aperture NA2, the recording and/or reproducing of the information can be appropriately conducted onto the optical disks with different substrate thickness by using the light sources having the different wavelengths.

In the objective lens of the optical pick-up apparatus, because the wave front aberration is not larger than $0.07\lambda_2$ rms, for the combination of the wavelength $\lambda_2$, the transparent substrate thickness t2 and the image side numerical aperture NA1, even when the combination of the light source wavelength and the substrate thickness is changed, the wave front aberration can be suppressed, thereby, the recording and/or reproducing of the information can be appropriately conducted.

In the objective lens of the optical pick-up apparatus, the wave front aberration may be not smaller than $0.07\lambda_2$ rms, for the combination of the wavelength $\lambda_2$, the transparent substrate thickness t2 and the image side numerical aperture NA1. in the objective lens of the optical pick-up apparatus, for the combination of a predetermined position of the object point, the wavelength $\lambda_1$ and the transparent substrate thickness t1, the wave front aberration is not larger than $0.07\lambda_1$ rms, and for the combination of the object point at optically equal distance to the predetermined position, the wavelength $\lambda_2$ and the transparent substrate thickness t2, the wave front aberration is not larger than $0.07\lambda_2$ rms.

In the objective lens of the optical pick-up apparatus, for the combination of a predetermined position of the object point, the wavelength $\lambda_1$ and the transparent substrate thickness t1, the wave front aberration is not larger than $0.07\lambda_1$ rms, and for the combination of the object point at optically not equal distance to the predetermined position, the wavelength $\lambda_2$ and the transparent substrate thickness t2, the wave front aberration is not larger than $0.07\lambda_2$ rms ($\lambda$ is respective wavelength).

The objective lens of the optical pick-up apparatus satisfies the following conditional expression:

$$0.4 \leq |(Ph/Pf)-2| \leq 25 \tag{5'}$$

Where, Pf: the pitch of the diffracting ring-shaped band in the image side numerical aperture NA1 necessary for conducting the recording or reproducing onto the information recording medium with the transparent substrate thickness t1, Ph: the pitch of the diffracting ring-shaped band in the numerical aperture of ½ of NA1.

The conditional expression (5') relates to a pitch of the diffracting ring-shaped band, that is, an interval between ring-shaped bands in the perpendicular direction to the optical axis. When the optical path difference function has only the square term of h, (Ph/Pf)−2=0, however, in the present invention, in order to satisfactorily correct the difference of the spherical aberration generated due to the difference between two substrate thickness by using the diffraction, it is preferable to use the higher degree term of the optical path difference function, and in this case, it is preferable that the term (Ph/Pf)−2 has a value separated to some extent from 0. When the value goes to lower than the lower limit in the expression (5'), the action of the diffraction to correct the higher degree of spherical aberration is decreased, and it becomes difficult to correct the difference of the spherical aberration between 2 wavelengths generated due to the difference of the substrate thickness by the action of the diffraction. When the value goes over the upper limit in the expression (5'), a portion at which the pitch of the diffracting ring-shaped band becomes too small is generated, and it is difficult to produce the lens having the high diffraction efficiency.

When the objective lens of the optical pick-up apparatus satisfies the following conditional expression, it is preferable.

$$0.8 \leq |(Ph/Pf)-2| \leq 6.0 \tag{6'}$$

It is more preferable when the objective lens of the optical pick-up apparatus satisfies the following conditional expression.

$$1.2 \leq |(Ph/Pf)-2| \leq 2.0 \tag{7'}$$

It is more preferable when the objective lens of the optical pick-up apparatus satisfies the following conditional expressions.

$$0.70 d1/f \leq 1.70 \tag{8'}$$

$$0.60 \leq r1/(n1 \cdot f) \leq 1.10 \tag{9'}$$

$$0.3 \leq (r2+r1)/(r2-r1) \leq 2.0 \tag{10'}$$

Where, d1: the lens thickness on the axis of the first lens,
  f: focal distance, ri: the paraxial radius of curvature of each surface, n1: the refractive index of the first lens.

The expression (8') relates to the thickness of the center of the first lens, and when the value goes to the lower side of the lower limit, the image height characteristic is lowered. On the one hand, when the value goes over the upper limit, the lens becomes a thick wall and the size of the pick-up increases. The expression (9') relates to the radius of curvature of the first lens, when the value goes lower the lower limit and r1 becomes small, the shift sensitivity or the tilt sensitivity of the first lens is increased. On the one hand, when the value goes over the upper limit and r1 is increased, the power burden of the second lens is increased, and the error sensitivity to the lens thickness of the second lens is increased. The expression (10') relates to the shape of the first lens, and when the value goes lower the lower limit and its shape becomes near to the double convex symmetrical shape, the correction of the spherical aberration is difficult. On the one hand, when the value goes over the upper limit and the degree of the meniscus is increased, the aberration deterioration due to the dislocation of the axis between the first surface and the second surface of the first lens is large.

It is more preferable when the objective lens of the optical pick-up apparatus satisfies the following conditional expressions.

$$1.00 \leq d1/f \leq 1.40 \tag{11'}$$

$$0.70 \leq r1/(n1 \cdot f) \leq 0.90 \tag{12'}$$

$$0.4 \leq (r2+r1)/(r2-r1) \leq 1.4 \tag{13'}$$

The optical element used in the optical pick-up apparatus for reproducing the information from the optical information recording medium or recording the information onto the optical information recording medium, has the optical axis and the diffraction portion, and the diffraction portion has a plurality of areas, and the number of orders of the diffracted light at which the plurality of areas most intensively generate for respective predetermined wavelengths, is not respectively 0, and the absolute value is different from each other.

For example, in the optical pick-up apparatus to conduct the recording and reproducing of the information using the light flux having the different numerical aperture, when the light flux outside a predetermined numerical aperture is made the flare under the condition of use on the small numerical aperture side, the beam diameter is not too narrowed down, without using the aperture limitation for the small numerical aperture, and relatively large spot diameter can be obtained. Accordingly, when the optical element provided with the diffracting ring-shaped band as in the present invention, is used, because, even in the case where the light flux of any numerical aperture is used, the appropriate spot can be formed, thereby, the optical pick-up apparatus to conduct the recording and reproducing of the information for a plurality of different kinds of the optical information recording media such as, for example, the CD and DVD, can be provided.

When more specifically described, when the information is recorded or reproduced for the different optical information recording media by using the blazed optical element, the spherical aberration can be generated and made the flare so that the spot diameter, which is the same as in the case where the optical element of a predetermined numerical aperture is used, is obtained, also by the light flux of the aperture diameter more than a predetermined numerical aperture. However, when the flare is converged to the narrow range, or the intensity is large, there is a possibility that it is erroneously detected as a focus signal or a tracking signal.

Accordingly, as in the present invention, in the case where, for example, the CD and DVD are used as the optical information recording media, when the optical element is blazed so that a portion larger than a predetermined numerical aperture for the CD is made to most intensively generate the+ second order diffracted ray for the wavelength of the light flux for the DVD recording or reproducing, as compared to the case where it is blazed for the+ first order diffracted ray, because the light flux to be made the flare more than a predetermined numerical aperture for the CD is dispersed to other order numbers, and the diffraction efficiency can be decreased, the influence of the primary order number (herein,+ second order number) flare can be decreased. Further, in this case, the other unnecessary order light flux such as+ first order light, and+ third order light can be made large flare on the recording surface, and the influence can be suppressed to small. Incidentally, in the present invention, a plurality of areas means not smaller than 2 areas.

Further, the diffraction portion of the optical element has the diffracting ring-shaped band in each of the plurality of areas, and most intensively generates the diffraction light of the first order number (n1≠0) in the inside of a predetermined distance from the optical axis, and in its outside, most intensively generates the second order diffracted ray (n2≠0, and |n1|≠|n2|), which is different from the first order number. Incidentally, any one of the first order number and second order number can be selected, so far as these are not 0 order light and these absolute values are not equal.

In the present invention, in the inside of a predetermined distance from the optical axis, the fist order (n1≠0) diffraction light is most intensively generated, and a spot light satisfactorily narrowed-down can be obtained.

In the present specification, the optical element means a lens, prism, mirror, parallel plates, or the like. Further, the ring-shaped band (diffracting ring-shaped band) is, herein, a ring-shaped band from a step to a step, when the diffraction shape is viewed in the cross section including the optical axis.

FIG. 9 is a typical view showing an example of a lens as an optical element provided with a diffracting ring-shaped band as a diffraction portion. In FIG. 9, the pitch and the difference in level of the diffracting ring-shaped band are drawn larger than the actual condition for easy understanding, and its number is also drawn smaller than the actual condition for easy understanding.

In the left optical surface of the lens 3 shown in FIG. 9, in the inside and the outside of the point separated by a predetermined distance H from the optical axis X, the shape of the diffracting ring-shaped band is largely different. More specifically, in the inside of the point separated by a predetermined distance H from the optical axis X, the diffracting ring-shaped band 3a has the pitch and the difference in level so that the intensity of the diffraction light of the first order (for example,+ first order becomes the maximum. On the one hand, in the outside of the point separated by a predetermined distance H from the optical axis X, the diffracting ring-shaped band 3b has the pitch and the difference in level so that the intensity of the diffraction light of the second order, different from the first order, (for example,+ second order) becomes the maximum. Incidentally, the sign of the diffraction order number is defined as the positive order number, when the light flux is deflected in the converging direction by the diffraction.

Herein, by adjusting the pitch and the difference in level, the order number of the diffraction light by which the intensity becomes the maximum, can be determined. In this connection, in the case where the light flux passes through the diffracting ring-shaped band 3a, when the intensity of the+ first order diffracted ray becomes the maximum, and in the case where the light flux passes through the diffracting ring-shaped band 3b, when the intensity of the+ second order diffracted ray becomes the maximum, the pitch p2 and the difference in level d2 of the diffracting ring-shaped band 3b outside the point separated by the predetermined distance H from the optical axis X respectively become 2 times, as compared to the case where being blazed by the first order diffracted ray.

The diffraction portion of the optical element has the diffracting ring-shaped band for each of the plurality of areas, and the maximum value of the difference in level in the diffracting ring-shaped band and the minimum value of the difference in level are different by more than 1.5 times, thereby, in the inside of the predetermined distance from the optical axis, the diffraction light of the first order (n1≠0) is generated most intensively, and in its outside, the diffraction light of the second order, different from the fist order (n2≠0, and |n1|≠|n2|), is generated most intensively.

When the diffracting ring-shaped band is provided by blazing the optical element such as the objective lens, the depth of the difference in level of the diffracting ring-shaped band is determined according to the diffraction order number by which the intensity is to be most enhanced, the wavelength of the incident light flux, and the incident angle of the light flux. This condition is a necessary condition when, in one optical surface, the ring-shaped bands to generate the diffraction light of the different order numbers such as, for example,+ fist order light and+ second order light, are provided with together. When the case where the wavelength of the incident light flux or the incident angle of the light flux can be changed according to the position is added to this, a condition that the ratio of the maximum value and minimum value of the difference in level of the diffracting ring-shaped band is larger than 1.5 times, is one of conditions necessary for adequately generating the diffraction light of different order numbers.

The maximum vale of the difference in level and the minimum value of the difference in level of the optical element are not different from each other more than 6 times. This is because, when the blazing is made so as to conform to the too high order diffracted ray, there is a possibility that the unnecessary order diffracted ray is image-formed near the necessary order diffracted ray for the information recording or reproducing and the bad influence is affected on it.

When the first order of the optical element is n1, and the second order is n2, n1=1 and n2≧2 are realized (herein, the sign of the diffraction order number is determined such that a sign when the light flux is changed in the converging direction by the diffraction is positive).

In the optical element, n2=2 is realized.

The diffracting ring-shaped band of the optical element is blazed so that the diffraction efficiency becomes maximum for the first order diffracted ray of a predetermined wavelength in the inside of the predetermined distance from the optical axis, and it is blazed so that the diffraction efficiency becomes maximum for the second order diffracted ray of a wavelength different from the predetermined wavelength in the outside of a predetermined distance from the optical axis.

Herein, blazing means that the diffracting ring-shaped band whose cross sectional shape is saw tooth-like, is formed on the surface of the mother aspherical surface so that the diffraction efficiency of the predetermined order number becomes the maximum.

The optical element is an objective lens for use in the optical pick-up apparatus.

The optical pick-up apparatus uses the optical element and reproduces the information from the optical information recording medium, or records the information onto the optical information recording medium.

The optical pick-up apparatus which reproduces the information from at least 2 kinds of optical information recording media, or records the information onto the optical information recording media, has: the first light source to emit the first light flux having the first wavelength $\lambda 1$; the second light source to emit the second light flux having the second wavelength $\lambda 2$ which is different from the first wavelength $\lambda 1$; the converging optical system including the objective lens to converge the fist light flux and the second light flux emitted from the first light source and the second light source onto the information recording surfaces through the transparent substrates of the first and the second optical information recording media; and the light detector receiving the reflected light from the first and the second optical information recording media, wherein the objective lens has the optical axis and diffraction portion, the diffraction portion has a plurality of areas, and the order numbers in which the plurality of areas most intensively generate respectively for the predetermined wavelength, are respectively not 0, and the absolute values are different from each other, the first light source emits the first light flux for reproducing the information from the first optical information recording medium having the first transparent substrate with the thickness t1, or for recording the information, the second light source emits the second light flux for reproducing the information from the second optical information recording medium having the second transparent substrate with the thickness t2 different from the thickness t1, or for recording the information, the converging optical system can converge the light flux from the first light source onto the information recording surface of the first optical information recording medium, under the condition in which the wave front aberration is not larger than 0.07 $\lambda 1$ rms in the predetermined numerical aperture NA1 on the image side of the objective lens necessary for recording or reproducing of the first optical information recording medium, by the light flux of-the wavelength $\lambda 1$, and can converge the light flux from the second light source onto the information recording surface of the second optical information recording medium, under the condition in which the wave front aberration is not larger than 0.07 $\lambda 2$ rms in the predetermined numerical aperture NA2 on the image side of the objective lens necessary for recording or reproducing of the second optical information recording medium, by the light flux of the wavelength $\lambda 2$, and further, satisfies the following conditions.

$$\lambda 1 < \lambda 2 \tag{14}$$

$$t1 < t2 \tag{15}$$

$$NA1 > NA2 \tag{16}$$

In the optical pick-up apparatus to conduct the recording and reproducing of the information by using the first and the second light flux whose numerical apertures NA1 and NA2 are different from each other, when the light flux outside the predetermined numerical aperture under the condition of use of the smaller numerical aperture side (NA2) is made the flare, the beam diameter is not too narrowed down without using the aperture limitation for the small numerical aperture (NA2), and the relatively large spot can be obtained. Accordingly, as in the present invention, when the objective lens provided with the diffracting ring-shaped band is used, because, even when the light flux of any numerical aperture is used, the appropriate spot can be formed, the optical pick-up apparatus to conduct the recording and reproducing of the information for the plurality of different kinds of optical information recording media such as, for example, CD and DVD, can be provided.

When more specifically explained, when, by using the blazed objective lens, the information is recorded or reproduced for the different optical information recording media, the spherical aberration is generated in the optical element having more than a predetermined numerical aperture, and can be made the flare, so that the same spot diameter as in the case where the optical element having a predetermined numerical aperture is used, can be obtained also by the light flux with the aperture diameter more than a predetermined numerical aperture. However, when the flare is converged in a narrow range, or the intensity is high, there is a possibility that it is erroneously detected by the detector as the focus signal or tracking signal.

When the diffracting ring-shaped band is provided by blazing the objective lens, the depth of the difference in level of the diffracting ring-shaped band is determined according to the diffraction order number by which the intensity is to be most enhanced, the wavelength of the incident light flux, and the incident angle of the light flux. This condition is a necessary condition when, on one optical surface, the ring-shaped bands to generate the diffraction light of different order numbers such as, for example,+ first light and+ second light are provided together. When the case in which the wavelength of the incident light flux or the incident angle of the light flux can be changed according to the position, is added to this, a condition that the ratio of the maximum value and minimum value of the difference in level of the diffracting ring-shaped band is larger than 1.5 times, is one of conditions necessary for adequately generating the diffraction light of different order numbers.

In the optical pickup apparatus, the diffraction portion of the optical element has the diffracting ring-shaped band in each of the plurality of areas, and most intensively generates the diffraction light of the first order (n1≠0) in the inside of a predetermined distance from the optical axis, and in its outside, most intensively generates the second order diffracted ray (n2≠0, and |n1|≠|n2|), which is different from the first order.

Further, in the present invention, in the inside of a predetermined distance from the optical axis, the fist order (n1≠0) diffraction light is most intensively generated, and a spot light satisfactorily narrowed-down can be obtained.

In the optical pickup apparatus, the diffraction portion of the optical element has the diffracting ring-shaped band for each of the plurality of areas, and the maximum value of the difference in level in the diffracting ring-shaped band and the minimum value of the difference in level are different by more than 1.5 times, thereby, in the inside of the predetermined distance from the optical axis, the diffraction light of the first order (n1≠0) is generated most intensively, and in its outside, the diffraction light of the second order, different from the first order (n2≠0, and |n1|≠|n2|), is generated most intensively.

When the diffracting ring-shaped band is provided by blazing the optical element such as the objective lens, the depth of the difference in level of the diffracting ring-shaped band is determined according to the diffraction order number by which the intensity is to be most enhanced, the wavelength of the incident light flux, and the incident angle of the light flux. This condition is a necessary condition when, in one optical surface, the ring-shaped bands to generate the diffraction light of the different order numbers such as, for example,+ fist order light and+ second order light, are provided with together. When the case where the wavelength of the incident light flux or the incident angle of the light flux can be changed according to the position is added to this, a condition that the ratio of the maximum value and minimum value of the difference in level of the diffracting ring-shaped band is larger than 1.5 times, is one of conditions necessary for adequately generating the diffraction light of different order numbers.

In the outside of the predetermined distance from the optical axis of the pick-up apparatus, the minimum pitch of the diffracting ring-shaped band in the effective diameter, is not smaller than 10 μm and not larger than 80 μm. This is because, when the minimum pitch is not smaller than 10 μm, the processing of the ring-shaped band becomes easy, and when it is not larger than 80 μm, the diffraction action can be effectively obtained.

The maximum vale of the difference in level and the minimum value of the difference in level of the optical pick-up apparatus are not different from each other more than 6 times. This is because, when the blazing is made so as to conform to the too high order diffracted ray, there is a possibility that the unnecessary order diffracted ray is image-formed near the necessary order diffracted ray for the information recording or reproducing and the bad influence is affected on it.

When the first order of the optical pick-up apparatus is n1, and the second order is n2, n1=1 and n2≧2 are realized (herein, the sign of the diffraction degree is determined such that a sign when the light flux is changed in the converging direction by the diffraction is positive).

In the optical pick-up apparatus, n2=2 is realized.

The diffracting ring-shaped band of the optical pick-up apparatus is blazed so that the diffraction efficiency becomes maximum for the first order diffracted ray of a predetermined wavelength in the inside of the predetermined distance from the optical axis, and it is blazed so that the diffraction efficiency becomes maximum for the second order diffracted ray of a wavelength different from the predetermined wavelength in the outside of a predetermined distance from the optical axis.

Because the converging optical system of the optical pick-up apparatus converges the light flux from the second light source onto the information recording surface of the second optical information recording medium under the condition that the wave front aberration is not smaller than 0.07 λ2 rms in the numerical aperture NA1, the larger flare light can be formed.

The predetermined distance of the diffraction portion in the objective lens of the optical pick-up apparatus is almost corresponding to a range through which the light flux of NA2 passes.

In the converging optical system of the optical pick-up apparatus, the spherical aberration is discontinuous at a predetermined distance from the optical axis for the light flux with the wavelength λ2.

The diffraction pattern (or diffraction surface, diffraction portion) used in the present specification means a configuration (or diffraction surface) in which a relief is provided on the surface of the optical element, for example, on the surface of the lens, and the action to converge or diverge the light flux by the diffraction is provided on it, and when one optical surface has an area in which the diffraction is generated, and an area in which no diffraction is generated, it means the area in which the diffraction is generated. As the shape of the relief, for example, on the surface of the optical element, it is formed as the almost concentric circular ring-shaped band around the optical axis, and when its cross section is viewed in the plane including the optical axis, although it is well known that each ring-shaped band has the saw-toothed shape, this relief includes such the shape.

In the present specification, the objective lens indicates, in a narrow sense, a lens having the light converging action located in opposite to the position on the most optical information recording medium side, in the condition the optical information recording medium is loaded on the optical pick-up apparatus, and in a broad sense, it indicates a lens group which can be operated at least in the optical axis direction by an actuator, together with that lens. Herein, such the lens group indicates lenses at least more than 1 element (for example, 2 elements). Accordingly, in the present specification, the numerical aperture NA on the optical information recording medium side of the objective lens indicates the numerical aperture NA of the lens surface positioned on the most optical information recording medium side of the objective lens. Further, the numerical aperture NA in the present specification, indicates a numerical aperture regulated by a standard of respective optical information recording medium, or a numerical aperture of the objective lens with the diffraction limit performance by which the spot diameter necessary for recording and reproducing the information can be obtained.

In the present specification, as an optical information recording medium (optical disk), for example, each CD such as CD-R, CD-RW, CD-Video, CD-ROM, each DVD such as DVD-ROM, DVD-RAM, DVD-R, DVD-RW, DVD-Video, or a disk-like present optical information recording medium such as MD, and the next generation recording medium, are included. The transparent substrate exists on the information recording surface of many optical information recording media. However, the medium whose transparent thickness is almost near 0, or in which there is no transparent substrate, also exists or is proposed. For the convenience of the explanation, in the present specification, although there is a case in which [through the transparent substrate] is described, such the transparent substrate includes also a case where the thickness is 0, that is, no transparent substrate exists.

In the present specification, recording and reproducing of the information, means recording the information onto the information recording surface of the information recording medium as described above, and reproducing the information recorded on the information recording surface. The optical pick-up apparatus of the present invention may be the apparatus used only for recording or reproducing, or may be the apparatus used for conducting the both of recording and reproducing. Further, the optical pick-up apparatus may be the apparatus used for conducting the recording for some information recording medium, and the apparatus used for conducting the reproducing for the other information recording medium, or may be the apparatus used for conducting the recording or reproducing for some information recording medium, and for conducting the recording and reproducing for the other information recording medium. Incidentally, the reproducing used herein, includes simply reading out the information.

The optical pick-up apparatus in the present invention can be mounted in an audio and/or an image recording and/or reproducing apparatus of each kind of player or drive, or an AV apparatus in which these are assembled, personal computer, or other information terminal equipments. It is preferable that these recording and/or reproducing apparatus have spindle motors or the like.

Referring to the drawings, preferred embodiments of the present invention will be described below. The diffraction surface is expressed by a mother aspherical surface showing the macro shape from which the diffraction relief is removed, and the optical path difference function. The optical path difference function expresses the optical path difference added by the diffraction surface for the fist order diffracted ray with the reference wavelength, and the diffracting ring-shaped band is provided every time when the value of the optical path difference function is changed by $m\lambda$ (m is the diffraction order number).

In an example of the present invention, the mother aspherical surface of the diffraction surface and the optical path difference function are expressed by respectively other functions in the inside (optical axis side) and the outside (peripheral side) by defining the distance hb from the optical axis as a border.

In this case, constant terms are provided in the outside mother aspherical surface and the outside optical path difference function so that the mother aspherical surface and the optical path difference function are practically continuous. The optical path difference function $\Phi(h)$ is expressed by the following expression.

$$\Phi(h) = b0 + b2\ h^2 + b4\ h^4 + b6\ h^6 + \quad (17)$$

Where, h: distance from the optical axis,
b0, b2, b4, b6: coefficients of the optical path difference function.

On the one hand, the aspherical surface is expressed by the following expression.

$$X = (h^2/r)/(1+\sqrt{(1-(1+k)h^2/r^2)}) + A0 + A2 \times h^2 + A4 \times h^4 + A6 \times h^6 + \quad (18)$$

Where, A0, A2, A4, A6, . . . : aspherical surface coefficient,
k: conical coefficient,
r: paraxial radius of curvature,
r, d, n, vd respectively express the radius of curvature of the lens, spacing, refractive index in the reference wavelength, and Abbe's number.

When the above definition is based on, by making the second order coefficient of the optical path difference function a value of not zero, the lens can be caused to have the power. Further, when the coefficient of other than the second order of the optical path difference function, for example, the 4-th order coefficient, the 6-th order coefficient, the 8-th order coefficient, the 10-th order coefficient, etc., are made values of not zero, the spherical aberration can be controlled. Incidentally, [to control] means that the spherical aberration possessed by a portion having the refractive power is corrected by generating the reverse spherical aberration, or the spherical aberration of the whole is made to a desired value.

FIG. 1 is a outline structural view of the optical pick-up apparatus according to the present invention. In FIG. 1, the optical pick-up apparatus has the first light source 11 to conduct the recording and/or reproducing for the first optical information recording medium (optical disk, for example, CD), and the second light source 12 whose wavelength is different from that of the first light source 11, to conduct the recording and/or reproducing for the second optical information recording medium, and has coupling lenses 21, 22 to convert the divergence angles of the divergence light flux emitted from respective light sources to the desired divergence angles, a beam splitter 62, which is an optical composition means, to compose the light flux so that the light flux advances to almost one direction, an objective lens 3 to converge the light flux from the beam splitter 62 onto the information recording surface 5 of the optical information recording medium, and light detectors 41 and 42 as the light receiving means for light receiving the reflected light from the optical information recording medium. In the drawing, numeral 8 is an aperture, numeral 9 is a cylindrical lens, numerals 71 and 72 are ¼ wavelength plates, numeral 15 is a coupling lens to reduced the divergent order number of the divergent light flux from the light source 11, numeral 16 is a concave lens, and numeral 17 is a hologram to separate the reflected light flux. The objective lens 3 uses examples 1–3, which will be described later.

The first light source 11 emits the laser light of the wavelength $\lambda 1$=about 635 or 650 nm, and in this case, the numerical aperture of the objective lens necessary for recording and/or reproducing for the optical information recording medium (DVD) whose transparent substrate thickness t1 is 0.6 mm is NA1=0.6–0.65. The second light source 12 emits the laser light of the wavelength $\lambda 2$=about 780 nm, and in this case, the numerical aperture of the objective lens necessary for recording and/or reproducing for the optical information recording medium (CD) whose transparent substrate thickness t2 is 1.2 mm is NA2=0.5.

In order to obtain an objective lens which can cope with the information recording media whose thickness are different, in the high NA objective lens in the present embodiment, the role of the diffraction surface is the correction of the spherical aberration, and the correction of the spherical aberration is as follows.

In the present embodiment, the position of the object point to the recording medium whose transparent substrate thickness is t1, is equal to the position of the object point to the recording medium whose transparent substrate thickness is t2, and because the parallel light both of which are collimated, are entered into, for example, the objective lens, the spherical aberration due to the difference of the substrate thickness is corrected by only the action of the diffraction surface. In the present example, the spherical aberration is decreased to the range of the numerical aperture NA2 necessary for the recording medium with transparent substrate thickness t2, and the spherical aberration is increased in the range from the numerical aperture NA1 to the numerical aperture NA2.

EXAMPLE 1

Figure 2:
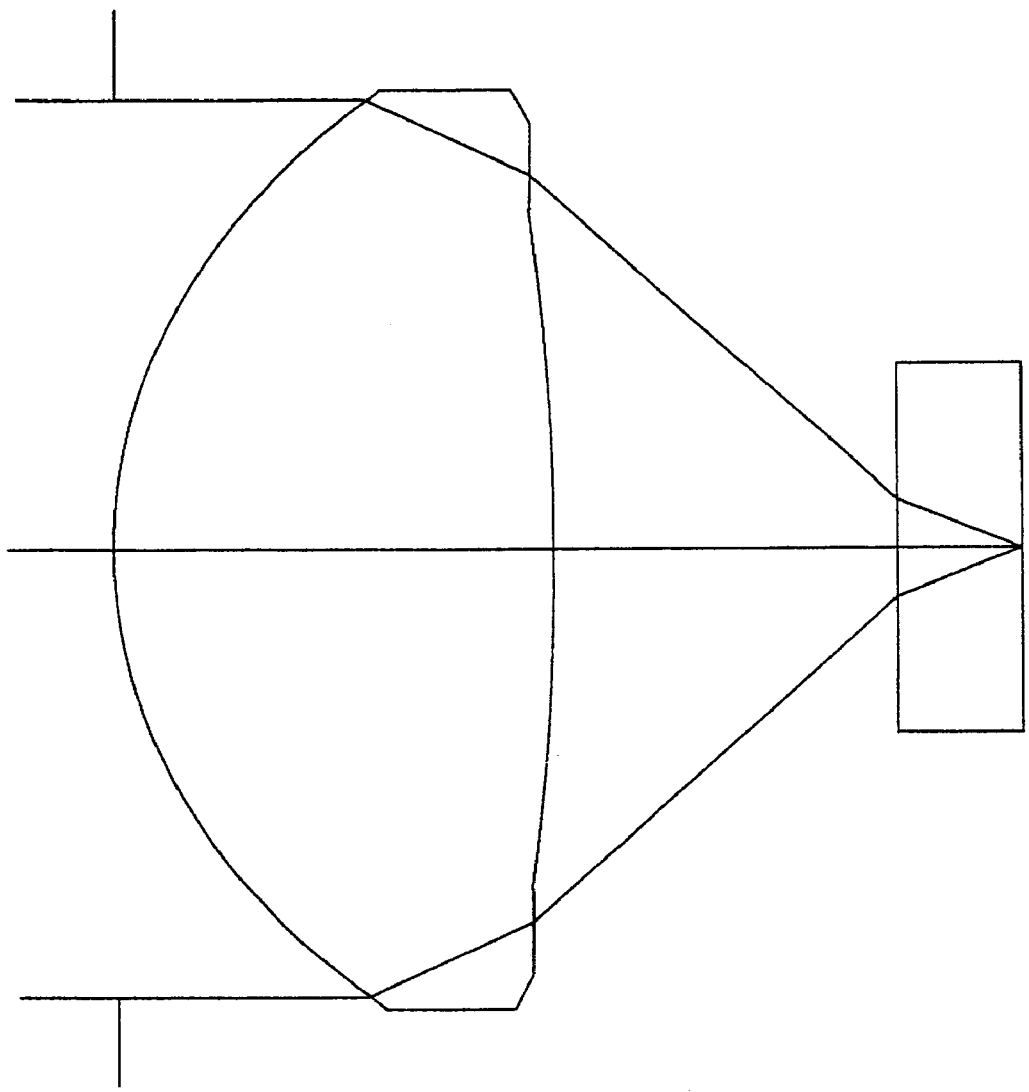
FIG. 2 is a sectional view of an objective lens of an example 1.
Figure 3A:
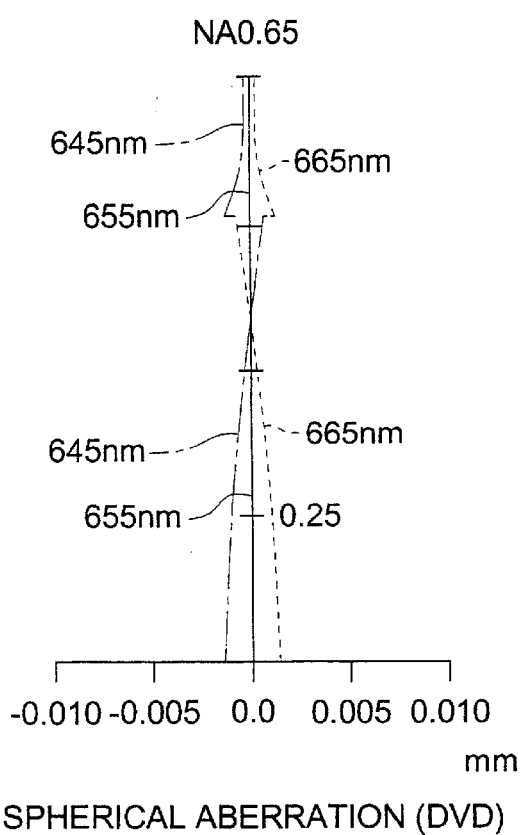
FIG. 3 is a view of the spherical aberration in the objective lens of the example 1.
Figure 3B:
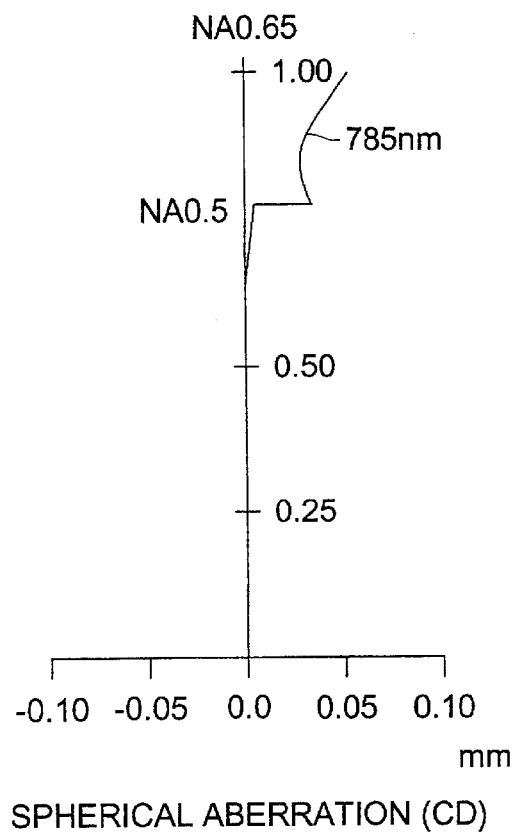

FIG. 2 is a sectional view of the objective lens in Example 1, and FIG. 3 is a view of the spherical aberration in the objective lens of Example 1. In [Table 1] and [Table 2], the lens data in the objective lens in Example 1 is shown.

TABLE 1

Example 1
When the light source wavelength λ = 655 nm,
the focal distance f = 3.30,
the image side numerical aperture NA = 0.65.
When the light source wavelength λ = 765 nm,
the focal distance f = 3.32,
the image side numerical aperture NA = 0.65
(the predetermined numerical aperture NA = 0.50).

| Surface No. | R | d1 | d2 | n1 | n2 |
|---|---|---|---|---|---|
| Object point | ∞ | ∞ | | | |
| 1 (Aspherical surface 1. diffraction surface) | | 2.162 | 2.162 | 1.54094 | 1.53716 |
| 2 (Aspherical surface 2) | −8.64906 | 1.700 | 1.333 | | |
| 3 (Cover glass) | ∞ | 0.6 | 1.2 | 1.57752 | 1.57063 |
| 4 | ∞ | | | | |

Suffix 1 shows, when λ = 655 nm, suffix 2 shows, when λ = 785 nm.

TABLE 2

The border hb = 1.65
Coefficient of the optical
path difference function
(reference wavelength 655 nm)

| when h ≦ hb, | | when h > hb, | |
|---|---|---|---|
| b2 = | −0.90137 × 10⁻³ | b0 = | −0.0793441 |
| b4 = | −0.12517 × 10⁻² | b2 = | 0.61855 × 10⁻¹ |
| b6 = | 0.54827 × 10⁻⁴ | b4 = | −0.17852 × 10⁻² |
| b8 = | 0.76421 × 10⁻⁴ | b6 = | 0.99951 × 10⁻³ |
| b10 = | 0.12314 × 10⁻⁴ | b8 = | 0.23885 × 10⁻³ |
| | | b10 = | −0.26822 × 10⁻⁴ |

Aspherical surface coefficient
The first surface

| R = | 2.06662 | R = | 1.52802 |
|---|---|---|---|
| k = | −2.1785 | k = | −0.91976 |
| A4 = | 0.22441 × 10⁻¹ | A0 = | −0.13075 |
| A6 = | 0.20770 × 10⁻² | A4 = | −0.48823 × 10⁻² |
| A8 = | 0.14338 × 10⁻³ | A6 = | −0.64888 × 10⁻² |
| A10 = | −0.12295 × 10⁻⁴ | A8 = | 0.20046 × 10⁻² |
| | | A10 = | −0.15944 × 10⁻³ |

Aspherical surface coefficient
the second surface

| k = | 11.484077 |
|---|---|
| A4 = | 0.23249 × 10⁻¹ |
| A6 = | −0.12244 × 10⁻¹ |
| A8 = | 0.68099 × 10⁻² |
| A10 = | −0.22155 × 10⁻² |
| A12 = | −0.37295 × 10⁻³ |
| A14 = | −0.25121 × 10⁻⁴ |

EXAMPLE 2

Figure 4:
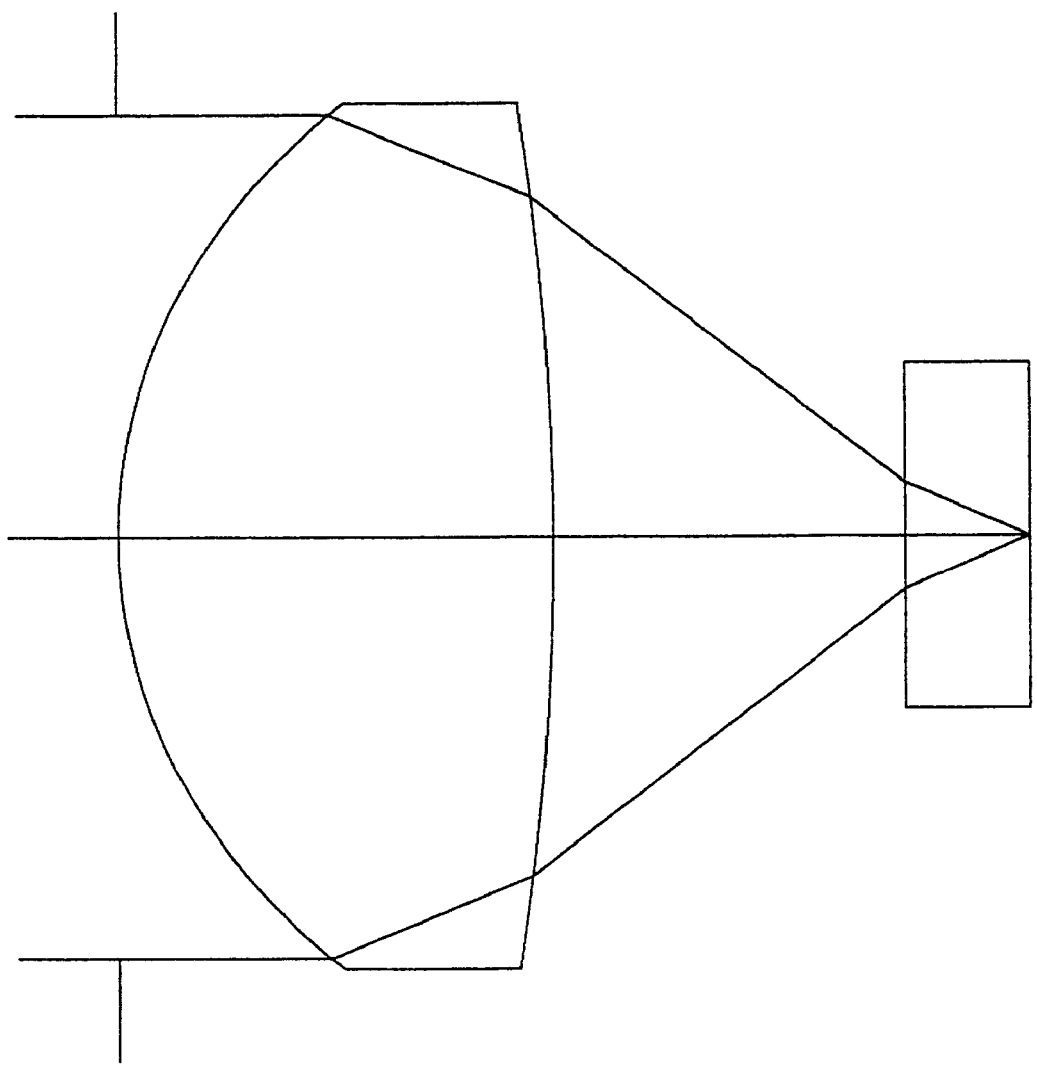
FIG. 4 is a sectional view of the objective lens of an example 2.
Figure 5A:
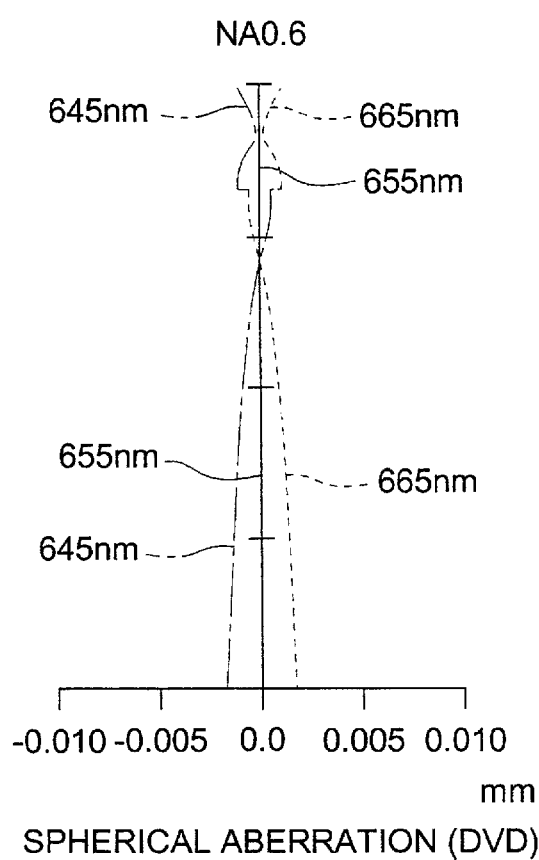
FIG. 5 is a view of the spherical aberration in the objective lens of the example 2.
Figure 5B:
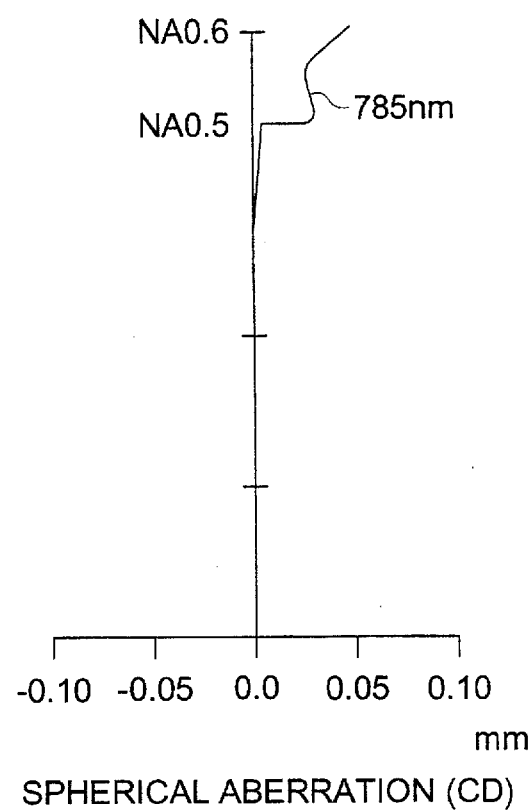

FIG. 4 is a sectional view of the objective lens in Example 2, and FIG. 5 is a view of the spherical aberration in the objective lens of Example 2. In [Table 3] and [Table 4], the lens data in the objective lens in Example 2 is shown.

TABLE 3

Example 2
When the light source wavelength λ = 655 nm,
the focal distance f = 3.30,
the image side numerical aperture NA = 0.60.
When the light source wavelength λ = 785 nm,
the focal distance f = 3.32,
the image side numerical aperture NA = 0.60
the predetermined numerical aperture NA = 0.50).

| Surface No. | R | d1 | d2 | n1 | n2 |
|---|---|---|---|---|---|
| Object point | ∞ | ∞ | | | |
| 1 (Aspherical surface 1. diffraction surface) | | 2.181 | 2.181 | 1.54094 | 1.53716 |
| 2 (Aspherical surface 2) | 1.700 | 1.323 | | | |
| 3 (Cover glass) | ∞ | 0.6 | 1.2 | 1.57685 | 1.57063 |
| 4 | ∞ | | | | |

Suffix 1 shows, when λ = 655 nm, suffix 2 shows, when λ = 785 nm.

TABLE 4

The border hb = 1.65
Coefficient of the optical
path difference function
(reference wavelength 655 nm)

| when h ≦ hb, | | when h > hb, | |
|---|---|---|---|
| b2 = | −0.77691 × 10⁻³ | b0 = | −0.0925447 |
| b4 = | −0.16290 × 10⁻² | b2 = | 0.70909 × 10⁻¹ |
| b6 = | 0.39401 × 10⁻³ | b4 = | −0.18427 × 10⁻² |
| b8 = | −0.20267 × 10⁻³ | b6 = | 0.52259 × 10⁻³ |
| b10 = | 0.28756 × 10⁻⁴ | b8 = | 0.21840 × 10⁻³ |
| | | b10 = | −0.49381 × 10⁻⁴ |

Aspherical surface coefficient
The first surface

| R = | 2.08327 | R = | 1.43101 |
|---|---|---|---|
| k = | −2.4485 | k = | −0.95641 |
| A4 = | 0.24419 × 10⁻¹ | A0 = | −0.16212 |
| A6 = | −0.24902 × 10⁻² | A4 = | −0.85090 × 10⁻² |
| A8 = | 0.14857 × 10⁻³ | A6 = | −0.69174 × 10⁻² |
| A10 = | 0.24122 × 10⁻⁵ | A8 = | 0.19751 × 10⁻² |
| | | A10 = | −0.14154 × 10⁻³ |

Aspherical surface coefficient
the second surface

| k = | 12.82817 |
|---|---|
| A4 = | 0.22016 × 10⁻¹ |
| A6 = | −0.10662 × 10⁻¹ |
| A8 = | 0.61056 × 10⁻² |
| A10 = | −0.22180 × 10⁻² |
| A12 = | −0.42245 × 10⁻³ |

Figure 6:
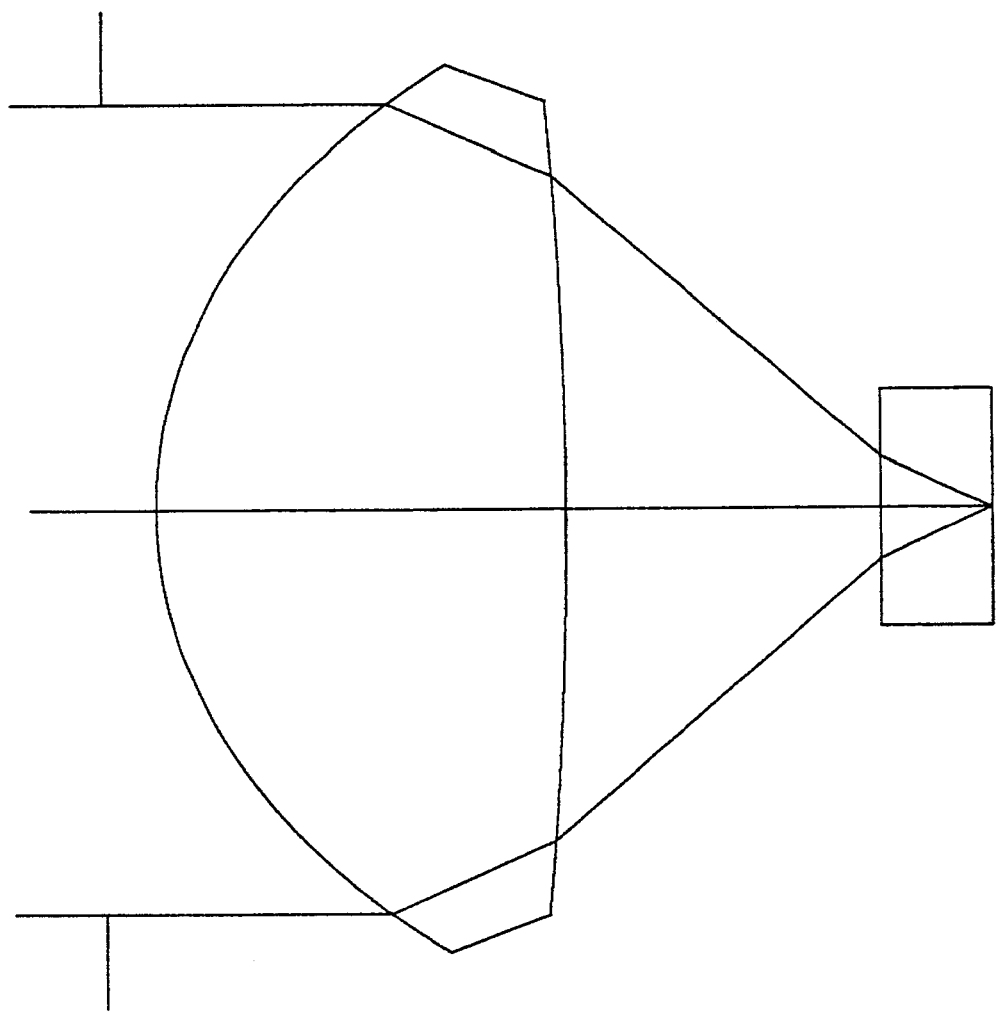
FIG. 6 is a sectional view of the objective lens of an example 3.
Figure 7:
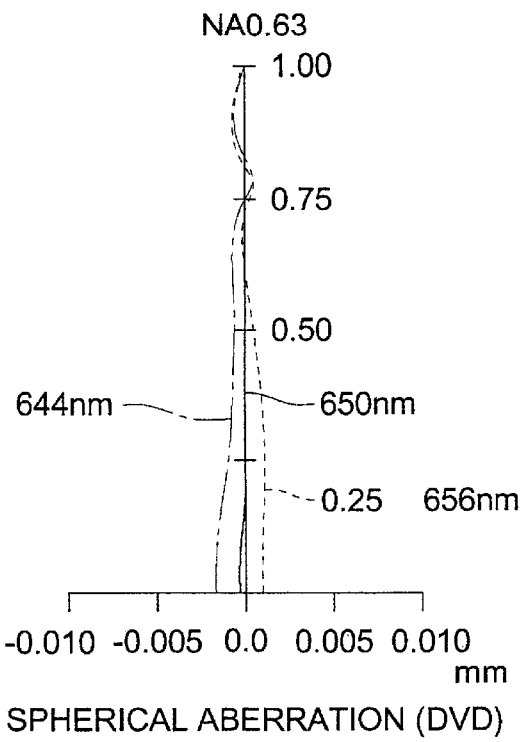
FIG. 7 is a view of the spherical aberration in the objective lens in example 3.
Figure 7:
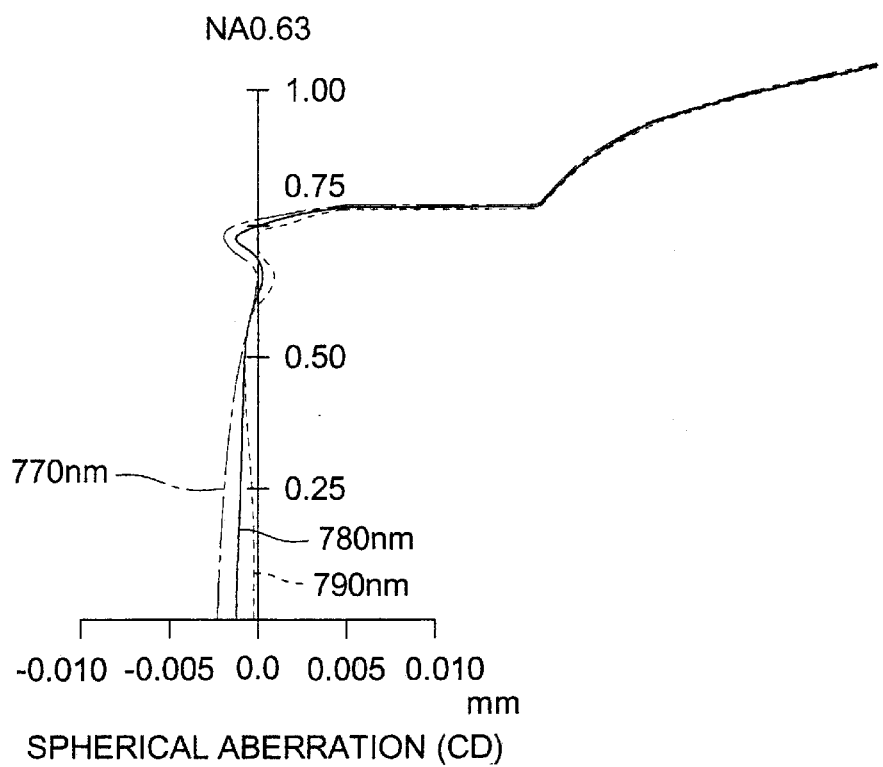

FIG. 6 is a sectional view of the objective lens in Example 3, and FIG. 7 is a view of the spherical aberration in the objective lens of Example 3, FIG. 7(*a*) is an aberration view in the information recording/reproducing condition of the DVD, and FIG. 7(*b*) is an aberration view in the information recording/reproducing condition of the CD. In [Table 5] and [Table 6], the lens data in the objective lens in Example 3 is shown.

TABLE 5

Example 3
When the light source wavelength λ = 650 nm,
the focal distance f = 3.36,
the image side numerical aperture NA = 0.63.
When the light source wavelength λ = 780 nm,
the focal distance f = 3.38,
the image side numerical aperture NA = 0.63
(the predetermined numerical aperture NA = 0.50).

| Surface No. | R | d1 | d2 | n1 | n2 |
|---|---|---|---|---|---|
| Object point | | ∞ | ∞ | | |
| 1 (Aspherical surface 1. diffraction surface) | | 2.20 | 2.20 | 1.54113 | 1.53728 |
| 2 (Aspherical surface 2) | −8.52459 | 1.75 | 1.38 | | |
| 3 (Cover glass) | ∞ | 0.6 | 1.2 | 1.57084 | 1.57787 |
| 4 | ∞ | | | | |

Suffix 1 shows, when λ = 650 nm, suffix 2 shows, when λ = 780 nm.

TABLE 6

The border hb = 1.68
Coefficient of the optical
path difference function
(reference wavelength 710 nm)

| when h ≤ hb, | | when h > hb, | |
|---|---|---|---|
| b2 = | 0 | b0 = | −0.1396 × 10⁻³ |
| b4 = | −0.14329 × 10⁻² | b2 = | −0.17465 × 10⁻² |
| b6 = | 0.13442 × 10⁻³ | b4 = | −0.13463 × 10⁻² |
| b8 = | −0.66304 × 10⁻⁴ | b6 = | 0.32320 × 10⁻³ |
| b10 = | 0.56136 × 10⁻⁵ | b8 = | −0.56666 × 10⁻⁴ |
| | | b10 = | 0.34433 × 10⁻⁵ |

Aspherical surface coefficient
The first surface

| k = | −2.5093 | k = | −0.41071 |
|---|---|---|---|
| A4 = | 0.25830 × 10⁻¹ | A0 = | 0.168 × 10⁻³ |
| A6 = | −0.29872 × 10⁻² | A4 = | 0.13119 × 10⁻¹ |
| A8 = | 0.34107 × 10⁻³ | A6 = | −0.66292 × 10⁻² |
| A10 = | −0.23030 × 10⁻⁴ | A8 = | 0.13863 × 10⁻² |
| | | A10 = | −0.12236 × 10⁻³ |

Aspherical surface coefficient
the second surface

| k = | 8.53682 |
|---|---|
| A4 = | 0.250210 × 10⁻¹ |
| A6 = | −0.140613 × 10⁻¹ |
| A8 = | 0.689092 × 10⁻² |
| A10 = | −0.205553 × 10⁻² |
| A12 = | −0.327714 × 10⁻³ |
| A14 = | −0.216581 × 10⁻⁴ |

In [Table 7], the data in Examples 1, 2 and 3, which satisfy above each of conditional expressions, are collectively shown. Incidentally, in the table, for example, $P_i$ shows the pitch in the i-th ring-shaped band.

TABLE 7

| | Example 1 | Example 2 | Example 3 |
|---|---|---|---|
| Pi + 1 | 80 μm (i = 20) | 71 μm (i = 20) | 37 μm (i = 16) |
| Pi | 22 μm (i = 20) | 22 μm (i = 20) | 24 μm (i = 16) |
| Pi + 1/Pi | 3.6 | 3.2 | 1.5 |
| Whole ring band number | 35 | 28 | 32 |

TABLE 7-continued

| | Example 1 | Example 2 | Example 3 |
|---|---|---|---|
| Number of ring band through which the light ray of NA 0.60 passes | 29 | 28 | 28 |
| Spherical aberration (λ rms) | | | |
| λ1, t1, NA1 | 0.000 | 0.000 | 0.002 |
| λ2, t2, NA2 | 0.015 | 0.015 | 0.015 |
| λ2, t2, NA1 | (more than 0.07) | (more than 0.07) | (more than 0.07) |

As shown in Examples 1 to 3, in order to conduct the recording reproducing of the second optical information recording medium, in the case where the converging optical system converges the second light flux onto the second information recording surface, when the spherical aberration has at least one discontinuous portion or practically discontinuous portion, it can be prevented that the unnecessary light is irradiated onto the light detector, thereby, the detection accuracy can be increased.

Figure 10:
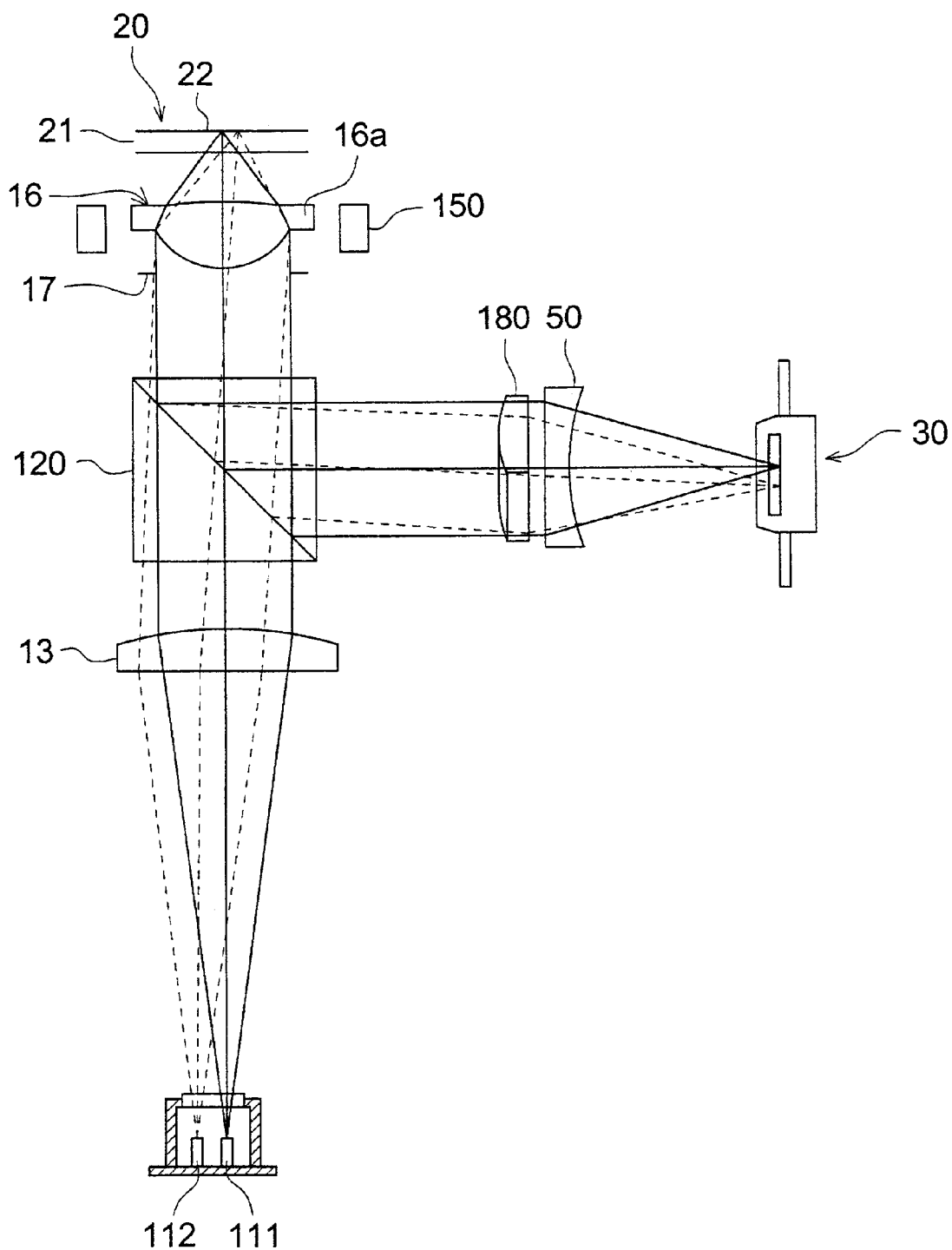
FIG. 10 is a view of an optical path showing the structure of an optical pick-up apparatus of an embodiment according to the present invention.

Referring to the drawings, the optical pick-up apparatus of the referred embodiment of the present invention will be described below. FIG. 10 is a view showing an outline structure of the objective lens and the optical pick-up apparatus including the objective lens of the present embodiment.

The optical pick-up apparatus in FIG. 10 is structured such that, for example, in both of the CD and DVD as the optical information recording medium, the information is read from the information recording surface by the light whose wavelengths are 650 nm and 780 nm, from the first and second light sources.

As shown in FIG. 10, in the optical pick-up apparatus, the first semiconductor laser 111 to emit the light of the wavelength 650 nm for the DVD, and the second semiconductor laser 112 to emit the light of the wavelength 780 nm for the CD, are formed into a unit as the light source. A beam splitter 120 is arranged between a collimator 13 and an objective lens 16, and the light which is made almost parallel by the collimator 13, passes through the beam splitter 120 and advances to the objective lens 16. Further, the optical path is changed by the beam splitter 120 as the optical path changing means such that the light flux reflected from the information recording surface 22 of the optical disk 20 having the transparent substrate 21 advances to the light detector 30. The objective lens 16 has a flange portion 16a on its outer periphery, and by the flange portion 16a, the objective lens 16 can be easily attached to the optical pick-up apparatus. Further, because the flange portion 16a has the surface extending in almost perpendicular direction to the optical axis of the objective lens 16, further high accurate attachment can be easily conducted.

When the first optical disk. (DVD) is reproduced, as shown by a solid line in the drawing, the light flux emitted from the first semiconductor laser 111 passes through the collimator lens 13 and becomes the parallel light flux. Further, the light flux passes through the beam splitter 120, and is narrowed down by the aperture 17, and converged onto the information recording surface 22 through the transparent substrate 21 of the first optical disk 20 by the objective lens 16. Then, the light flux modulated by the information pits and reflected on the information recording surface 22, is reflected again by the beam splitter 120 through the objective lens 16 and the aperture 17, and the astigmatism is given by the cylindrical lens 180, and through the concave lens 50, the light flux is incident on the light detector 30, and by using the signal outputted from the light detector 30, the read out signal of the information recorded on the first optical disk 20 is obtained.

Further, the change of the light amount due to the change of the shape and the change of the position of the spot on the light detector 30 is detected, and the focusing detection and track detection is conducted. According to the detection, the two-dimensional actuator 150 moves the objective lens 16 so that the light flux from the first semiconductor laser 111 is image-formed onto the information recording surface 22 of the first optical disk 20, and moves the objective lens 16 so that the light flux from the first semiconductor laser 111 is image-formed onto a predetermined track.

Next, when the second optical disk (CD) is reproduced, as shown by a broken line in the drawing, the light flux emitted from the second semiconductor laser 112 passes through the collimator lens 13 and becomes the parallel light flux. Further, the light flux passes through the beam splitter 120, and is narrowed down by the aperture 17, and converged onto the information recording surface 22 through the transparent substrate 21 of the second optical disk 20 by the objective lens 16. Then, the light flux modulated by the information pits and reflected on the information recording surface 22, is reflected by the beam splitter 120 through the objective lens 16 and the aperture 17 again, and the astigmatism is given by the cylindrical lens 180, and through the concave lens 50, the light flux is incident on the light detector 30, and by using the signal outputted from the light detector 30, the read out signal of the information recorded on the second optical disk 20 is obtained. Further, the change of the light amount due to the change of the shape and the change of the position of the spot on the light detector 30 is detected, and the focusing detection and track detection is conducted. According to the detection, the two-dimensional actuator 150 moves the objective lens 16 so that the light flux from the second semiconductor laser 112 is image-formed onto the information recording surface 22 of the second optical disk 20, and moves the objective lens 16 so that the light flux from the second semiconductor laser 112 is image-formed onto a predetermined track.

The objective lens 16 in FIG. 10 is a single lens provided with the diffraction pattern, and the third order spherical aberration component of the wave front aberration is excessive (over correction), when a portion whose numerical aperture on the optical disk side is not larger than NA2, in the light flux from the second semiconductor laser 112 passed through the objective lens, passes through the transparent substrate of the second optical disk, and the objective lens 16 is designed such that, when its absolute value is WSA2 λ2 rms, 0.02 λ2 rms ≦ WSA2 ≦ 0.06 λ2 rms, and there is a residual aberration in this range. Incidentally, NA1 is the necessary numerical aperture on the first optical disk side, and NA2 is the necessary numerical aperture on the second optical disk side.

Further, each diffraction light generated when the light flux from the first semiconductor laser 111 and the second semiconductor laser 112 passes, is the diffraction light of the same order number other than 0 order. The image formation magnification M1 on the optical disk side of the objective lens 16 at the time of the reproduction of the first optical disk, and the image formation magnification M2 on the optical disk side of the objective lens 16 at the time of the reproduction of the second optical disk, are almost equal, and almost 0. Therefore, in the optical pick-up apparatus in FIG. 10, the light detector can be only 1, and further, the first semiconductor laser 111 and the second semiconductor laser 112 can be structured as an integrated part, and can be formed into a unit.

Incidentally, in FIG. 10, although the first optical disk is the DVD (light source wavelength is 650 nm), and the second optical disk is the CD (light source wavelength is 780 nm), the present invention is not limited to this, but, for example, the first optical disk may be the next generation high density optical disk ((light source wavelength is 400 nm), and the second optical disk may be the DVD (light source wavelength is 650 nm).

Next, the above objective lens will be described. The converging optical system in the present embodiment is a single lens of both side aspheical surfaces, and the diffracting ring-shaped band (ring-shaped band-like diffraction surface) is provided as the diffraction pattern on one aspherical surface.

That is, the refractive surface of the objective lens is formed into the aspherical surface shape expressed by the following [Equation 1].

$$Z = \frac{h^2/R_0}{1+\sqrt{1-(1+\kappa)(h/R_0)^2}} + \sum_{i=1}^{\infty} A_i h^{P_i u} \qquad \text{[Equation 1]}$$

Where, Z is an axis in the optical axis direction, h is an axis in the perpendicular direction to the optical axis (height from the optical axis: the advancing direction of the light is positive), R0 is a paraxial radius of curvature, κ is a conical coefficient, Ai is an aspherical coefficient, and Pi is the exponent of the aspherical surface.

Further, generally, the pitch of the diffracting ring-shaped band is defined by using the phase difference function or the optical path difference function. Specifically, the phase difference function ΦB is expressed by the following [Equation 2] in the unit of radian, and the optical path difference function Φb is expressed by the following [Equation 3] in the unit of mm. Incidentally, the optical path difference function is for the first reference wavelength λ1.

$$\Phi B = \sum_{i=1}^{\infty} B_{2i} h^{2i} \qquad \text{[Equation 2]}$$

$$\Phi b = \sum_{i=1}^{\infty} b_{2i} h^{2i} \qquad \text{[Equation 3]}$$

These 2 expression methods are different in the unit, but, in the meaning to express the pitch of the diffracting ring-shaped band, these are equal. That is, for the main wavelength λ (mm unit), when the coefficient B of the phase difference function is multiplied by λ/2π, it can be converted into the coefficient b of the optical path difference function, and inversely, when the coefficient b of the optical path difference function is multiplied by 2π/λ, it can be converted into the coefficient B of the phase difference function.

Next, as specific examples of the objective lens according to the present embodiment, examples 1, 2, 3 and 4 will be described. Each of examples is a single lens, and each single lens has the satisfactory image formation performance for the first reference wavelength λ1=650 nm, focal distance f=3.3 mm, numerical aperture NA1=0.6, transparent substrate thickness of the first optical disk t1=0.6 mm, and the second reference wavelength λ2=780 nm, numerical aperture NA2=0.45, and transparent substrate thickness of the of the second disk t2=1.2 mm. Further, for the first reference wavelength λ1 of the short wavelength, and the transparent substrate thickness t1, it is almost no aberration.

Incidentally, the image side in the following, means the optical information recording medium side.

EXAMPLE 4

The lens data of Example 4 is shown in Table 8. Incidentally, in the following Table 8–Table 11, for example, [2.2E−02] means [2.2×10$^{-2}$].

TABLE 8 f = 3.30  NA = 0.60
Reference wavelength 1: λ = 650 nm
Reference wavelength 2: 780 nm

| i | ri | d1i | d2i | material |
|---|---|---|---|---|
| 1 | ∞ | ∞ | ∞ | |
| 2 | 2.129441 | 2.2 | 2.2 | Olefinic resin |
| 3 | −7.926982 | 1.710 | 1.346 | |
| 4 | ∞ | 0.6 | 1.2 | PC |

Aspherical surface data
The second surface aspherical surface coefficient

| k = | −6.4076106E−01 | | |
|---|---|---|---|
| A1 = | 8.7771931E−04 | P1 | 4.0 |
| A2 = | −1.1822482E−04 | P2 | 6.0 |
| A3 = | 8.7454145E−05 | P3 | 8.0 |
| A4 = | −2.8067977E−05 | P4 | 10.0 |

Optical path difference function

| B2 = | 0.0000000E+00 |
|---|---|
| B4 = | −6.3249197E−04 |
| B6 = | −3.9811935E−05 |
| B8 = | −3.1571369E−06 |

The third surface aspherical surface coefficient

| k = | −2.0640628E+01 | | |
|---|---|---|---|
| A1 = | 1.1494445E−02 | P1 | 4.0 |
| A2 = | −3.1428889E−03 | P2 | 6.0 |
| A3 = | 2.1271773E−04 | P3 | 8.0 |
| A4 = | 9.1906090E−06 | P4 | 10.0 |

Figure 11:
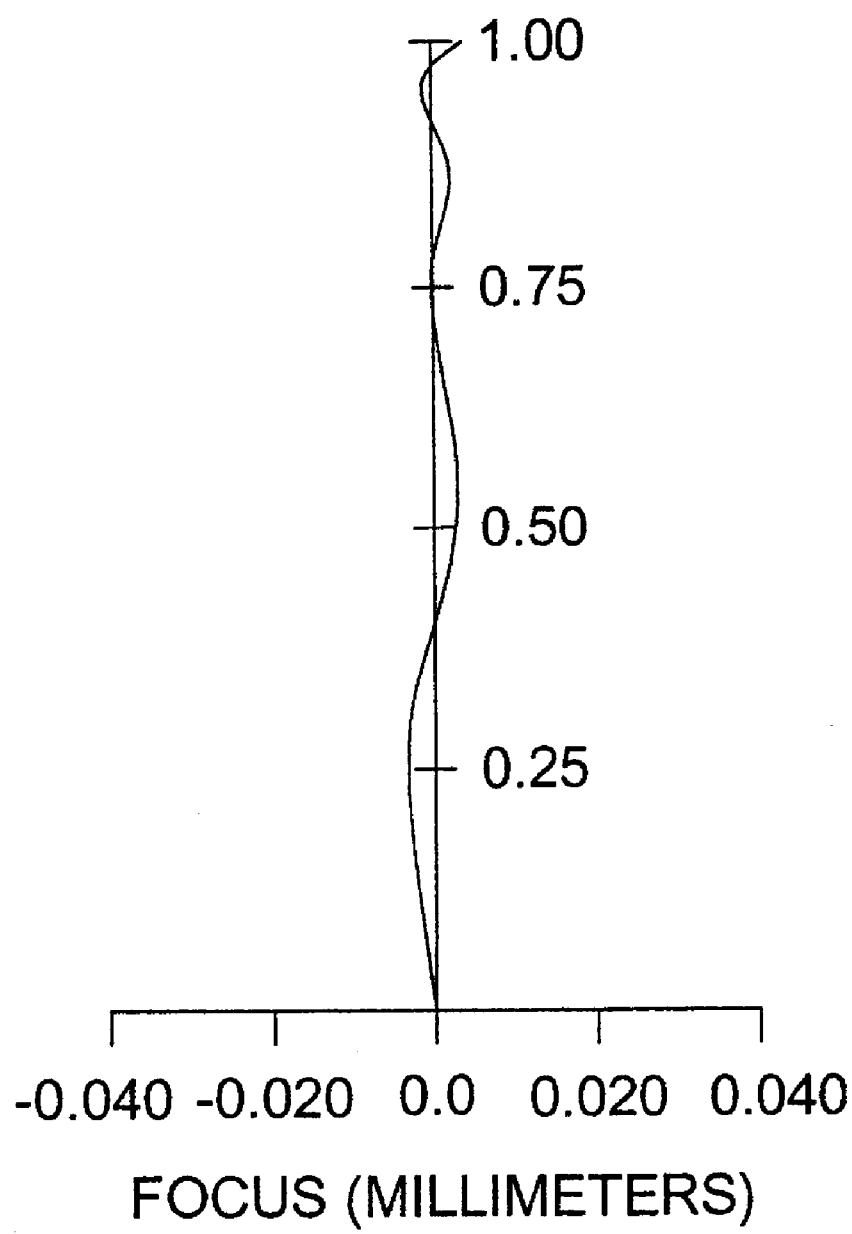
FIG. 11 is a view of the spherical aberration of the objective lens for the first reference wavelength $\lambda 1=650$ nm in an example 4 according to an embodiment of the present invention.
Figure 12:
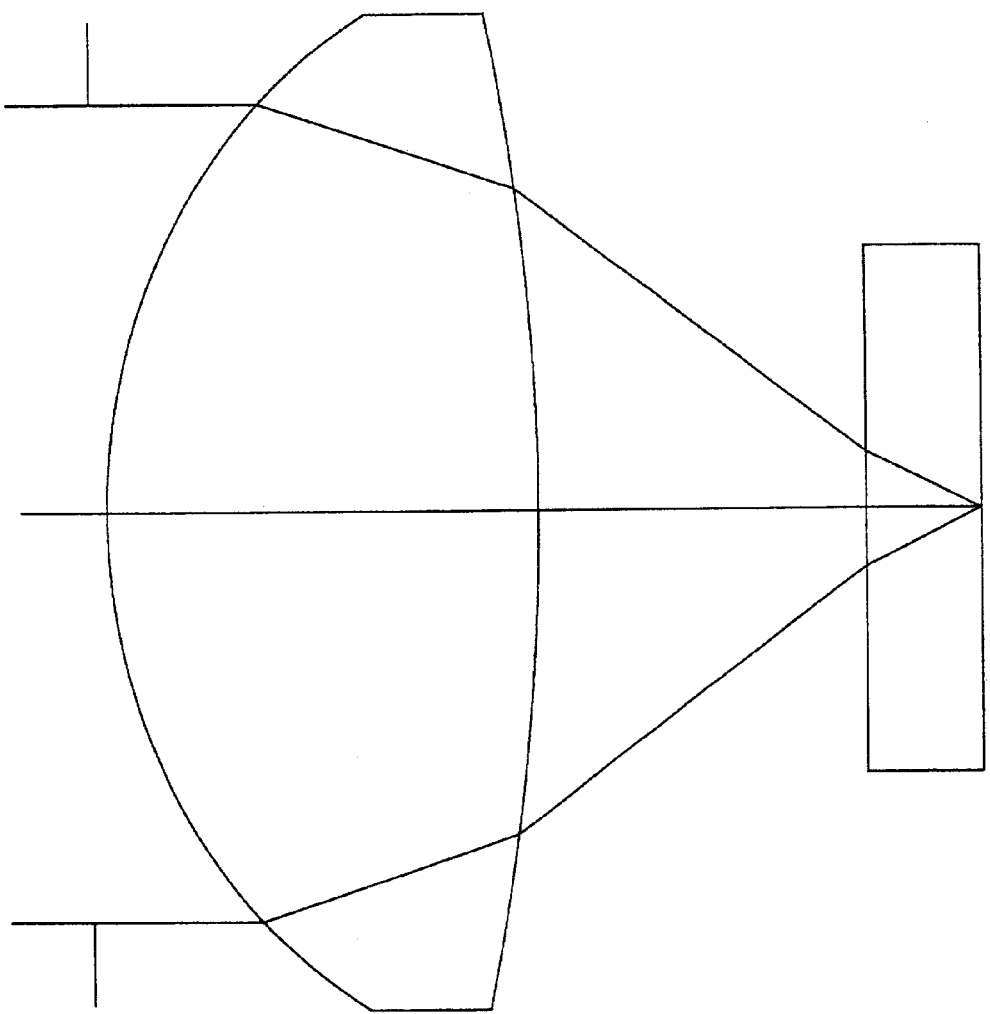
FIG. 12 is a view of an optical path in the case of FIG. 11 of the objective lens in the example 4.
Figure 13:
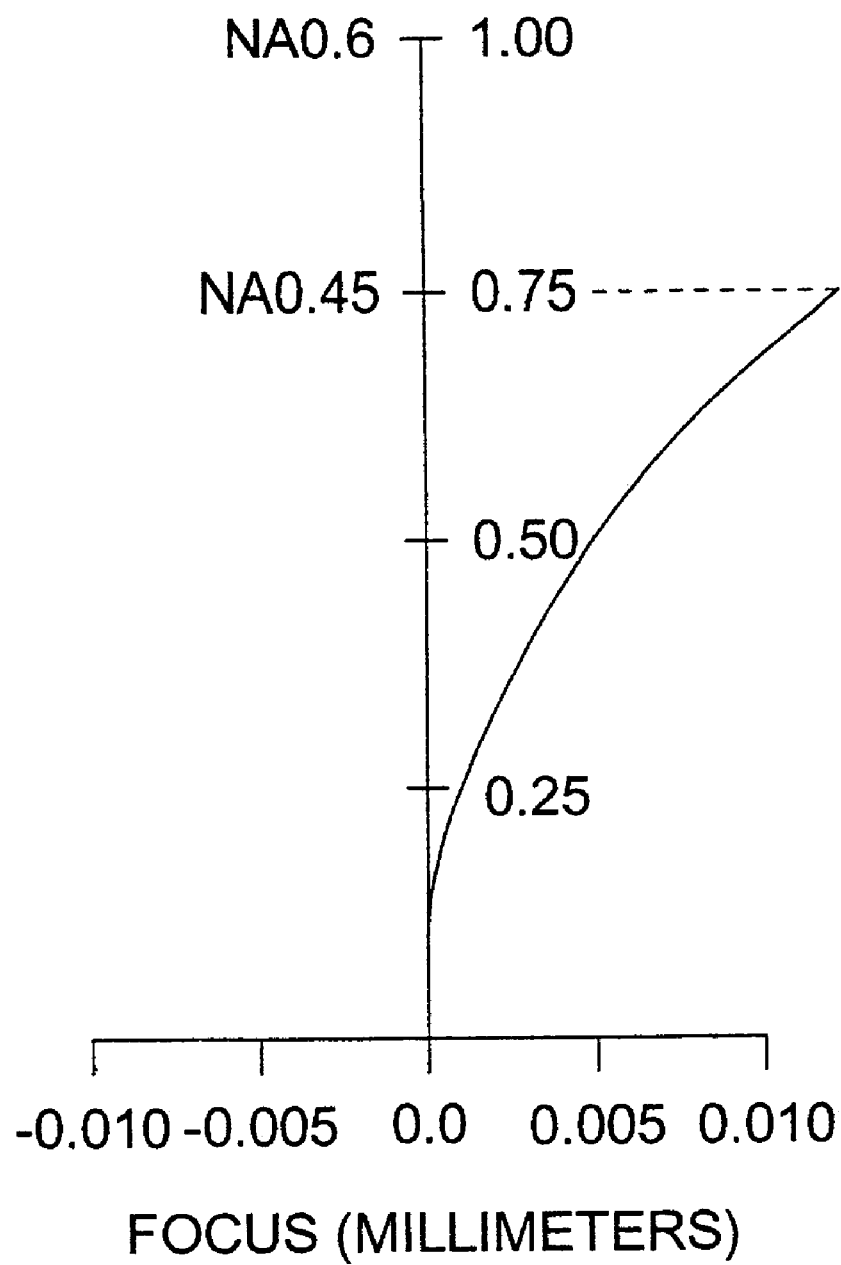
FIG. 13 is a view of the spherical aberration of the objective lens for the second reference wavelength $\lambda 2=780$ nm in the example 4.
Figure 14:
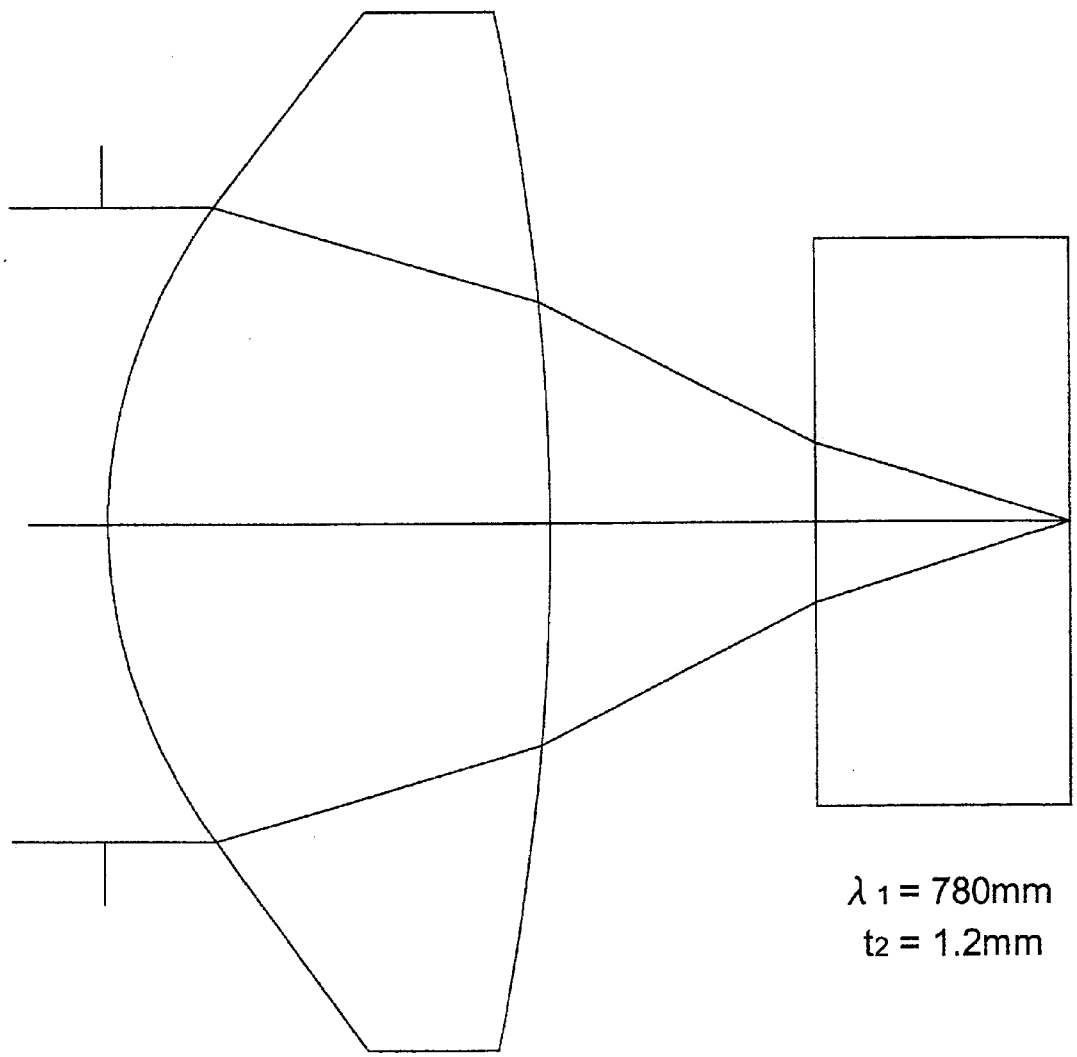
FIG. 14 is a view of an optical path of the objective lens in the case of FIG. 13 in the example 4.

FIG. 11 is a spherical aberration view of the lens in Example 4 at the first reference wavelength λ1=650 nm, and the transparent substrate thickness t1=0.6 mm, and FIG. 12 is an optical path view of the lens in Example 4 in this case. It is clear from FIG. 11 that the spherical aberration is sufficiently corrected at the first reference wavelength λ1. In the same manner, FIG. 13 is a spherical aberration view of the lens in Example 4 at the second reference wavelength λ2=780 nm, and the transparent substrate thickness t1=1.2 mm, and FIG. 14 is an optical path view of the lens in Example 4 in this case. As can be clear from FIG. 13, the spherical aberration remains at the second reference wavelength λ2, however, as compared to the spherical aberration in which the spherical aberration due to the difference in the thickness of the transparent substrate generated in the ordinary refraction lens is added by the chromatic spherical aberration generated due to the difference in the wavelength, the correction is made to some order number by the diffraction effect by the diffracting ring-shaped band.

In this lens, in FIG. 10, when the ring-shaped band dichroic filter, not shown, is arranged perpendicularly to the optical axis between the aperture 17 and the objective lens 16, it is preferable that, by reflecting the light flux not smaller than the numerical aperture NA3 on the image side in the light flux from the second light source emitting the light of the second reference wavelength λ2, the light flux is made not to reach the information recording surface 22. It is preferable that the light flux is made not to reach the information recording surface 22, by the shielding means like the shielding portion 10.

EXAMPLE 5

The lens data of Example 5 is shown in Table 9.

TABLE 9 f = 3.30  NA = 0.60
Reference wavelength 1: λ = 650 nm
Reference wavelength 2: 780 nm

| i | ri | d1i | d2i | material |
|---|---|---|---|---|
| 1 | ∞ | ∞ | ∞ | |
| 2 | 2.129441 | 2.2 | 2.2 | Olefinic resin |
| 3 | −7.926982 | 1.710 | 1.346 | |
| 4 | ∞ | 0.6 | 1.2 | PC |

Aspherical surface data
The second surface aspherical surface coefficient

| k = | −6.4076106E−01 | | |
|---|---|---|---|
| A1 = | 8.7771931E−04 | P1 | 4.0 |
| A2 = | −1.1822482E−04 | P2 | 6.0 |
| A3 = | 8.7454145E−05 | P3 | 8.0 |
| A4 = | −2.8067977E−05 | P4 | 10.0 |

Optical path difference function

| B2 = | 0.0000000E+00 |
|---|---|
| B4 = | −6.3249197E−04 |
| B6 = | −3.9811935E−05 |
| B8 = | −3.1571369E−06 |

The third surface aspherical surface coefficient

| k = | −2.0640628E+01 | | |
|---|---|---|---|
| A1 = | 1.1494445E−02 | P1 | 4.0 |
| A2 = | −3.1428889E−03 | P2 | 6.0 |
| A3 = | 2.1271773E−04 | P3 | 8.0 |
| A4 = | 9.1906090E−06 | P4 | 10.0 |

Figure 15:
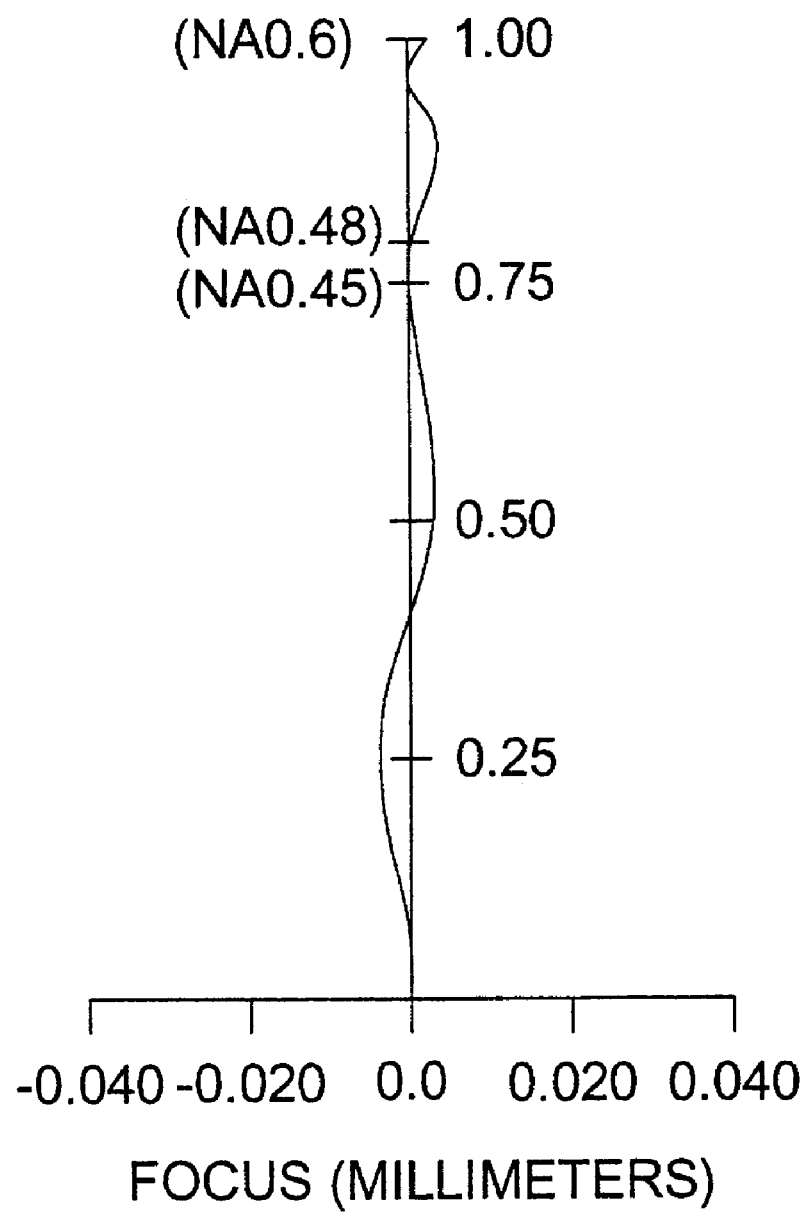
FIG. 15 is a view of the spherical aberration of the objective lens for the first reference wavelength $\lambda 1=650$ nm in the example 2 according to an embodiment of the present invention.
Figure 16:
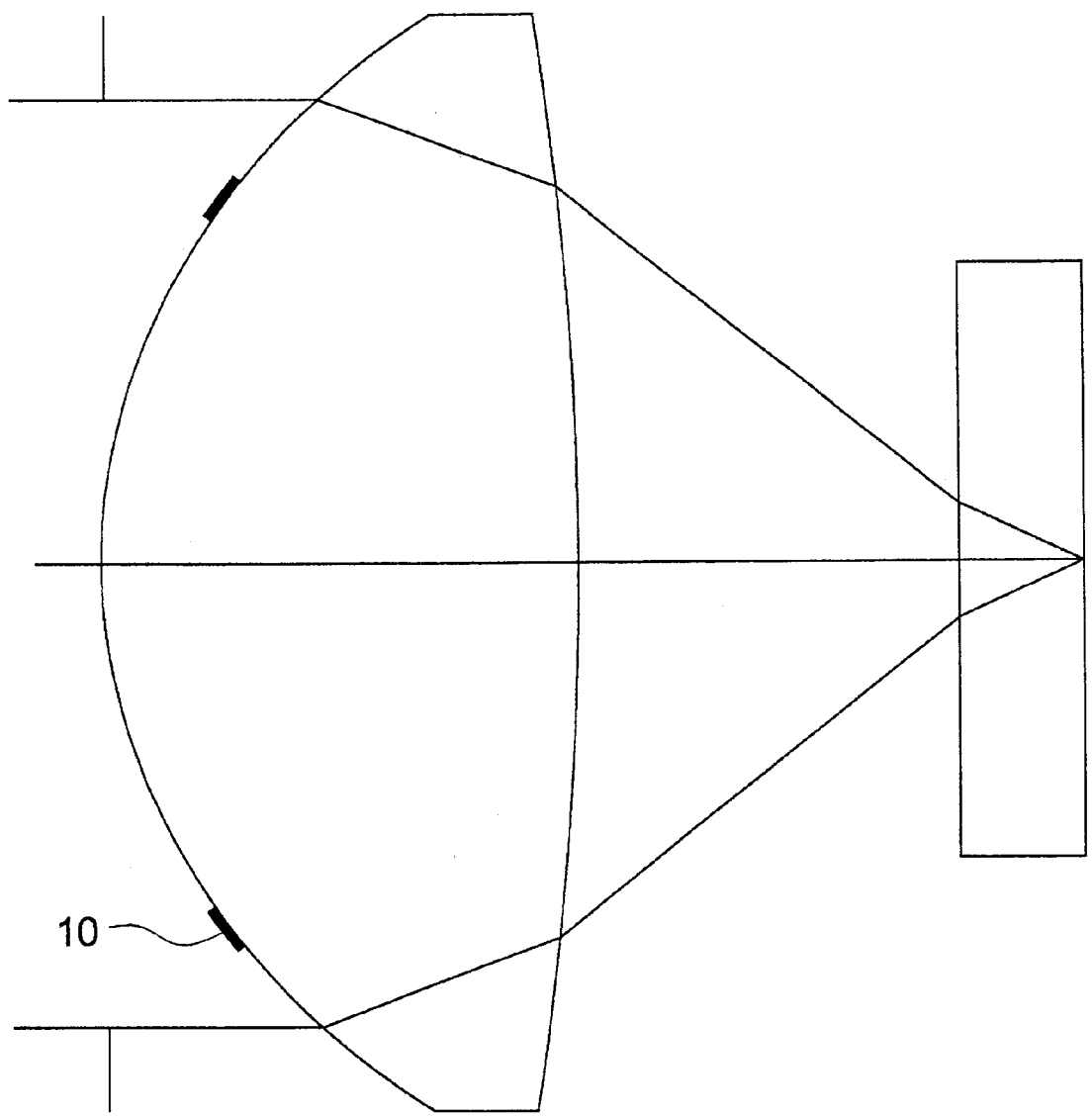
FIG. 16 is a view of an optical path of the objective lens in the case of FIG. 15 in an example 5.
Figure 17:
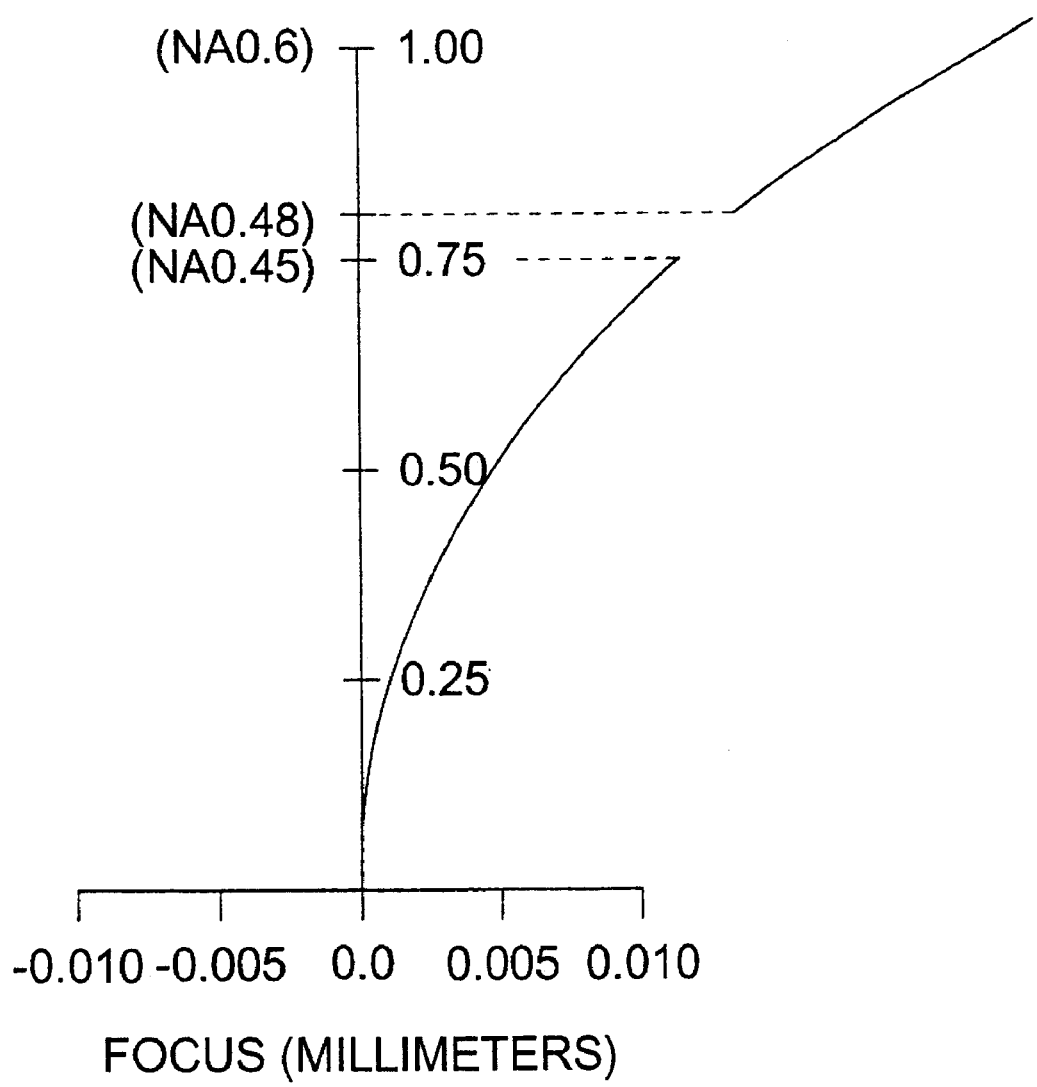
FIG. 17 is a view of the spherical aberration of the objective lens for the second reference wavelength $\lambda 2=780$ nm in the example 5.

FIG. 15 is a spherical aberration view of the lens in Example 5 at the first reference wavelength λ1=650 nm, and the transparent substrate thickness t1=0.6 mm, and FIG. 16 is an optical path view of the lens in Example 5 in this case. It is clear from FIG. 15 that the spherical aberration is sufficiently corrected at the first reference wavelength λ1. FIG. 17 is a spherical aberration view of the lens in Example 5 at the second reference wavelength λ2=780 nm, and the transparent substrate thickness t1=1.2 mm. As can be clear from FIG. 17, the spherical aberration remains at the second reference wavelength λ2, however, in the same manner as in Example 4, the correction is made to some order number by the diffraction effect. Further, as shown in FIG. 16, when a ring-shaped band-like shielding portion 10 is provided on the lens surface, the necessary image formation performance can be obtained. This shielding portion 10 can be structured by forming a ring-shaped band-like cutout portion or a ring-shaped band dichroic filter on the lens surface. Incidentally, the shielding portion 10 has a smaller influence on the image formation performance of the light of the first reference wavelength λ1.

EXAMPLE 6

The lens data of Example 6 is shown in Table 9.

TABLE 10 f = 3.30   NA = 0.60
Reference wavelength 1: λ = 650 nm
Reference wavelength 2: 780 nm

| i | ri | d1i | d2i | material |
|---|---|---|---|---|
| 1 | ∞ | ∞ | ∞ | |
| 2 | 2.129441 | 2.2 | 2.2 | Olefinic resin |
| 3 | −7.926982 | 1.710 | 1.346 | |
| 4 | ∞ | 0.6 | 1.2 | PC |

Aspherical surface data
The second surface aspherical surface coefficient

| | | | |
|---|---|---|---|
| k = | −5.90367060E−01 | | |
| A1 = | 5.73492480E−04 | P1 | 4.0 |
| A2 = | −5.03830100E−04 | P2 | 6.0 |
| A3 = | 1.52560680E−05 | P3 | 8.0 |
| A4 = | −2.48642350E−05 | P4 | 10.0 |

Optical path difference function

| | |
|---|---|
| B2 = | 0.000000E+00 |
| B4 = | −4.4383698E−04 |
| B6 = | −2.2720694E−05 |
| B8 = | 4.2690709E−06 |

The third surface aspherical surface coefficient

| | | | |
|---|---|---|---|
| k = | −2.0640628E+01 | | |
| A1 = | 1.14944450E−02 | P1 | 4.0 |
| A2 = | −3.14288890E−03 | P2 | 6.0 |
| A3 = | 2.12717730E−04 | P3 | 8.0 |
| A4 = | 9.19060900E−06 | P4 | 10.0 |

Figure 18:
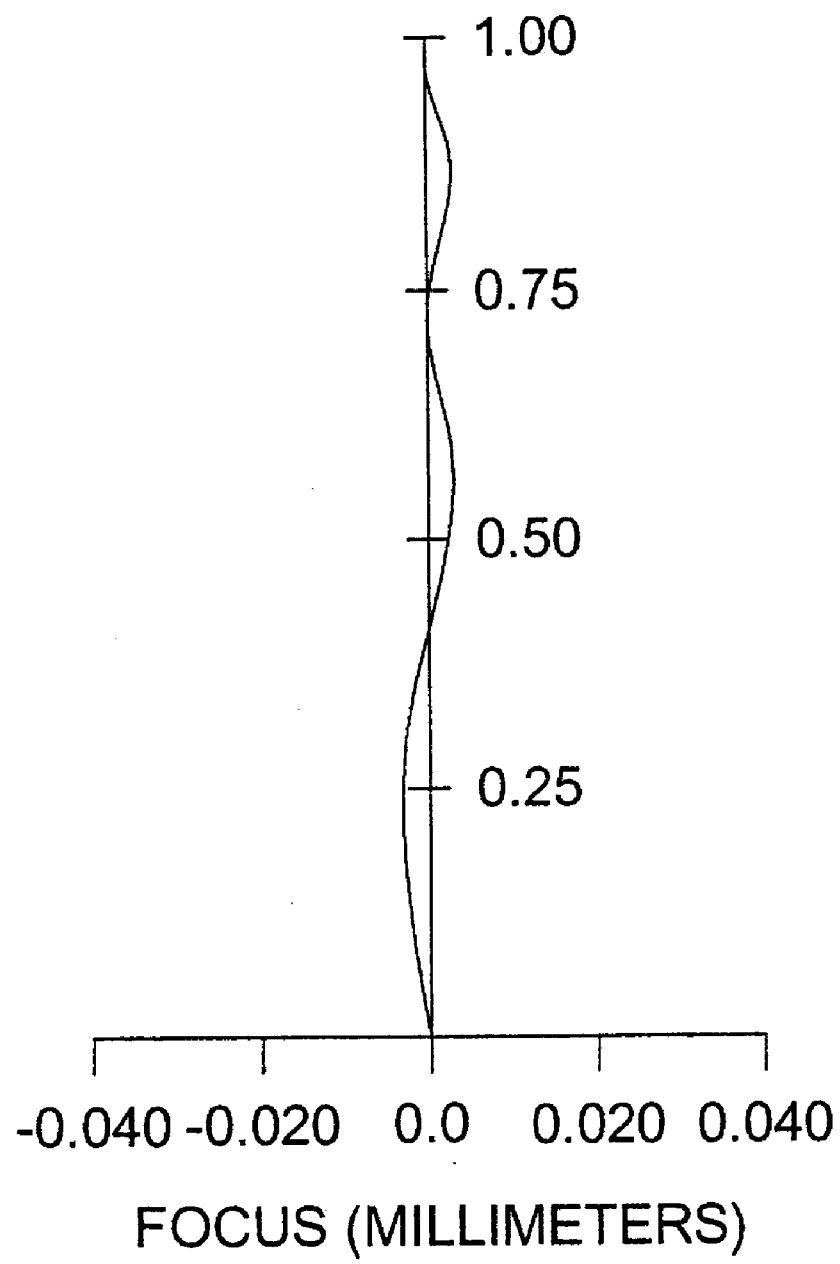
FIG. 18 is a view of the spherical aberration of the objective lens for the first reference wavelength $\lambda 1=650$ nm in the example 6 according to an embodiment of the present invention.
Figure 19:
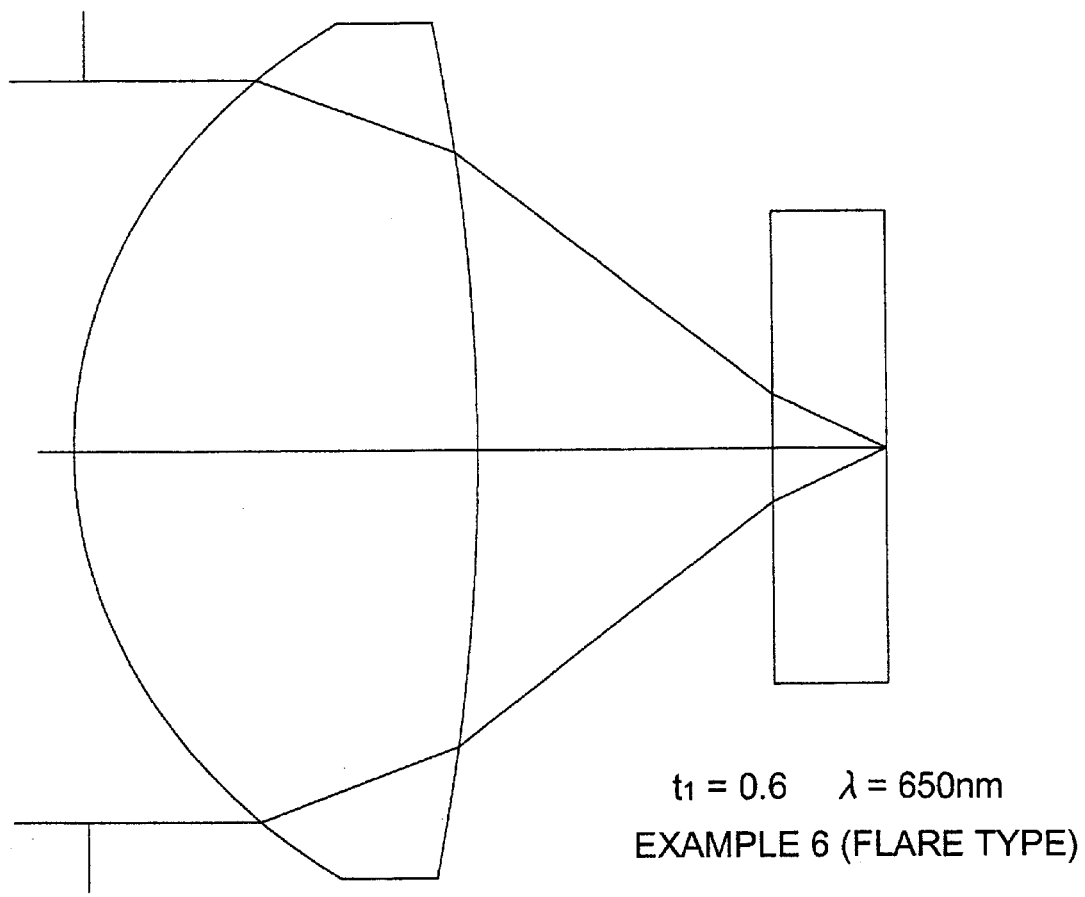
FIG. 19 is a view of an optical path of the objective lens in the case of FIG. 18 in an example 6.
Figure 20:
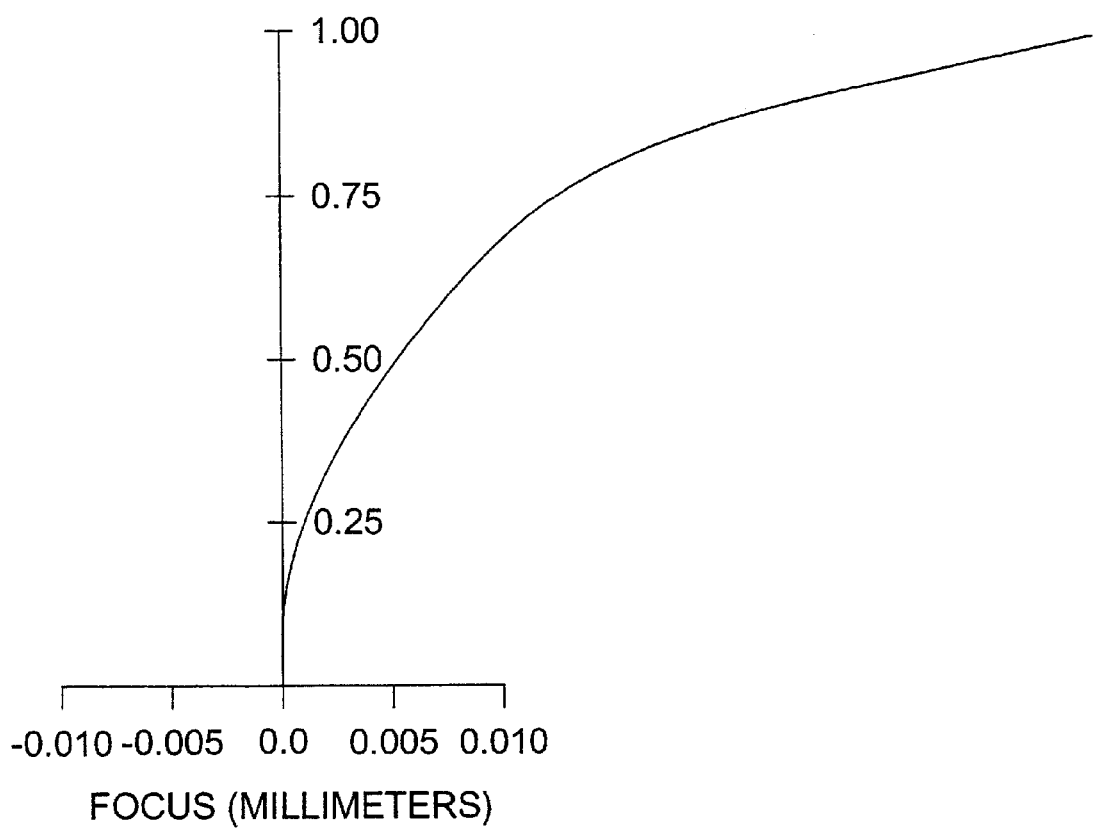
FIG. 20 is a view of the spherical aberration of the objective lens for the second reference wavelength $\lambda 2=780$ nm in the example 6.

FIG. 18 is a spherical aberration view of the lens in Example 6 at the first reference wavelength $\lambda 1=650$ nm, and the transparent substrate thickness t1=0.6 mm, and FIG. 19 is an optical path view of the lens in Example 6 in this case. It is clear from FIG. 19 that the spherical aberration is sufficiently corrected at the first reference wavelength $\lambda 1$. FIG. 20 is a spherical aberration view of the lens in Example 6 at the second reference wavelength $\lambda 2=780$ nm, and the transparent substrate thickness t1=1.2 mm. As can be clear from FIG. 20, in Example 6, in order to obtain the necessary image formation performance at the second reference wavelength $\lambda 2$, the spherical aberration is made excessive (over correction) at a large numerical aperture portion (not smaller than NA 0.45).

Further, it is preferable that beam spot is formed on the information recording surface 22 by the light flux of a portion almost lower than the numerical aperture on the image side of NA2, and a portion almost larger than the numerical aperture of NA2 is made the flare light.

EXAMPLE 7

The lens data-of Example 7 is shown in Table 11.

TABLE 11 f = 3.36   NA = 0.60
Reference wavelength 1: λ = 650 nm  Reference wavelength 2: 780 nm

| i | ri | d1i | d2i | material |
|---|---|---|---|---|
| 1 | ∞ | ∞ | ∞ | |
| 2 | 2.129441 | 2.2 | 2.2 | Olefinic resin |
| 3 | −7.926982 | 1.710 | 1.346 | |
| 4 | ∞ | 0.6 | 1.2 | PC |

TABLE 11-continued

Aspherical surface data
The second surface
the first divided surface and the third divided surface
(0 ≦ H ≦ 1.512, H ≧ 1.628)

| Aspherical surface coefficient | | | | Optical path difference function | |
|---|---|---|---|---|---|
| κ= | −5.9036706E−01 | | | | |
| A1= | 5.7349248E−02 | P1 | 4.0 | B2= | 0.0000000E+00 |
| A2= | −5.0383010E−04 | P2 | 6.0 | B4= | −4.4383698E−04 |
| A3= | 1.5256068E−04 | P3 | 8.0 | B6= | −2.2720694E−04 |
| A4= | −2.4864235E−05 | P4 | 10.0 | B8= | 4.2690709E−05 |

The second divided surface (1.512 ≦ 1.628)

| Aspherical surface coefficient | | | | Optical path difference function | |
|---|---|---|---|---|---|
| κ= | −6.69900E−01 | | | | |
| A1= | 9.05960E−04 | P1 | 4.0 | B2 | |
| A2= | −1.17000E−04 | P2 | 6.0 | B4= | −8.21920E−04 |
| A3= | 8.12510E−05 | P3 | 8.0 | B6= | −5.26490E−04 |
| A4= | −2.71720E−05 | P4 | 10.0 | B8= | −3.75320E−06 |

The third surface

Aspherical surface coefficient

| | | | |
|---|---|---|---|
| κ= | −2.06406280E+01 | | |
| A1= | 1.14944450E−02 | P1 | 4.0 |
| A2= | −3.14288890E−03 | P2 | 6.0 |
| A3= | 2.12717730E−04 | P3 | 8.0 |
| A4= | 9.19060900E−05 | P4 | 10.0 |

Figure 21:
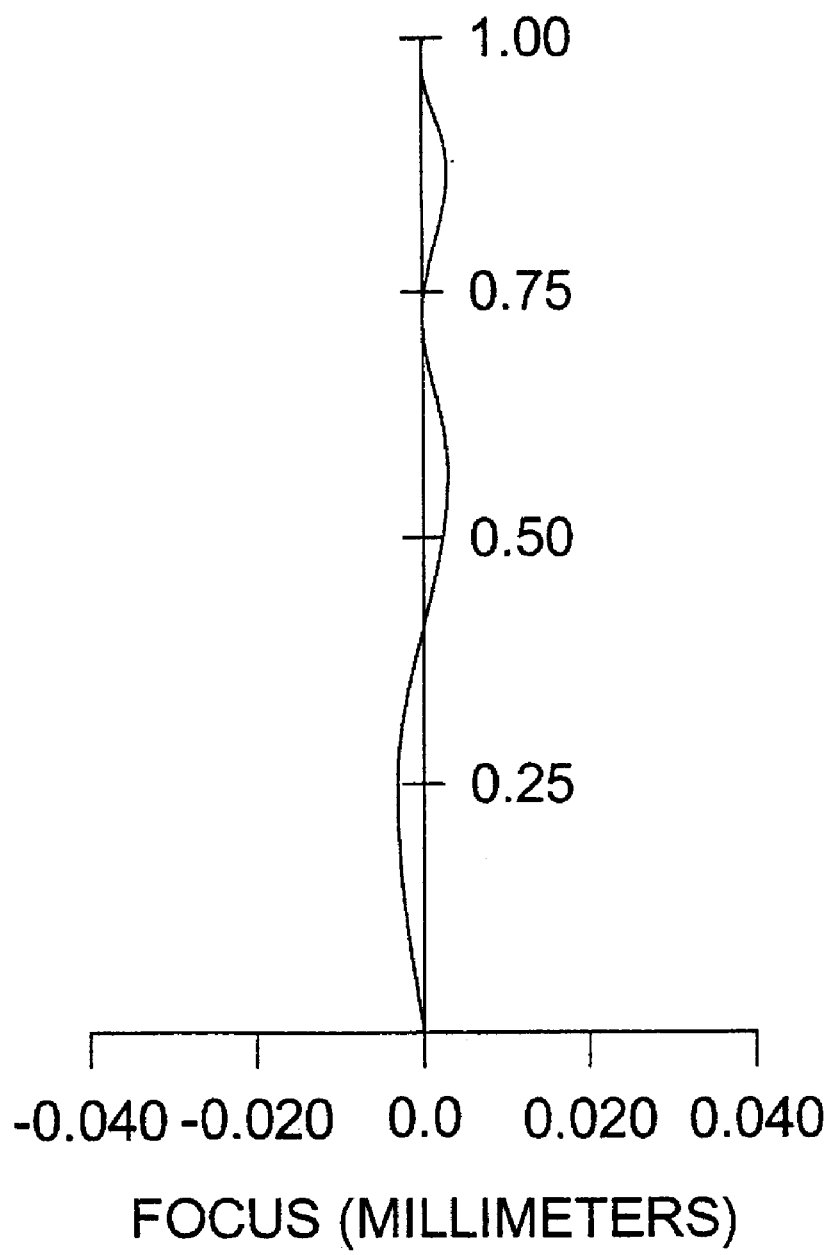
FIG. 21 is a view of the spherical aberration of the objective lens for the first reference wavelength λ1=650 nm in an example 7 according to an embodiment of the present invention.
Figure 22:
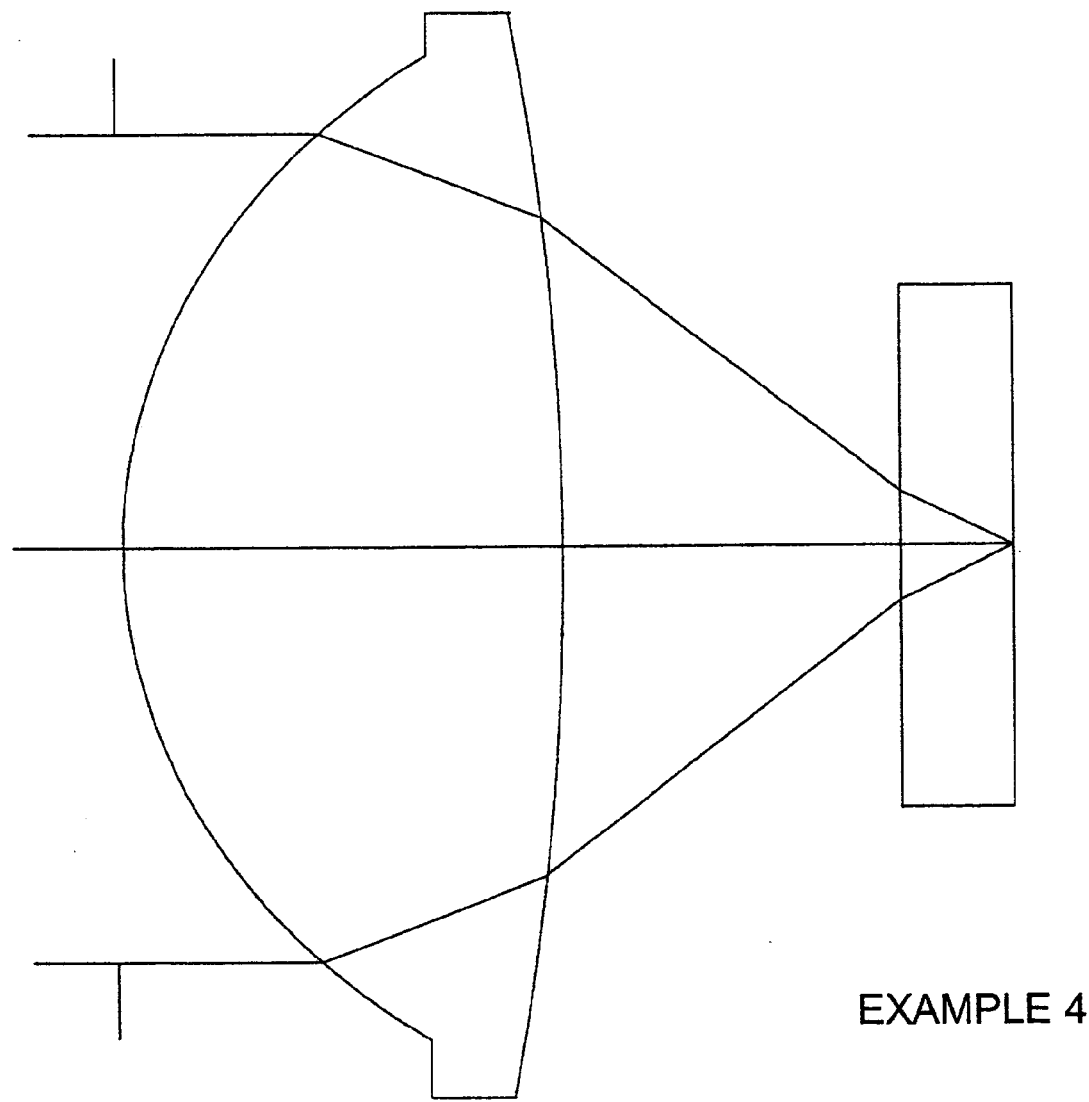
FIG. 22 is a view of an optical path of the objective lens in the case of FIG. 21 in the example 7.
Figure 23:
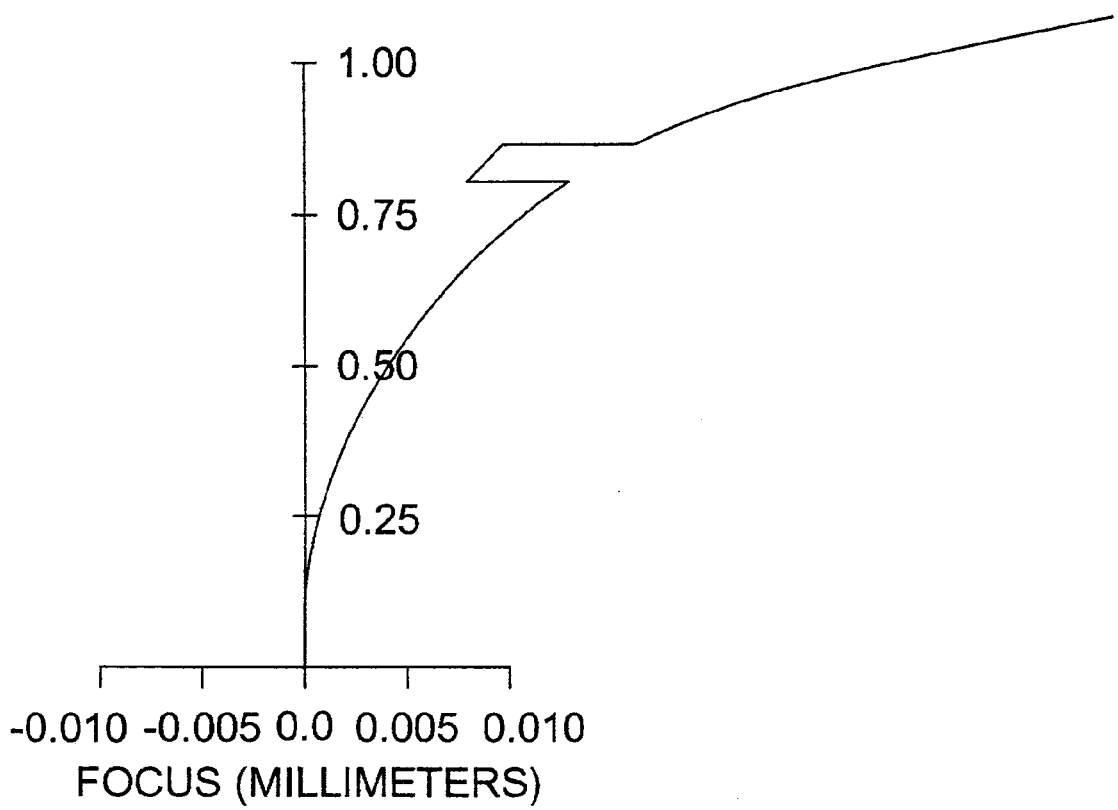
FIG. 23 is a view of the spherical aberration of the objective lens for the second reference wavelength λ2=780nm in the example 7.

FIG. 21 is a spherical aberration view of the lens in Example 6 at the first reference wavelength $\lambda 1=650$ nm, and the transparent substrate thickness t1=0.6 mm, and FIG. 22 is an optical path view of the lens in Example 7 in this case. It is clear from FIG. 21 that the spherical aberration is sufficiently corrected at the first reference wavelength $\lambda 1$. FIG. 23 is a spherical aberration view of the lens in Example 6 at the second reference wavelength $\lambda 2=780$ rim, and the transparent substrate thickness t1=1.2 mm. As can be seen from FIG. 23, in the same manner as in Example 6, in Example 7, in order to obtain the necessary image formation performance at the second reference wavelength $\lambda 2$, the spherical aberration is made excessive (over correction) at a large numerical aperture portion. In the present Example 7, further, one surface of the lens is divided into 3, and the first light flux, second light flux, and third light flux are obtained, and as shown in FIG. 23, by providing the discontinuous portion of the spherical aberration at the second reference wavelength $\lambda 2$, more excellent image formation performance than in Example 6 is obtained.

Further, the converging position of apportion farthest from the optical axis in the first light flux, does not coincide with the converging position of the second light flux, and the residual aberration can be decreased.

Incidentally, in the present Example, the first divided surface and the third divided surface have the same surface shape data, but, these may not be the same.

Further, olefinic resin is used for the lens material of each Example, and polycarbonate resin (PC) is used for the transparent substrate, and the refractive index of each material is shown in Table 12 for each reference wavelength.

TABLE 12

| | Refractive index | |
|---|---|---|
| Wavelength | 780 nm | 650 nm |
| PC | 1.57084 | 1.57787 |
| Olefinic resin | 1.54728 | 1.55113 |

Next, a plurality of ring-shaped bands provided on each lens in the above Examples will be described. A Plurality of ring-shaped bands are almost concentrically formed on the lens surface around the optical axis, an example of the pitch PH of the ring-shaped band corresponding to the maximum numerical aperture on the image side of the lens, and the pitch PH corresponding to the numerical aperture of the ½ of the maximum numerical aperture, will be shown together with a comparative example in the case of no residual aberration.

EXAMPLE

The first ring-shaped band: 990.7 μm
Minimum pitch: 22.0 μm
PH: 990.7 μm
PF: 22.0 μm
Number of ring-shaped bands: 20
The first ring-shaped band: 850.2 μm
Minimum pitch: 11.5 μm
PH: 55.6 μm
PF: 11.5 μm
Number of ring-shaped bands: 38

As described above, in the present Example, although the spherical aberration remains for the second reference wavelength λ2 (650 nm), because the number of ring-shaped bands can be reduced as compared to the lens of the comparative example of no residual aberration, the diffraction pattern of the lens can be easily formed, and the production cost of the lens can be reduced.

Further, when the diffracting ring-shaped band is provided on the whole effective diameter surface of the lens surface, the height HX from the optical axis of the peripheral edge of the diffracting ring-shaped band and the height HMAX of the ring-shaped band of the most outer periphery, preferably satisfy the following conditional expression. $0.15 \leq HX/HMAX \leq 0.65$ Generally, the pitch of the diffracting ring-shaped band (position of each ring-shaped band) is defined by the optical path difference function, which will be detailed in the later Example. Specifically, the diffraction surface is expressed by the optical path difference function $\Phi(h)$, and the optical path difference function expresses the optical path difference added by the diffraction surface to the primary diffraction light of the reference wavelength. The diffracting ring-shaped band is provided every time when the optical path difference function is changed by mλ (m is diffraction order number).

$$\Phi(h) = b2 \ast h^2 + b4 \ast h^4 + b6 \ast h^6 + \quad (17)$$

Where, h: distance from the optical axis, b2, b4, b6, . . . : coefficients of the optical path difference function.

When the above definition is based on, when the second order coefficient of the optical path difference function is a value except 0, the power can be given to the lens. Further, when the coefficient except the second order term of the optical path difference function, for example, 4-th order coefficient, 6-th order coefficient, 8-th order coefficient, 10-th order coefficient, etc., are values except 0, the spherical aberration can be controlled. Incidentally, herein, [to control] means that the spherical aberration owned by a portion having the refractive power is corrected by generating the reverse spherical aberration, or the whole spherical aberration is made a desired value.

Figure 24:
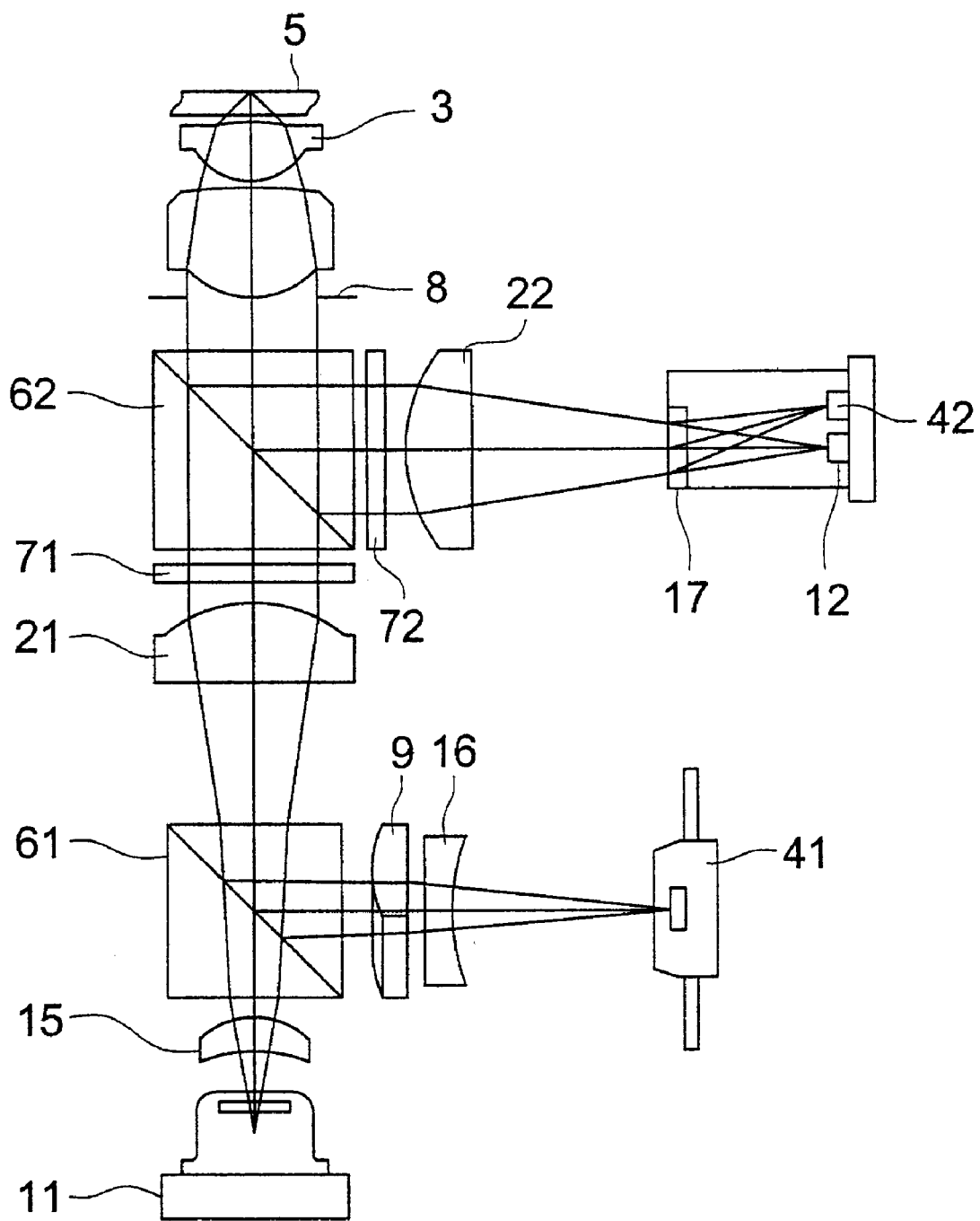
FIG. 24 is an outline structural view of the optical pick-up apparatus according to the present embodiment.

FIG. 24 is a outline structural view of the optical pick-up apparatus according to the present embodiment. In FIG. 24, the optical pick-up apparatus has the first light source 11 to conduct the recording and/or reproducing for the first optical information recording medium (optical disk), and the second light source 12 whose wavelength is different from that of the first light source 11, to conduct the recording and/or reproducing for the second optical information recording medium (optical disk), and has coupling lenses 21, 22 to convert the divergence angles of the divergence light flux emitted from respective light sources to the desired divergence angles, a beam splitter 62, which is an optical composition means, to compose the light flux so that the light flux advances to almost one direction, an objective lens optical system 3 to converge the light flux from the beam splitter 62 onto the information recording surface 5 of the optical information recording medium, and light detectors 41 and 42 for light receiving the reflected light from the optical information recording medium. In the drawing, numeral 8 is a aperture, numeral 9 is a cylindrical lens, numerals 71 and 72 are ¼ wavelength plates, numeral 15 is a coupling lens to reduced the divergent order number of the divergent light flux from the light source 11, numeral 16 is a concave lens, and numeral 17 is a hologram to separate the reflected light flux.

The first light source 11 emits the laser light of the wavelength $\lambda_1$=about 400 nm, and in this case, the numerical aperture of the objective lens necessary for recording and/or reproducing for the recording medium whose transparent substrate thickness t1 is 0.1 mm, is NA1=0.85. The second light source 12 emits the laser light of the wavelength 2=about 650 nm, and in this case, the numerical aperture of the objective lens necessary for recording and/or reproducing for the recording medium whose transparent substrate thickness t2 is 0.6 mm, is NA2=0.65.

In order to obtain an objective lens which can cope with the information recording media whose thickness are different, in the 2 component high NA objective lens in the present embodiment, the role of the diffraction surface is the correction of the spherical aberration, and for the correction of the spherical aberration, there are following cases.

[1] The case where the position of the object point to the recording medium whose transparent substrate thickness is t1, is equal to the position of the object point to the recording medium whose transparent substrate thickness is t2, for example, the case where, in both cases, collimated parallel light is incident on the objective lens.

In this case, the spherical aberration due to the difference of the substrate thickness is corrected by the action of only the diffraction surface. For the recording medium whose transparent substrate thickness t2, there are (A) a case where the spherical aberration is reduced to the numerical aperture NA1 necessary for the recording medium whose transparent substrate thickness t1, and a case where the spherical aberration is reduced to the range of the numerical aperture NA2 necessary for the recording medium whose transparent substrate thickness t2, and the spherical aberration is increased in the range from the numerical aperture NA1 to the numerical aperture NA2. In the case of (A), a small spot can be obtained for the larger side numerical aperture NA1 for each recording medium. In the case of (B), it can be prevented that, for the recording medium of thickness t2, the spot is too narrowed down to the size smaller than necessary spot size corresponding to the numerical aperture NA2.

[2] The case where the position of the object point to the recording medium whose transparent substrate thickness t1 is different from the position of the object point to the recording medium whose transparent substrate thickness t2, that is, the case where the parallel light is incident on the objective lens for the recording medium whose transparent substrate thickness t1, and the divergent light is incident on the objective lens for the recording medium whose transparent substrate thickness t2.

In this case, the spherical aberration due to the difference in the substrate thickness can be corrected to some order number by the difference of the position of the object point. However, it is difficult to control the spherical aberration into the arbitrary shape in the same manner as in (A) and (B) in the case [1], and the diffraction surface becomes necessary for that. By the difference of the object point and the action of the diffraction surface, the spherical aberration can be more accurately corrected, and the shape of the diffraction surface can be controlled so that it can be easily produced.

Accordingly, as described above, in the objective lens, it is preferable that the following conditional expression is satisfied.

$$0.4 \leq |(Ph/Pf)-2| \leq 25 \tag{5}$$

Where, Pf: the pitch of the diffracting ring-shaped band in the image side numerical aperture NA1 necessary for conducting the recording or reproducing onto the information recording medium with the transparent substrate thickness t1, Ph: the pitch of the diffracting ring-shaped band in the numerical aperture of ½ of NA1.

The conditional expression (5) relates to a pitch of the diffracting ring-shaped band, that is, to an interval between ring-shaped bands in the perpendicular direction to the optical axis. When the optical path difference function has only the square term of h, (Ph/Pf)−2=0, however, in the present invention, in order to satisfactorily correct the difference of the spherical aberration generated due to the difference between two substrate thickness by using the diffraction, it is preferable to use the higher degree term of the optical path difference function, and in this case, it is preferable that the term (Ph/Pf)−2 has a value separated from 0 to some extent. When the value goes to lower than the lower limit in the expression (5), the action of the diffraction to correct the higher degree of spherical aberration is decreased, and it becomes difficult to correct the difference of the spherical aberration between 2 wavelengths generated due to the difference of the substrate thickness by the action of the diffraction. When the value goes over the upper limit in the expression (5), a portion at which the pitch of the diffracting ring-shaped band becomes too small is generated, and it is difficult to produce the lens having the high diffraction efficiency.

Incidentally, when the objective lens satisfies the following conditional expression, it is preferable.

$$0.8 \leq |(Ph/Pf)-2| \leq 6.0 \tag{6}$$

Further, it is more preferable when the objective lens satisfies the following conditional expression.

$$1.2 \leq |(Ph/Pf)-2| \leq 2.0 \tag{7}$$

Further, it is more preferable when the objective lens satisfies the following conditional expressions.

$$0.70 \leq d1/f \leq 1.70 \tag{8}$$

$$0.60 \leq r1/(n1 \cdot f) \leq 1.10 \tag{9}$$

$$0.3 \leq (r2+r1)(r2-r1) \leq 2.0 \tag{10}$$

Where, d1: the lens thickness on the axis of the first lens, f: focal distance, ri: the paraxial radius of curvature of each surface, n1: the refractive index of the first lens.

The expression (8) relates to the thickness of the center of the first lens, and when the value goes lower than the lower limit, the image height characteristic is lowered. On the one hand, when the value goes over the upper limit, the lens becomes a thick wall and the size of the pick-up increases. The expression (9) relates to the radius of curvature of the first lens, and when the value goes lower than the lower limit and r1 becomes small, the shift sensitivity or the tilt sensitivity of the first lens is increased. On the one hand, when the value goes over the upper limit and r1 is increased, the power burden of the second lens is increased, and the error sensitivity to the lens thickness of the second lens is increased. The expression (10) relates to the shape of the first lens, and when the value goes lower than the lower limit and its shape becomes near to the double convex symmetrical shape, the correction of the spherical aberration is difficult. On the one hand, when the value goes over the upper limit and the degree of the meniscus is increased, the aberration deterioration due to the dislocation of the axis between the first surface and the second surface of the first lens is large.

Incidentally, it is more preferable when the objective lens satisfies the following conditional expressions.

$$1.00 \leq d1/f \leq 1.40 \tag{11}$$

$$0.70 \leq r1/(n1 \cdot f) \leq 0.90 \tag{12}$$

$$0.4 \leq (r2+r1)/(r2-r1) \leq 1.4 \tag{13}$$

Examples 8 to 12 of the present invention are shown below. Incidentally, in each Example, $\lambda_1$=400 nm, $\lambda_2$=650 nm, t1=0.1 mm, t2=0.6 mm, NA1=0.85, and NA2=0.65.

Each lens constituting the optical system for the optical pick-up of Examples 8 to 12 has the aspherical surface shape expressed by the following expression on the optical surface.

$$X=(h^2/r^2)/(1+\sqrt{(1-(1+K)h^2/r^2)})+A_2h^2+A_4h^4+ \tag{19}$$

Where, $A_2$, $A_4$, $A_6$, . . . : aspherical surface coefficient, k: conical coefficient, r: paraxial radius of curvature, d: spacing n: refractive index in the reference wavelength, and vd: Abbe's number.

Table 13 is a table in which conditional values of each example are put together.

TABLE 13

| ex | 1 | 2 | 3 | 4 | 5 |
|---|---|---|---|---|---|
| Position of object point (400 nm) | ∞ | ∞ | ∞ | ∞ | ∞ |
| (650 nm) | ∞ | ∞ | ∞ | Finite | Finite |

TABLE 13-continued

| Correction of spherical aberration | Flaring | Perfect correction | Perfect correction | Perfect correction | Flaring |
|---|---|---|---|---|---|
| f(400 nm) | 2.01 | 1.92 | 2.35 | 2.35 | 2.34 |
| hf | 1.732 | 1.622 | 2.024 | 2.024 | 1.988 |
| hh | 0.866 | 0.811 | 1.012 | 1.012 | 0.994 |
| NA(400 nm) | 0.85 | 0.83 | 0.85 | 0.85 | 0.85 |
| (650 nm) | 0.83 | 0.82 | 0.83 | 0.88 | 0.86 |
| Spherical aberration ($\lambda$ rms) $\lambda$ = 400 Maximum NA | 0.013 | 0.012 | 0.006 | 0.005 | 0.009 |
| Spherical aberration ($\lambda$ rms) $\lambda$ = 650 Maximum NA | 0.35 | 0.005 | 0.001 | 0.005 | 0.64 |
| NA = 0.65 | | 0.002 | — | — | 0.003 |
| Pf | 0.026 | 0.023 | 0.0036 | 0.0067 | 0.010 |
| Ph | 0.019 | 0.011 | 0.089 | 0.027 | 0.028 |
| \| Ph/Pf-2 \| | 1.3 | 1.5 | 23 | 2.0 | 0.8 |
| d1 | 2.5 | 2.5 | 3.12 | 2.48 | 2.49 |
| r1 | 2.137 | 2.036 | 2.545 | 2.685 | 2.532 |
| r2 | 43.42 | −14.86 | 30.18 | 18.34 | 17.67 |
| n1 | 1.508 | 1.508 | 1.508 | 1.508 | 1.508 |
| (r2 + r1)/(r2 − r1) | 1.10 | 0.76 | 1.18 | 1.34 | 1.33 |
| d1/f | | 1.24 | 1.30 | 1.33 | 1.06 | 1.06 |
| r1/(n1 · f)) | | 0.71 | 0.70 | 0.72 | 0.76 | 0.72 |

Figure 25:
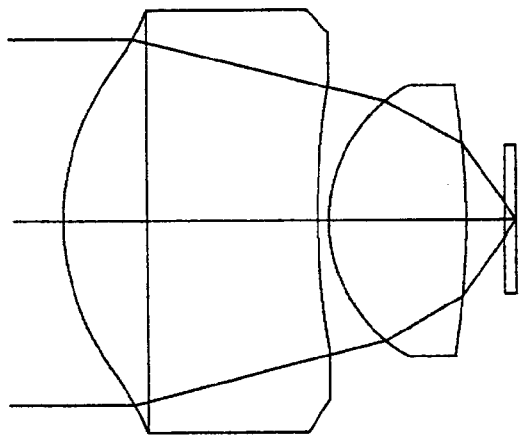
FIG. 25(a) is an optical path view when the light flux whose light source wavelength is 400 nm, is entered into the objective lens in an example 8.
FIG. 25(b) is an optical path view when the light flux whose light source wavelength is 650 nm, is entered into the objective lens in the example 8.
Figure 25:
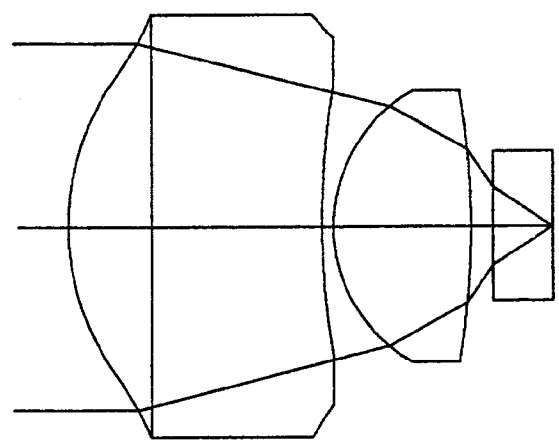
Figure 26:
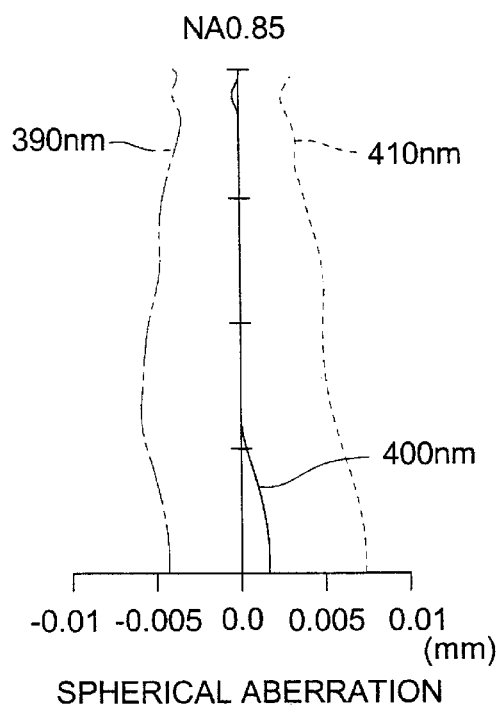
FIG. 26(a) is the spherical aberration view when the light flux whose light source wavelength is in the vicinity of 400 nm, is entered into the objective lens in the example 8.
FIG. 26(b) is the spherical aberration view when the light flux whose light source wavelength is in the vicinity of 650 nm, is entered into the objective lens in the example 8.
Figure 26:
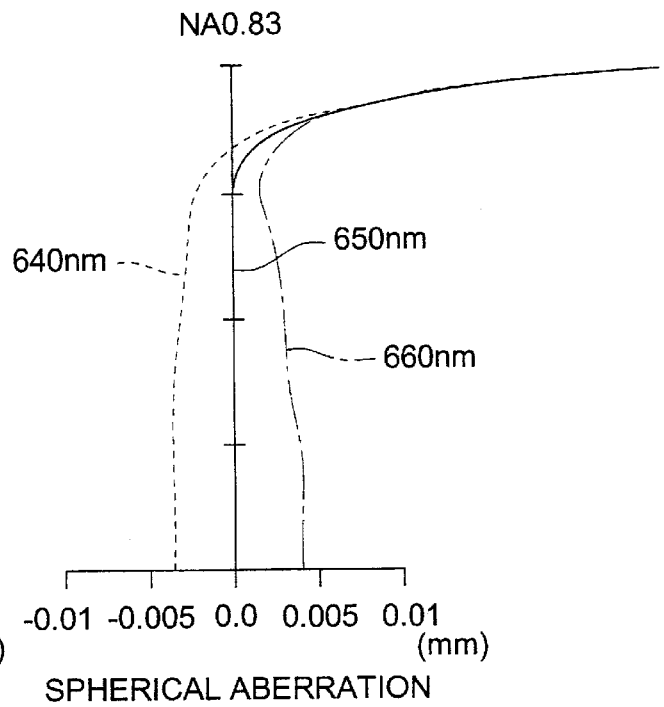

Table 14 is the lens data according to the objective lens of Example 8, and Table 15 is the aspherical surface data according to the objective lens of Example 8. FIG. 25(*a*) is an optical path view in the case where the light flux whose light source wavelength is 400 nm is incident on the objective lens of Example 8, and FIG. 25(*b*) is an optical path view in the case where the light flux whose light source wavelength is 650 nm is incident on the objective lens of Example 8. FIG. 26(*a*) is a spherical aberration view in the case where the light flux whose light source wavelength is in the vicinity of 400 nm is incident on the objective lens of Example 8, and FIG. 26(*b*) is a spherical aberration view in the case where the light flux whose light source wavelength is in the vicinity of 650 nm is incident on the objective lens of Example 8.

TABLE 14

| Surface No. | R | D | n ($\lambda$ = 400 nm) | n ($\lambda$ = 650 nm) |
|---|---|---|---|---|
| Light source | ∞ | d0 | | |
| Aperture | ∞ | 0.0 | | |
| 1 (Aspherical surface 1 diffraction surface 1) | 2.1368 | 2.500 | 1.50767 | 1.49529 |
| 2 (Aspherical surface 2) | 43.4232 | 0.100 | | |
| 3 (Aspherical surface 3) | 1.3659 | 1.350 | 1.60039 | 1.58037 |
| 4 | −7.3743 | d4 | | |
| 5 Cover glass | ∞ | d5 | 1.62158 | 1.57756 |
| 6 Cover glass Image surface | ∞ | 0.00 | | |
| | When $\lambda$ = 400 nm | When $\lambda$ = 650 nm | | |
| f | 2.01 | 2.06 | | |
| NA | 0.85 | 0.83 | | |
| d0 | ∞ | ∞ | | |
| d4 | 0.401 | 0.200 | | |
| d5 | 0.10 | 0.60 | | |

TABLE 15

| Aspherical surface/diffraction surface coefficient | |
|---|---|
| Aspherical surface 1 | |
| K = | 0.0 |
| $A_4$ = | −1.8391 × 10⁻³ |
| $A_6$ = | −5.3123 × 10⁻³ |
| $A_8$ = | 1.2959 × 10⁻³ |
| $A_{10}$ = | −4.8366 × 10⁻⁴ |
| Aspherical surface 2 | |
| K = | 0.0 |
| $A_4$ = | 9.9905 × 10⁻² |
| $A_6$ = | −3.6972 × 10⁻² |
| $A_8$ = | −1.0407 × 10⁻² |
| $A_{10}$ = | 5.1889 × 10⁻³ |
| Diffraction surface 1 | |
| $b_2$ = | 1.4999 × 10⁻² |
| $b_4$ = | −2.0834 × 10⁻³ |
| $b_6$ = | 8.1239 × 10⁻⁴ |
| $b_8$ = | −4.9012 × 10⁻⁴ |
| $b_{10}$ = | 5.8249 × 10⁻⁵ |
| Aspherical surface 3 | |
| K = | 0.0 |
| $A_4$ = | 2.6769 × 10⁻² |
| $A_6$ = | 4.8247 × 10⁻² |
| $A_8$ = | −7.9311 × 10⁻² |
| $A_{10}$ = | 1.3345 × 10⁻² |

Figure 27:
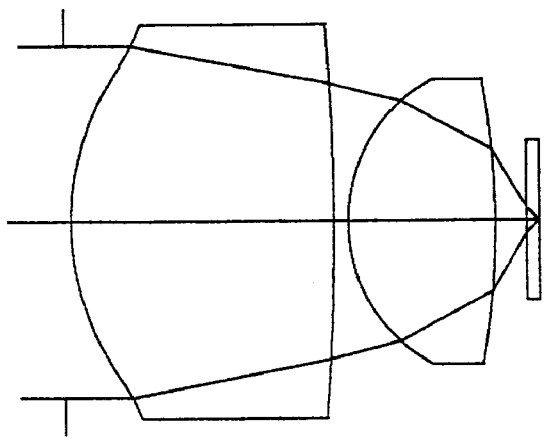
FIG. 27(a) is the optical path view when the light flux whose light source wavelength is 400 nm, is entered into the objective lens in an example 9.
FIG. 27(b) is the optical path view when the light flux whose light source wavelength is 650 nm, is entered into the objective lens in the example 9.
Figure 27:
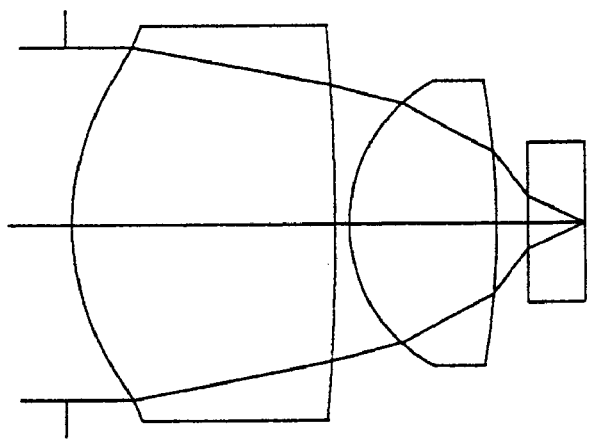
Figure 28:
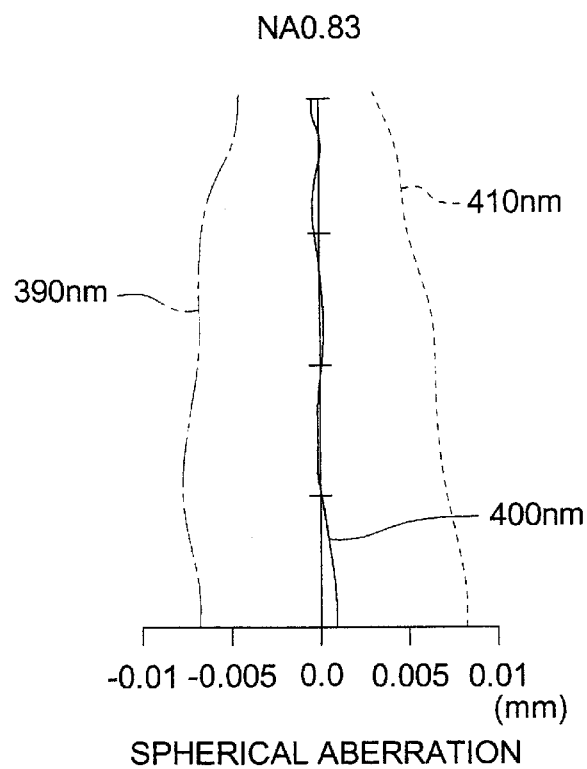
FIG. 28(a) is the spherical aberration view when the light flux whose light source wavelength is in the vicinity of 400 nm, is entered into the objective lens in the example 9.
FIG. 28(b) is the spherical aberration view when the light flux whose light source wavelength is in the vicinity of 650 nm, is entered into the objective lens in the example 9.
Figure 28:
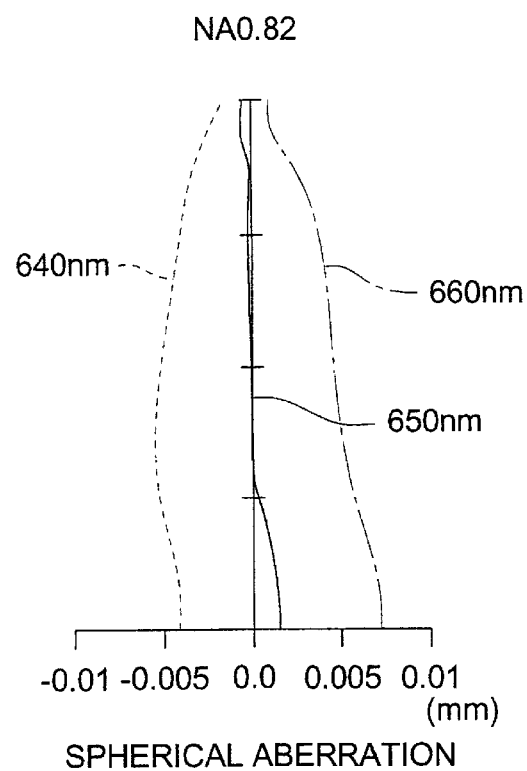

Table 16 is the lens data according to the objective lens of Example 9, and Table 17 is the aspherical surface data according to the objective lens of Example 9. FIG. 27(*a*) is an optical path view in the case where the light flux whose light source wavelength is 400 nm is incident on the objective lens of Example 9, and FIG. 27(*b*) is an optical path view in the case where the light flux whose light source wavelength is 650 nm is incident on the objective lens of Example 9. FIG. 28(*a*) is a spherical aberration view in the case where the light flux whose light source wavelength is in the vicinity of 400 nm is incident on the objective lens of Example 9, and FIG. 28(*b*) is a spherical aberration view in the case where the light flux whose light source wavelength is in the vicinity of 650 nm is incident on the objective lens of Example 9.

TABLE 16

| Surface No. | R | D | n ($\lambda$ = 400 nm) | n ($\lambda$ = 650 nm) |
|---|---|---|---|---|
| Light source | ∞ | d0 | | |
| Aperture | ∞ | 0.0 | | |
| 1 (Aspherical surface 1 diffraction surface 1) | 2.0363 | 2.5000 | 1.50767 | 1.49529 |
| 2 (Aspherical surface 2) | −14.8624 | 0.1000 | | |
| 3 (Aspherical surface 3) | 1.3492 | 1.3500 | 1.60039 | 1.58037 |
| 4 | −12.0423 | d4 | | |
| 5 Cover glass | ∞ | d5 | 1.62158 | 1.57756 |
| 6 Cover glass Image surface | ∞ | 0.00 | | |
| | When $\lambda$ = 400 nm | When $\lambda$ = 650 nm | | |
| f | 1.92 | 1.98 | | |
| NA | 0.83 | 0.82 | | |
| d0 | ∞ | ∞ | | |
| d4 | 0.358 | 0.200 | | |
| d5 | 0.10 | 0.60 | | |

TABLE 17

Aspherical surface/diffraction surface coefficient

Aspherical surface 1

| | |
|---|---|
| κ= | 0.0 |
| $A_4=$ | $-1.1046 \times 10^{-2}$ |
| $A_6=$ | $-4.1053 \times 10^{-3}$ |
| $A_8=$ | $9.8081 \times 10^{-4}$ |
| $A_{10}=$ | $-6.7767 \times 10^{-4}$ |

Aspherical surface 2

| | |
|---|---|
| κ= | 0.0 |
| $A_4=$ | $3.0270 \times 10^{-2}$ |
| $A_6=$ | $-1.2017 \times 10^{-2}$ |
| $A_8=$ | $-4.1606 \times 10^{-3}$ |
| $A_{10}=$ | $1.7831 \times 10^{-3}$ |

Diffraction surface 1

| | |
|---|---|
| $b_2=$ | $2.5620 \times 10^{-2}$ |
| $b_4=$ | $-2.2713 \times 10^{-3}$ |
| $b_6=$ | $8.5691 \times 10^{-4}$ |
| $b_8=$ | $-2.4725 \times 10^{-4}$ |
| $b_{10}=$ | $-3.4787 \times 10^{-5}$ |

Aspherical surface 3

| | |
|---|---|
| κ= | 0.0 |
| $A_4=$ | $-5.7028 \times 10^{-3}$ |
| $A_6=$ | $1.2791 \times 10^{-2}$ |
| $A_8=$ | $-1.5440 \times 10^{-2}$ |
| $A_{10}=$ | $-7.1393 \times 10^{-3}$ |

Figure 29:
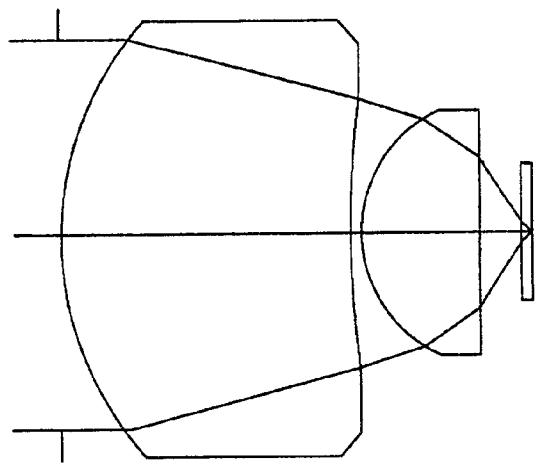
FIG. 29(a) is the optical path view when the light flux whose light source wavelength is 400 nm, is entered into the objective lens in an example 10.
FIG. 29(b) is the optical path view when the light flux whose light source wavelength is 650 nm, is entered into the objective lens in the example 10.
Figure 29:
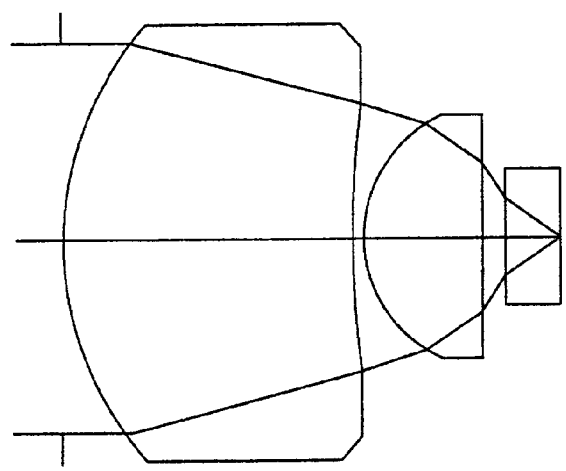
Figure 30:
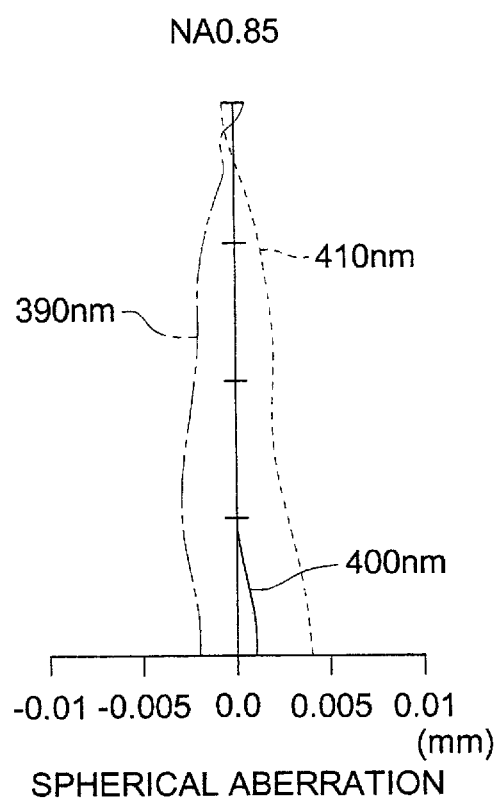
FIG. 30(a) is the spherical aberration view when the light flux whose light source wavelength is in the vicinity of 400 nm, is entered into the objective lens in the example 10.
FIG. 30(b) is the spherical aberration view when the light flux whose light source wavelength is in the vicinity of 650 nm, is entered into the objective lens in the example 10.
Figure 30:
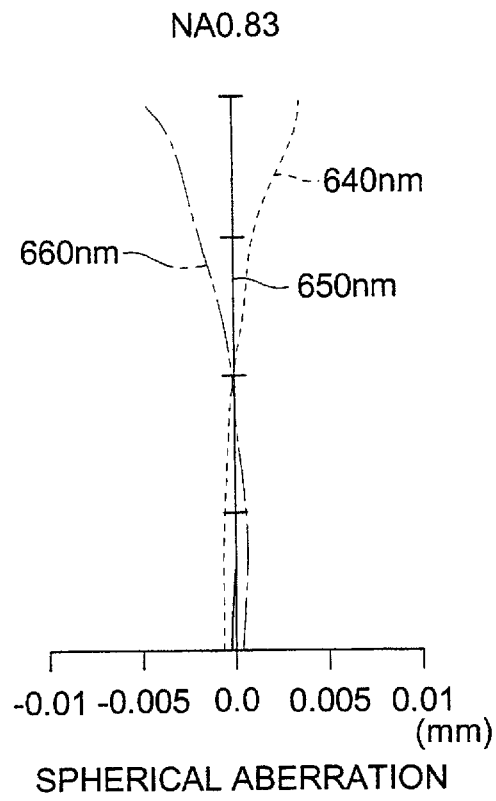

Table 18 is the lens data according to the objective lens of Example 10, and Table 19 is the aspherical surface data according to the objective lens of Example 10. FIG. 29(*a*) is an optical path view in the case where the light flux whose light source wavelength is 400 nm is incident on the objective lens of Example 10, and FIG. 29(*b*) is an optical path view in the case where the light flux whose light source wavelength is 650 nm is incident on the objective lens of Example 10. FIG. 30(*a*) is a spherical aberration view in the case where the light flux whose light source wavelength is in the vicinity of 400 nm is incident on the objective lens of Example 10, and FIG. 30(*b*) is a spherical aberration view in the case where the light flux whose light source wavelength is in the vicinity of 650 nm is incident on the objective lens of Example 10.

TABLE 18

| Surface No. | R | D | n (λ = 400 nm) | n (λ = 650 nm) |
|---|---|---|---|---|
| Light source | ∞ | d0 | | |
| Aperture | ∞ | 0.0 | | |
| 1 (Aspherical surface 1 diffraction surface 1) | 2.5445 | 3.121 | 1.50767 | 1.49529 |
| 2 (Aspherical surface 2) | 30.1804 | 0.1000 | | |
| 3 (Aspherical surface 3) | 1.3476 | 1.222 | 1.60039 | 1.58037 |
| 4 | 7.7991 | d4 | | |
| 5 Cover glass | ∞ | d5 | 1.62158 | 1.57756 |
| 6 Cover glass | ∞ | 0.00 | | |
| Image surface | | | | |

| | When λ = 400 nm | When λ = 650 nm |
|---|---|---|
| f | 2.35 | 2.41 |
| NA | 0.85 | 0.83 |
| d0 | ∞ | ∞ |
| d4 | 0.478 | 0.200 |
| d5 | 0.10 | 0.60 |

TABLE 19

Aspherical surface/diffraction surface coefficient

Aspherical surface 1

| | |
|---|---|
| κ= | 0.0 |
| $A_4=$ | $-4.0233 \times 10^{-4}$ |
| $A_6=$ | $-4.0368 \times 10^{-3}$ |
| $A_8=$ | $9.8676 \times 10^{-4}$ |
| $A_{10}=$ | $-1.7886 \times 10^{-4}$ |

Aspherical surface 2

| | |
|---|---|
| κ= | 0.0 |
| $A_4=$ | $8.4214 \times 10^{-2}$ |
| $A_6=$ | $-5.8551 \times 10^{-2}$ |
| $A_8=$ | $1.4917 \times 10^{-2}$ |
| $A_{10}=$ | $-1.3672 \times 10^{-3}$ |

Diffraction surface 1

| | |
|---|---|
| $b_2=$ | 0.0 |
| $b_4=$ | $-8.1431 \times 10^{-4}$ |
| $b_6=$ | $-3.5697 \times 10^{-4}$ |
| $b_8=$ | $8.5236 \times 10^{-5}$ |
| $b_{10}=$ | $-1.8259 \times 10^{-5}$ |

Aspherical surface 3

| | |
|---|---|
| κ= | 0.0 |
| $A_4=$ | $-2.8036 \times 10^{-2}$ |
| $A_6=$ | $3.5282 \times 10^{-2}$ |
| $A_8=$ | $-6.4449 \times 10^{-2}$ |
| $A_{10}=$ | $1.3535 \times 10^{-2}$ |

Aspherical surface 4

| | |
|---|---|
| κ= | 0.0 |
| $A_4=$ | $-4.7382 \times 10^{-2}$ |
| $A_6=$ | $-6.3116 \times 10^{-2}$ |
| $A_8=$ | $1.5718 \times 10^{-1}$ |
| $A_{10}=$ | $-6.6075 \times 10^{-2}$ |

Figure 31:
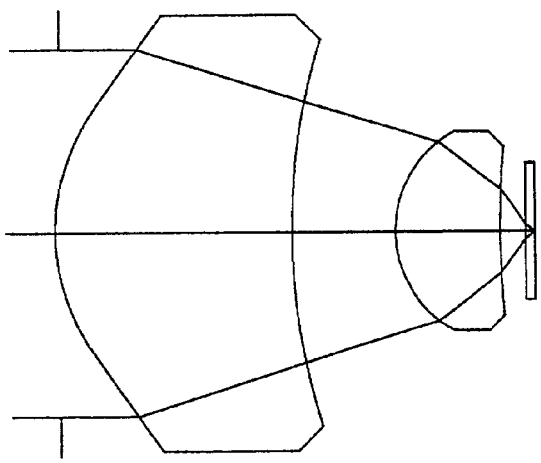
FIG. 31(a) is the optical path view when the light flux whose light source wavelength is 400 nm, is entered into the objective lens in an example 11.
FIG. 31(b) is the optical path view when the light flux whose light source wavelength is 650 nm, is entered into the objective lens in the example 11.
Figure 31:
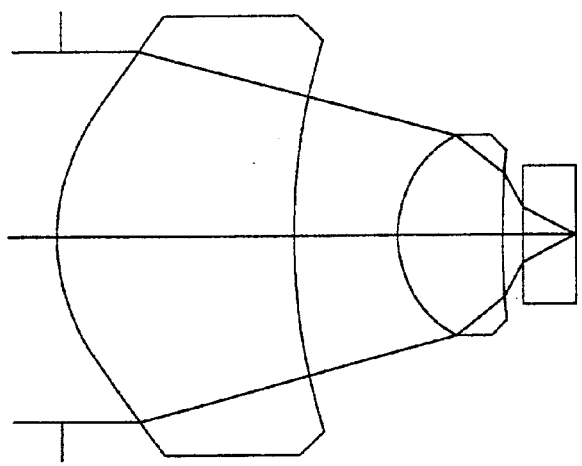
Figure 32:
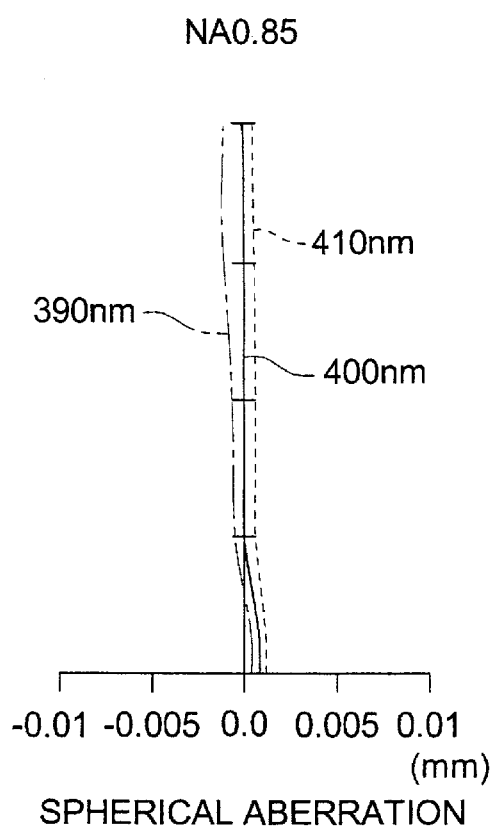
FIG. 32(a) is the spherical aberration view when the light flux whose light source wavelength is in the vicinity of 400 nm, is entered into the objective lens in an example 11.
FIG. 32(b) is the spherical aberration view when the light flux whose light source wavelength is in the vicinity of 650 nm, is entered into the objective lens in the example 11.
Figure 32:
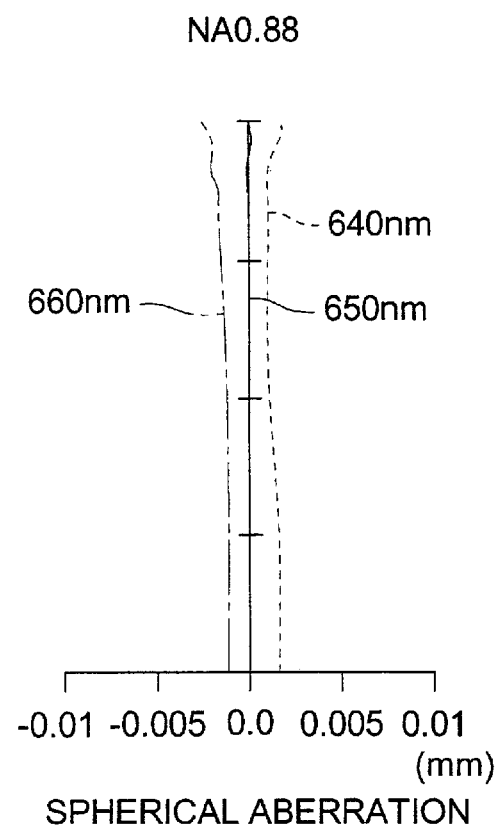

Table 20 is the lens data according to the objective lens of Example 11, and Table 21 is the aspherical surface data according to the objective lens of Example 11. FIG. 31(*a*) is an optical path view in the case where the light flux whose light source wavelength is 400 nm is incident on the objective lens of Example 11, and FIG. 31(*b*) is an optical path view in the case where the light flux whose light source wavelength is 650 nm is incident on the objective lens of Example 11. FIG. 32(*a*) is a spherical aberration view in the case where the light flux whose light source wavelength is in the vicinity of 400 nm is incident on the objective lens of Example 11, and FIG. 32(*b*) is a spherical aberration view in the case where the light flux whose light source wavelength is in the vicinity of 650 nm is incident on the objective lens of Example 11.

TABLE 20

| Surface No. | R | D | n (λ = 400 nm) | n (λ = 650 nm) |
|---|---|---|---|---|
| Light source | ∞ | d0 | | |
| Aperture | ∞ | 0.0 | | |
| 1 (Aspherical surface 1 diffraction surface 1) | 2.6851 | 2.477 | 1.50767 | 1.49529 |
| 2 (Aspherical surface 2) | 18.3367 | 1.150 | | |
| 3 (Aspherical surface 3) | 1.1229 | 1.124 | 1.60039 | 1.58037 |
| 4 | 48.5371 | d4 | | |
| 5 Cover glass | ∞ | d5 | 1.62158 | 1.57756 |
| 6 Cover glass | ∞ | 0.00 | | |
| Image surface | | | | |

TABLE 20-continued

|   | When λ = 400 nm | When λ = 650 nm |
|---|---|---|
| f | 2.35 | 2.42 |
| NA | 0.85 | 0.88 |
| d0 | ∞ | 22.579 |
| d4 | 0.293 | 0.201 |
| d5 | 0.10 | 0.60 |

TABLE 21

Aspherical surface/diffraction surface coefficient

| Aspherical surface 1 | | Aspherical surface 2 | |
|---|---|---|---|
| K= | 0.0 | K= | 0.0 |
| $A_4=$ | $6.2324 \times 10^{-3}$ | $A_4=$ | $6.0944 \times 10^{-2}$ |
| $A_6=$ | $-2.7358 \times 10^{-3}$ | $A_6=$ | $-3.1980 \times 10^{-2}$ |
| $A_8=$ | $4.9835 \times 10^{-4}$ | $A_8=$ | $6.3385 \times 10^{-3}$ |
| $A_{10}=$ | $-9.2157 \times 10^{-5}$ | $A_{10}=$ | $-4.0811 \times 10^{-4}$ |
| Diffraction surface 1 | | | |
| $b_2=$ | $-7.5479 \times 10^{-3}$ | | |
| $b_4=$ | $6.5354 \times 10^{-4}$ | | |
| $b_6=$ | $-5.9254 \times 10^{-4}$ | | |
| $b_8=$ | $1.8987 \times 10^{-4}$ | | |
| $b_{10}=$ | $-2.4754 \times 10^{-5}$ | | |
| Aspherical surface 3 | | | |
| K= | 0.0 | | |
| $A_4=$ | $6.7309 \times 10^{-2}$ | | |
| $A_6=$ | $-8.8713 \times 10^{-2}$ | | |
| $A_8=$ | $4.2080 \times 10^{-2}$ | | |
| $A_{10}=$ | $-3.8927 \times 10^{-2}$ | | |
| Aspherical surface 4 | | | |
| K= | 0.0 | | |
| $A_4=$ | $9.9287 \times 10^{-2}$ | | |
| $A_6=$ | $-2.0045 \times 10^{-1}$ | | |
| $A_8=$ | $1.9940 \times 10^{-1}$ | | |
| $A_{10}=$ | $1.3539 \times 10^{-1}$ | | |

Figure 33:
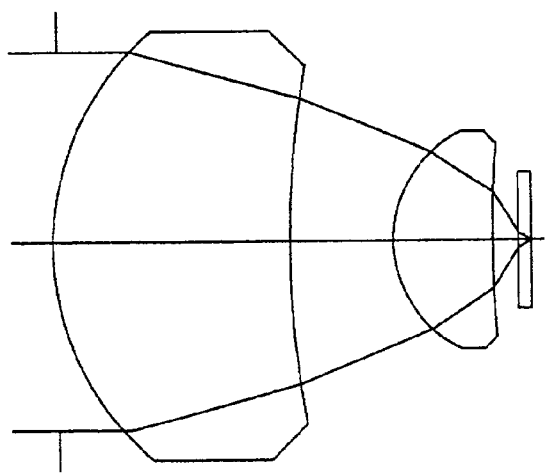
FIG. 33(a) is the optical path view when the light flux whose light source wavelength is 400 nm, is entered into the objective lens in an example 12.
FIG. 33(b) is the optical path view when the light flux whose light source wavelength is 650 nm, is entered into the objective lens in the example 12.
Figure 33:
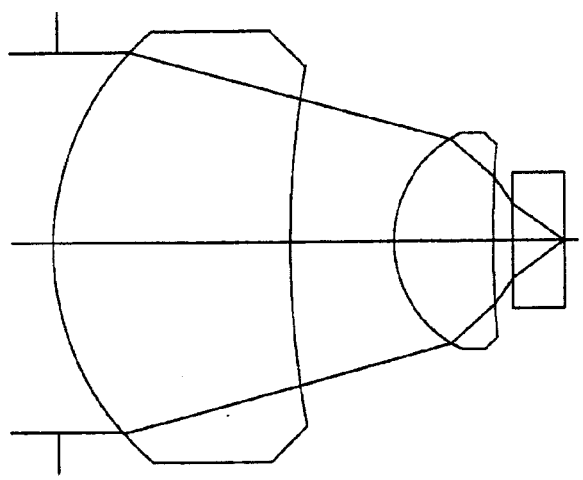

Table 22 is the lens data according to the objective lens of Example 12, and Table 23 is the aspherical surface data according to the objective lens of Example 12. FIG. 33(a) is an optical path view in the case where the light flux whose light source wavelength is 400 nm is incident on the objective lens of Example 12, and FIG. 33(b) is an optical path view in the case where the light flux whose light source wavelength is 650 nm is incident on the objective lens of Example 12. FIG. 34(a) is a spherical aberration view in the case where the light flux whose light source wavelength is in the vicinity of 400 nm is incident on the objective lens of Example 11, and FIG. 34(b) is a spherical aberration view in the case where the light flux whose light source wavelength is in the vicinity of 650 nm is incident on the objective lens of Example 12.

TABLE 22

| Surface No. | R | D | n (λ = 400 nm) | n (λ = 650 nm) |
|---|---|---|---|---|
| Light source | ∞ | do | | |
| Aperture | ∞ | 0.0 | | |
| 1 (Aspherical surface 1 diffraction surface 1) | 2.5321 | 2.489 | 1.50767 | 1.49529 |
| 2 (Aspherical surface 2) | 17.6737 | 1.106 | | |

TABLE 22-continued

| | | | | |
|---|---|---|---|---|
| 3 (Aspherical surface 3) | 1.1134 | 1.034 | 1.60039 | 1.58037 |
| 4 | −199.389 | d4 | | |
| 5 Cover glass | ∞ | d5 | 1.62158 | 1.57756 |
| 6 Cover glass | ∞ | 0.00 | | |
| Image surface | | | | |

|   | When λ = 400 nm | When λ = 650 nm |
|---|---|---|
| f | 2.34 | 2.40 |
| NA | 0.85 | 0.86 |
| d0 | ∞ | 22.524 |
| d4 | 0.2928 | 0.2011 |
| d5 | 0.10 | 0.60 |

TABLE 23

Aspherical surface/diffraction surface coefficient

| Aspherical surface 1 | | Aspherical surface 2 | |
|---|---|---|---|
| K= | 0.0 | K= | 0.0 |
| $A_4=$ | $4.4218 \times 10^{-3}$ | $A_4=$ | $5.5520 \times 10^{-2}$ |
| $A_6=$ | $-2.8290 \times 10^{-3}$ | $A_6=$ | $-3.2287 \times 10^{-2}$ |
| $A_8=$ | $4.8087 \times 10^{-4}$ | $A_8=$ | $6.4661 \times 10^{-3}$ |
| $A_{10}=$ | $-9.6310 \times 10^{-5}$ | $A_{10}=$ | $-3.4616 \times 10^{-4}$ |
| Diffraction surface 1 | | | |
| $b_2=$ | $-7.1549 \times 10^{-3}$ | | |
| $b_4=$ | $6.8588 \times 10^{-4}$ | | |
| $b_6=$ | $-6.1172 \times 10^{-4}$ | | |
| $b_8=$ | $1.8122 \times 10^{-4}$ | | |
| $b_{10}=$ | $-2.0035 \times 10^{-5}$ | | |
| Aspherical surface 3 | | | |
| K= | 0.0 | | |
| $A_4=$ | $6.6942 \times 10^{-2}$ | | |
| $A_6=$ | $-1.1213 \times 10^{-1}$ | | |
| $A_8=$ | $6.2206 \times 10^{-2}$ | | |
| $A_{10}=$ | $-7.6179 \times 10^{-2}$ | | |
| Aspherical surface 4 | | | |
| K= | 0.0 | | |
| $A_4=$ | $1.2260 \times 10^{-1}$ | | |
| $A_6=$ | $-4.4575 \times 10^{-1}$ | | |
| $A_8=$ | $4.4697 \times 10^{-1}$ | | |
| $A_{10}=$ | $6.3971 \times 10^{-2}$ | | |

As described above, in any one of the objective lenses of Examples, it can be seen that the spherical aberration is suppressed small.

Incidentally, in Examples 8, 9, and 10, the object point position is infinite for any one of the first information recording medium, and the second information recording medium. In Examples 11 and 12, the object point position is infinite for the first information recording medium, and the object point position is finite for the second information recording medium. Further, in Examples 8 and 12, the spherical aberration for the aperture from NA2 to NA1 is made flare for the second information recording medium. Further, in Example 9, 10 and 11, the spherical aberration for the aperture from NA2 to NA1 is corrected to a small amount for the second information recording medium.

In the condition of use of the objective lens, the numerical aperture on the image side of the light flux emitted from the objective lens may be different in such a manner as the numerical aperture NA1 or NA2 necessary for the recording and reproducing of each information recording medium.

In each Example, as the NA in the aberration view, the NA determined by the aperture of a predetermined aperture diameter, provided on the tangential plane of the first surface, is shown, however, the aperture may be provided at another position, and the aperture diameter may be reduced for the second information recording medium. Incidentally, the maximum NA in each wavelength used in the calculation of the wave front aberration is the NA determined by the aperture of the predetermined aperture diameter, and although it is a little different from the NA1 necessary for the recording and reproducing of the first information recording medium, there is no large difference in a value of the wave front aberration.

Referring to the drawings, a preferred embodiment of the present invention will be described below. The diffraction surface is expressed by the mother aspherical surface showing the macro shape in which the diffraction relief is removed, and the optical path difference function. The optical path difference function expresses the optical path difference added by the diffraction surface to the diffraction light of the predetermined order number with the predetermined production wavelength, and the diffracting ring-shaped band is provided every time when the value of optical path difference function is changed by $m\lambda$ (m is the order number of the diffraction).

In the example of the present invention, the mother aspherical surface of the diffraction surface and the optical path difference function are expressed by respectively other functions in the inside (optical axis side) and the outside (peripheral side) by defining the distance hb from the optical axis as a border.

In this case, constant terms are provided in the outside mother aspherical surface and the outside optical path difference function so that the mother aspherical surface and the optical path difference function are practically continuous. The optical path difference function $\Phi(h)$ is expressed by the following expression.

$$\Phi(h) = b0 + b2 \times h^2 + b4 \times h^4 + b6 \times h^6 + \quad (17)$$

Where, h: distance from the optical axis, b0, b2, b4, b6: coefficients of the optical path difference function.

On the one hand, the aspherical surface is expressed by the following expression.

$$X = (h^2/r)/(1+\sqrt{(1-(1+k)h^2/r^2)}) + A0 + A2 \times h^2 + A4 \times h^4 + A6 \times h^6 + \quad (18)$$

Where, A0, A2, A4, A6, . . . : aspherical surface coefficient, k: conical coefficient, r: paraxial radius of curvature, r, d, n, vd respectively express the radius of curvature of the lens, spacing, refractive index in the reference wavelength, and Abbe's number.

When the above definition is based on, by making the second order coefficient of the optical path difference function a value of not zero, the lens can be caused to have the power. Further, when the coefficient of other than the second order of the optical path difference function, for example, the 4-th order coefficient, the 6-th order coefficient, the 8-th order coefficient, the 10-th order coefficient, etc., are made to values of not zero, the spherical aberration can be controlled. Incidentally, [to control] means that the spherical aberration possessed by a portion having the refractive power is corrected by generating the reverse spherical aberration, or the spherical aberration of the whole is made to a desired value.

Figure 35:
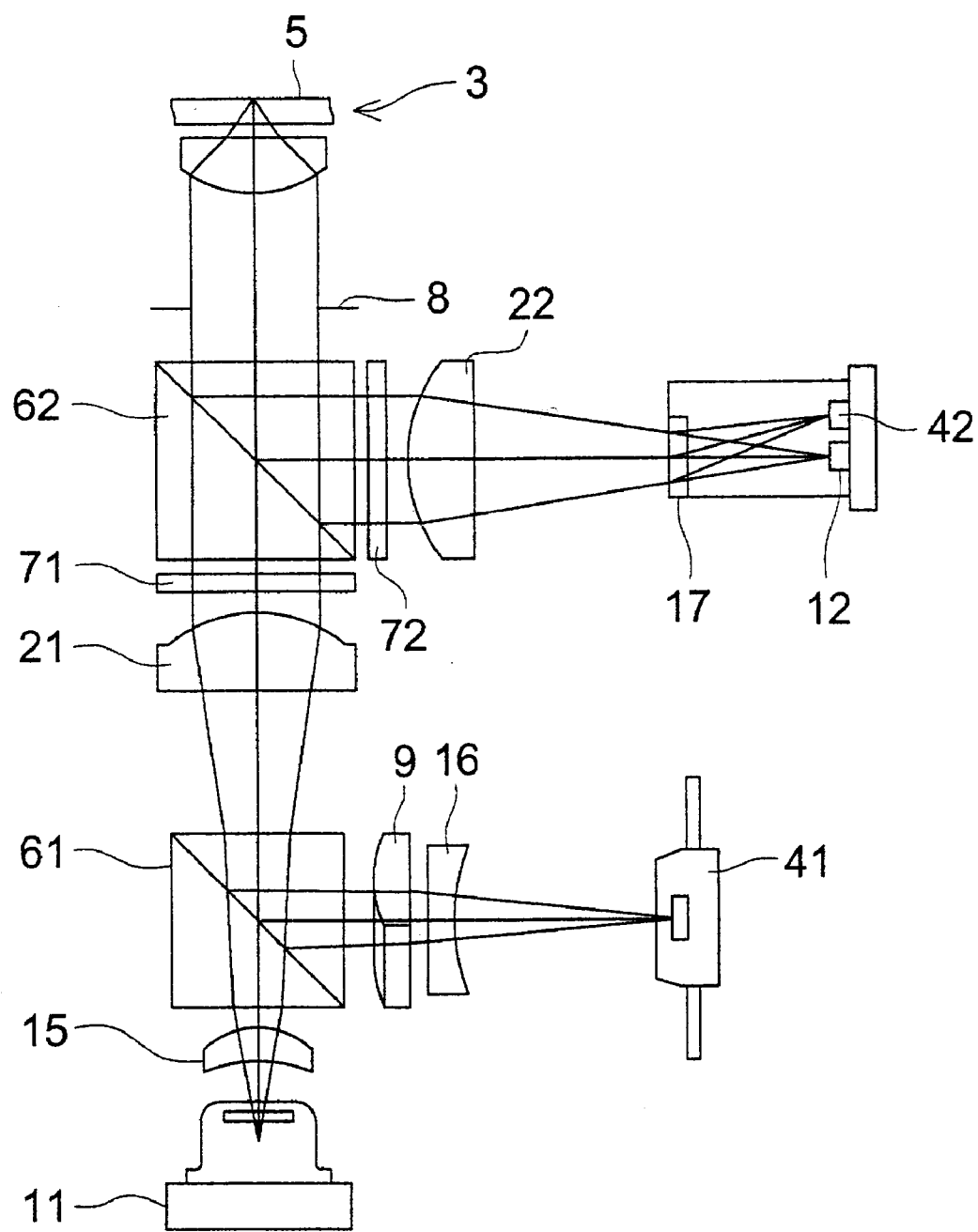
FIG. 35 is an outline structural view of an optical pick-up apparatus according to the present embodiment.

FIG. 35 is a outline structural view of the optical pick-up apparatus according to the present embodiment. In FIG. 35, the optical pick-up apparatus has the first light source 11 to conduct the recording and/or reproducing for the first optical information recording medium (optical disk, for example, CD), and the second light source 12 whose wavelength is different from that of the first light source 11, to conduct the recording and/or reproducing for the second optical information recording medium, and has coupling lenses 21, 22 to convert the divergence angles of the divergence light flux emitted from respective light sources into the desired divergence angles, a beam splitter 62, which is an optical composition means, to compose the light flux so that the light flux advances to almost one direction, an objective lens 3 to converge the light flux from the beam splitter 62 onto the information recording surface 5 of the optical information recording medium, and light detectors 41 and 42 for light receiving the reflected light from the optical information recording medium. In the drawing, numeral 8 is an aperture, numeral 9 is a cylindrical lens, numerals 71 and 72 are ¼ wavelength plates, numeral 15 is a coupling lens to reduce the divergent order number of the divergent light flux from the light source 11, numeral 16 is a concave lens, and numeral 17 is a hologram to separate the reflected light flux. The objective lens 3 uses examples 1, and 2, which will be described later.

The first light source 11 emits the laser light of the wavelength $\lambda 1$=about 650 nm, and in this case, the numerical aperture of the objective lens necessary for recording and/or reproducing for the optical information recording medium (DVD) whose transparent substrate thickness t1 is 0.6 mm, is NA1=0.63. The second light source 12 emits the laser light of the wavelength $\lambda 2$=about 780 nm, and in this case, the numerical aperture of the objective lens necessary for recording and/or reproducing for the optical information recording medium (CD) whose transparent substrate thickness t2 is 1.2 mm, is NA2=0.5.

EXAMPLE 13

Figure 36:
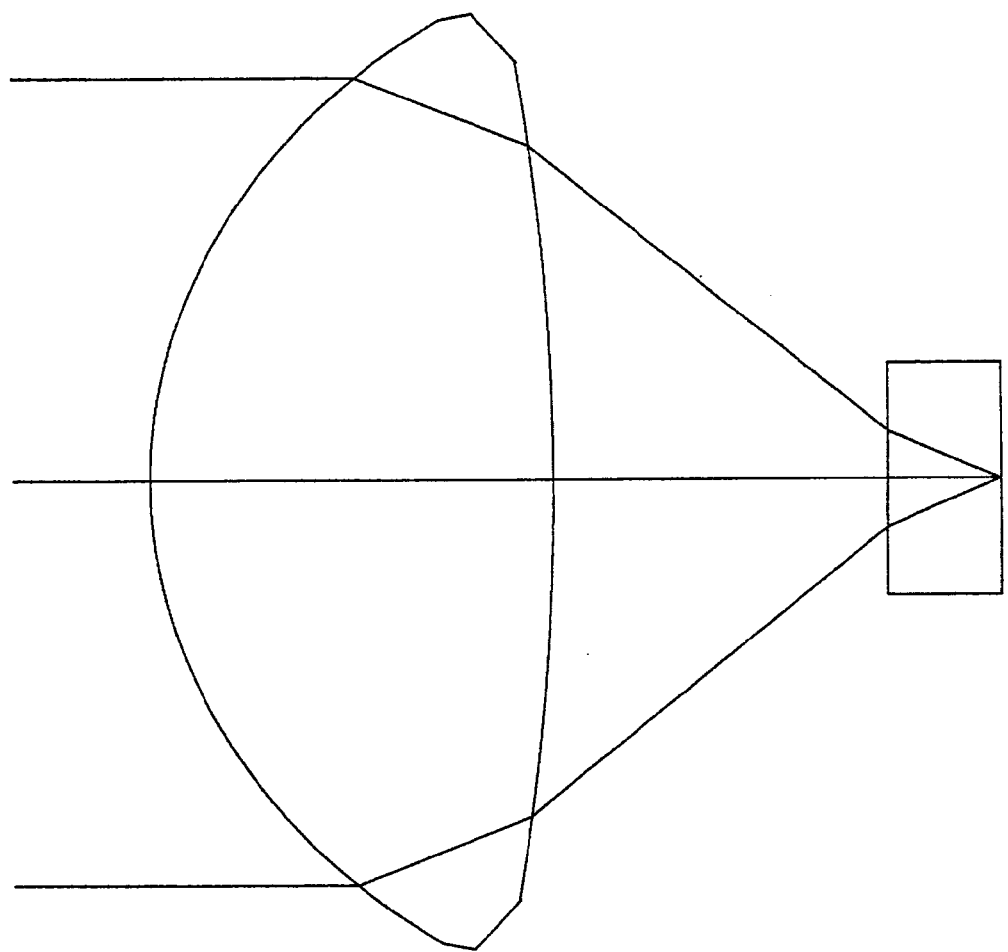
FIG. 36 is a sectional view of an objective lens in the example 13.
Figure 37:
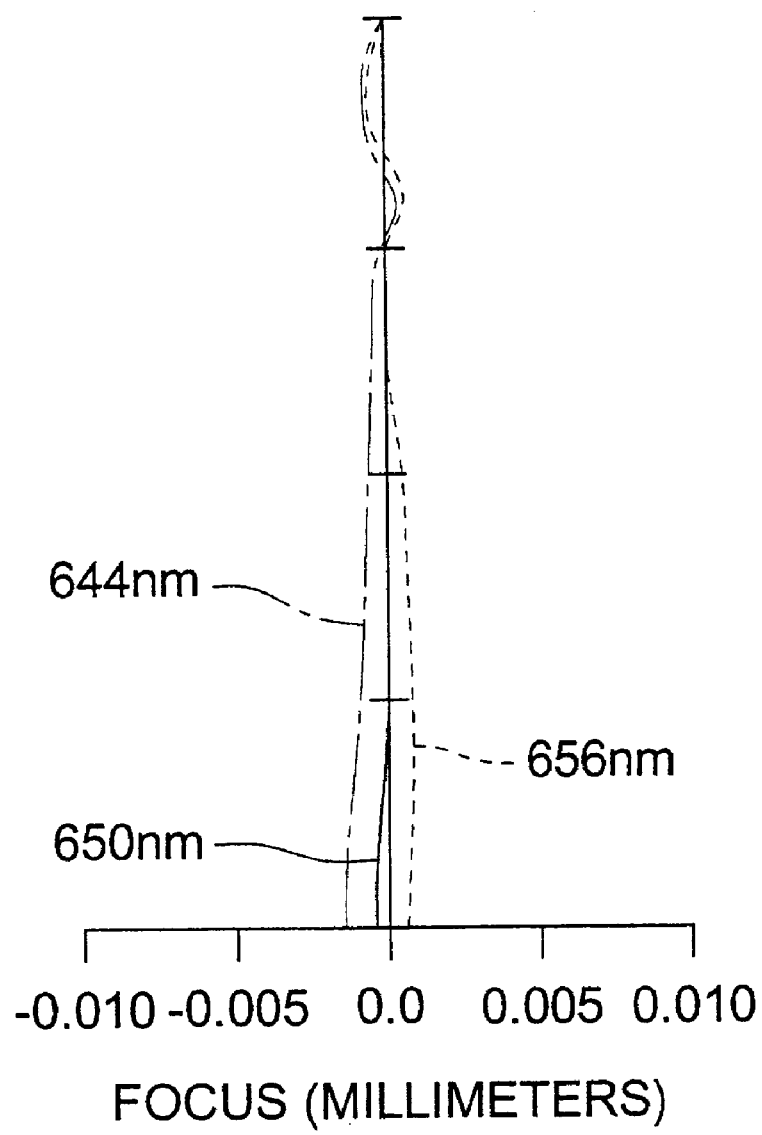
FIG. 37 is a spherical aberration view of the DVD specification in the objective lens in the example 13.
Figure 38:
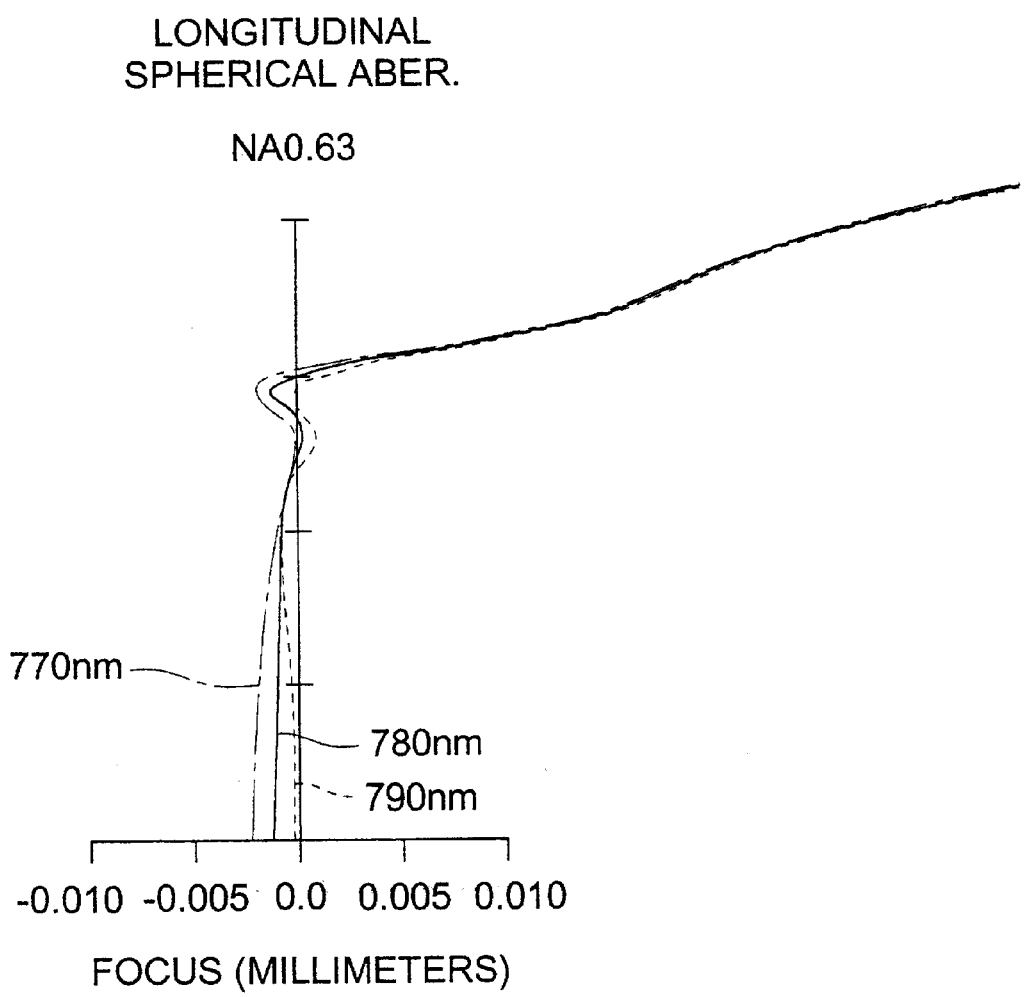
FIG. 38 is a spherical aberration view of the CD specification in the objective lens in the example 13.

FIG. 36 is a sectional view of the objective lend of Example 13, and FIGS. 37 and 38 are spherical aberration views in the objective lens in Example 13. In [Table 24], the lens data in Example 13 is shown.

TABLE 24

Example (1)
When the light source wavelength λ1 = 650 nm,
the focal distance f1 = 3.36 (mm),
the image side numerical aperture NA = 0.63.
When the light source wavelength λ2 = 780 nm,
the focal distance f2 = 3.38 (mm),
the image side numerical aperture NA = 0.63
(the predetermined numerical aperture NA = 0.50).

| Surface No. | R | D1 | D2 | n1 | n2 |
|---|---|---|---|---|---|
| Object point | | ∞ | ∞ | | |
| 1 (Aspherical surface 1, diffraction surface) | | 2.20 | 2.20 | 1.54113 | 1.53728 |
| 2 (Aspherical surface 2) | 8.52459 | 1.75 | 1.38 | | |

TABLE 24-continued

Example (1)
When the light source wavelength λ1 = 650 nm,
the focal distance f1 = 3.36 (mm),
the image side numerical aperture NA = 0.63.
When the light source wavelength λ2 = 780 nm,
the focal distance f2 = 3.38 (mm),
the image side numerical aperture NA = 0.63
(the predetermined numerical aperture NA = 0.50).

| Surface No. | R | D1 | D2 | n1 | n2 |
|---|---|---|---|---|---|
| 3 (Cover glass) | ∞ | 0.60 | 1.20 | 1.57787 | 1.57084 |
| 4 | ∞ | | | | |

Suffix 1 shows, when λ = 650 nm, suffix 2 shows, when λ = 780 nm.
*When NA is lower than 0.5, the first degree diffraction is used, when NA is lager than 0.5, the second degree diffraction is used.

The border hb=1.68

Coefficient of the optical path difference function

| | when h ≦ hb | *Optical path difference function of the first degree diffraction light (production wavelength 710 nm) *diffraction ring band is provided every time when 1 λ is changed. |
|---|---|---|
| b2= | 0 | |
| b4= | −0.14329 × 10⁻² | |
| b6= | 0.13445 × 10⁻² | |
| b8= | −0.66304 × 10⁴ | |
| b10= | 0.56136 × 10⁻⁶ | |
| | when h > hb | *Optical path difference function of the second degree diffraction light (production wavelength 650 nm) *diffraction ring band is provided every time when 2 λ is changed. |
| b0= | −0.12780 × 10⁻³ | |
| b2= | −0.15989 × 10² | |
| b4= | −0.12325 × 10² | |
| b6= | 0.29589 × 10² | |
| b8= | −0.51877 × 10⁻⁴ | |
| b10= | 0.31523 × 10⁻⁵ | |

Aspherical surface coefficient

| | when h ≦ hb | The first surface R |
|---|---|---|
| k= | −2.5093 | |
| A4= | 0.25830 × 10⁻¹ | when h ≦ hb, R = 2.241 |
| A6= | −0.29872 × 10⁻² | when h < hb, R = 2.102 |
| A8= | 0.34107 × 10⁻³ | |
| A10= | −0.23030 × 10⁴ | |
| | when h > hb | |
| k= | −0.41071 | |
| A0= | 0.16800 × 10⁻³ | |
| A4= | 0.13119 × 10⁻¹ | |
| A6= | −0.66292 × 10⁻² | |
| A8= | 0.13863 × 10⁻² | |
| A10= | −0.12236 × 10³ | |

Aspherical surface coefficient
the second surface

| k= | 8.53682 |
|---|---|
| A4= | 0.250210 × 10¹ |
| A6= | −0.140613 × 10⁻¹ |
| A8= | 0.689092 × 10⁻² |
| A10= | −0.205553 × 10⁻² |
| A12= | 0.327714 × 10⁻³ |
| A14= | −0.216581 × 10⁴ |

EXAMPLE 14

Figure 39:
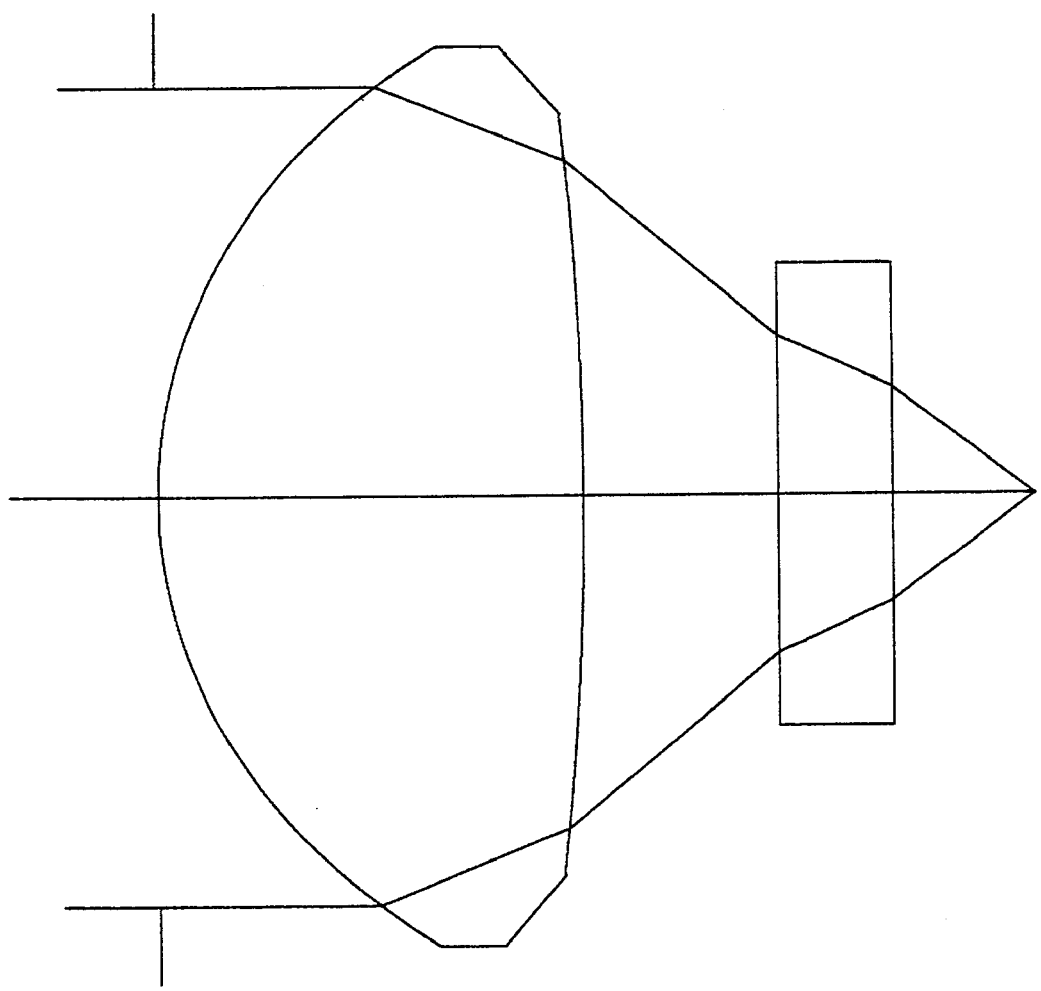
FIG. 39 is a sectional view of the objective lens in an example 14.
Figure 40:
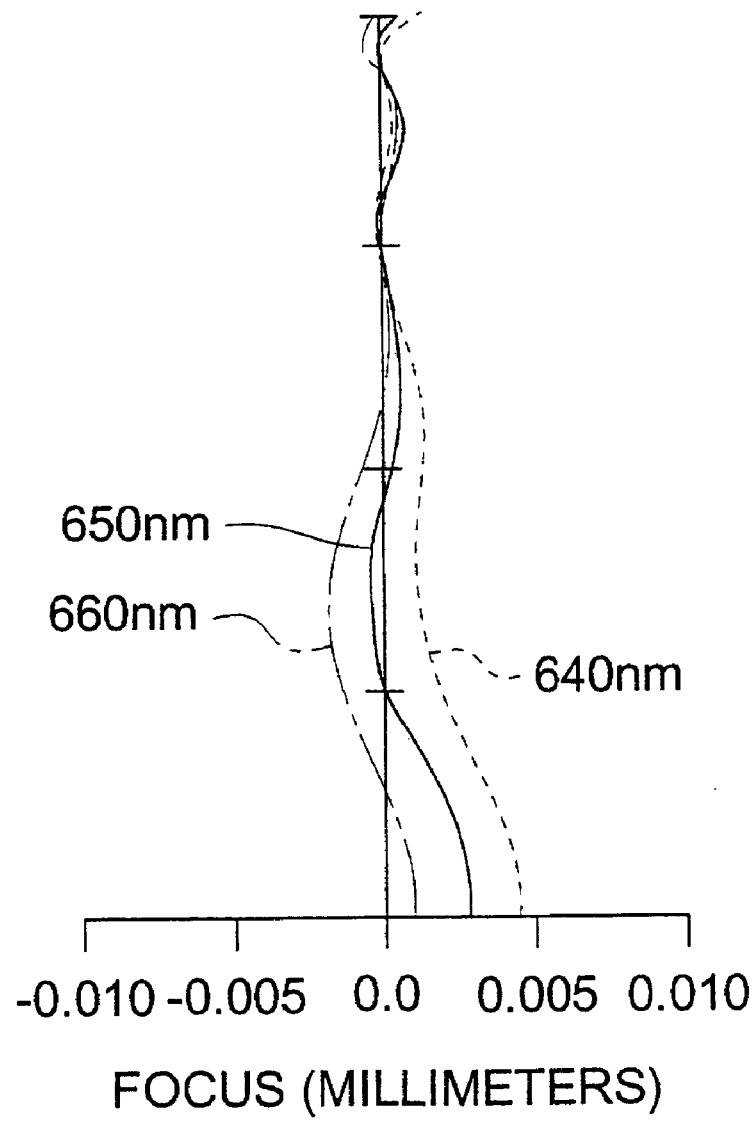
FIG. 40 is a spherical aberration view of the DVD specification in the objective lens in the example 14.
Figure 41:
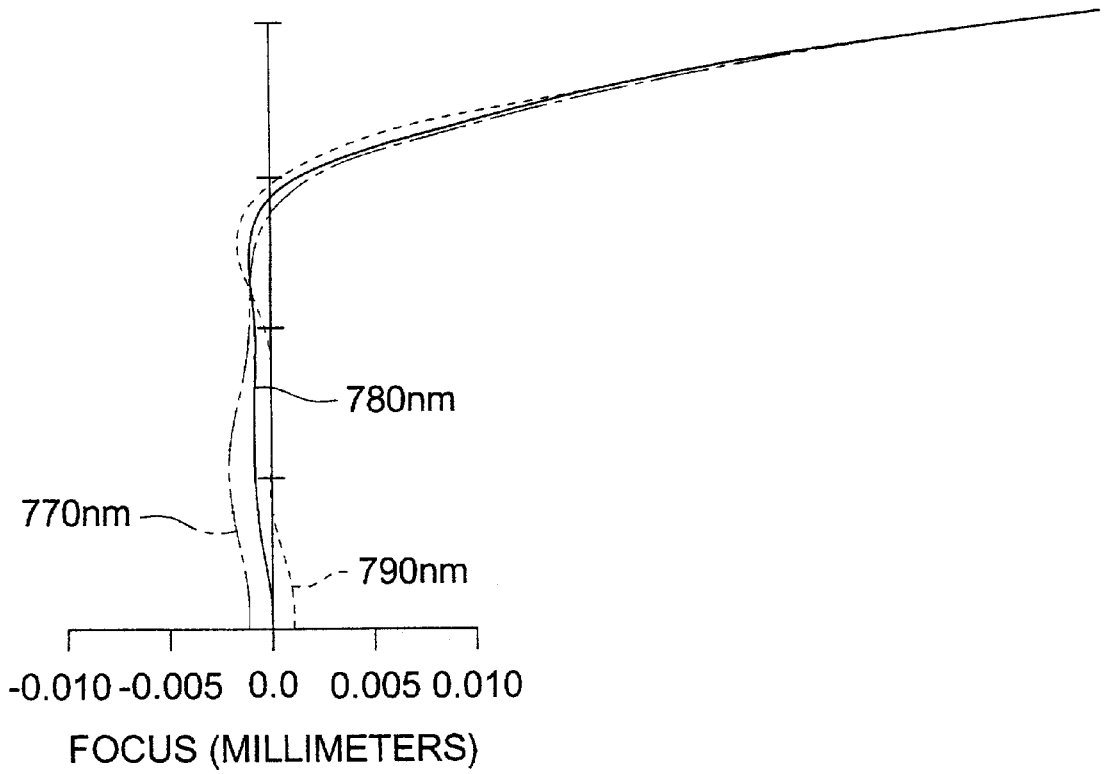
FIG. 41 is a spherical aberration view of the CD specification in the objective lens in the example 14.

FIG. 39 is a sectional view of the objective lens in Example 14, and FIGS. 40 and 41 are spherical aberration views in Example 14. In [Table 25], the lens data of the objective lens in Example 14 is shown.

TABLE 25

Example (1)
When the light source wavelength λ1 = 650 nm,
the focal distance f1 = 3.36 (mm),
the image side numerical aperture NA = 0.63.
When the light source wavelength λ2 = 780 nm,
the focal distance f2 = 3.38 (mm),
the image side numerical aperture NA = 0.63
(the predetermined numerical aperture NA = 0.50).

| Surface No. | R | D1 | D2 | n1 | n2 |
|---|---|---|---|---|---|
| Object point | ∞ | ∞ | | | |
| 1 (Aspherical surface 1, diffraction surface) | 2.05803 | 2.20 | 2.20 | 1.54113 | 1.53728 |
| 2 (Aspherical surface 2) | 9.74191 | 1.72 | 1.33 | | |
| 3 (Cover glass) | ∞ | 0.60 | 1.20 | 1.57787 | 1.57084 |
| 4 | ∞ | | | | |

Suffix 1 shows, when λ = 650 nm, suffix 2 shows, when λ = 780 nm.
*When NA is lower than 0.5, the first degree diffraction is used, when NA is lager than 0.5, the second degree diffraction is used.

The border hb=1.68

Coefficient of the optical path difference function

| | when h ≦ hb | *Optical path difference function of the first degree diffraction light (production wavelength 710 nm) *diffraction ring band is provided every time when 1 λ is changed. |
|---|---|---|
| b2= | 0 | |
| b4= | −0.11414 × 10³ | |
| b6= | −0.83830 × 10³ | |
| b8= | 0.19320 × 10⁻³ | |
| b10= | −0.11557 × 10⁻⁴ | |
| | when h > hb | *Optical path difference function of the second degree diffraction light (production wavelength 650 nm) *diffraction ring band is provided every time when 2 λ is changed. |
| b4= | −0.10449 × 10⁻³ | |
| b6= | −0.76746 × 10⁻³ | |
| b8= | 0.17687 × 10⁻³ | |
| b10= | −0.10580 × 10⁻⁴ | |

| Aspherical surface coefficient The first surface | | Aspherical surface coefficient The second surface | |
|---|---|---|---|
| k= | −0.97964 | k= | 19.22147 |
| A4= | 0.63335 × 10⁻² | A4= | 0.946777 × 10² |
| A6= | −0.17357 × 10² | A6= | 0.222870 × 10⁻² |
| A8= | 0.59220 × 10³ | A8= | −0.114464 × 10⁻² |
| A10= | −0.52764 × 10⁴ | A10= | 0.164623 × 10⁻³ |

Incidentally, the maximum value and the minimum value of the difference in level of the diffracting ring-shaped band blazed in the objective lens in Examples 13 and 14 are shown in [Table 26].

TABLE 26

| | Example 13 | Example 14 |
|---|---|---|
| Maximum value of difference in level (μm) | 3.26 | 3.31 |
| Minimum value of difference in level (μm) | 1.36 | 1.37 |
| Ratio | 2.4 | 2.4 |

According to the objective lens in Examples 13 and 14, this will be further detailed below. The objective lens in Examples 13 and 14 can be used for the information recording or reproducing of the DVD as the first optical information recording medium whose substrate thickness is 0.6 mm, by the light flux from the light source of the wavelength 650 nm, further, can be used for the information recording or reproducing of the CD as the second optical information recording medium whose substrate thickness is 1.2 mm by the light flux from the light source of the wavelength 780 nm. The maximum numerical aperture NA is 0.63, and the necessary numerical aperture NA for the CD by the wavelength 780 nm, is 0.50.

The diffraction surface of the objective lens is provided on the first surface, and in the range lower than NA 0.5, it is blazed for the+ first order diffracted ray, that is, the intensity of+first order diffracted ray is the highest. The direction of+ first order diffracted ray is a direction to which the light flux is more converged than 0-order light. When it is blazed, the production wavelength of the light source is 780 nm, that is, the diffraction efficiency is made maximum for the light flux from the light source of the wavelength of 780 nm.

Further, in the range larger than the numerical aperture NA 0.5, it is blazed for the+ second order diffracted ray, that is, the intensity of+ second order diffracted ray is the highest. As compared to the case where it is blazed by the+ first order diffracted ray, the ring-shaped band interval is about 2 times, and the depth of the difference in level between ring-shaped bands is also about 2 times. When it is blazed in this manner, the production wavelength of the light source is 650 nm.

In this objective lens, the spherical aberration is generated in the light flux in which the numerical aperture NA on the CD side is more than 0.5, and the flare is generated, so that the same spot diameter as the diffraction limit lens whose numerical aperture NA on the CD side is 0.5 can be obtained also by the light flux of the aperture diameter of numerical aperture NA 0.63. When this flare is converged into the narrow range, or the intensity is large, there is a possibility that it is erroneously detected by the detector as the focus signal or tracking signal.

In the case where the optimum blazing is conducted on+ first order diffracted ray, when the ideal blaze shape is the diffraction efficiency is 100% in the light source wavelength 650 nm, the diffraction efficiency in the light source wavelength 780 nm is 91%. In the same manner, when the optimum blazing is conducted by+ second order diffracted ray, the diffraction efficiency in the light source wavelength 780 nm is 68%. Accordingly, when+ second order diffracted ray is used in a portion more than the numerical aperture NA 0.5, because the light flux generated as the flare is dispersed to other order numbers at the time of information recording or reproducing of the CD, and the diffraction efficiency is lowered, the influence of the flare of the main order number (+ second order)can be decreased. Further, in this case, the light flux of other unnecessary order numbers such as+ first order light, and+ third order light, can be made to larger flare on the recording surface, thereby, the influence can be suppressed to be small.

In FIG. 42, the spot diagram of the light flux more than numerical aperture NA 0.5 when the information recording or reproducing is conducted on the CD by the objective lens in Example 13, is shown. According to such the spot diagram, it can be seen that, when the information recording or reproducing is conducted on the DVD,+ second order diffracted ray passing through the numerical aperture NA 0.5–0.63, is formed on the information recording surface as a spot light. Accordingly, by using the high intensive light, good information recording or reproducing can be performed. On the one hand, it can be seen that, when the information recording or reproducing is conducted on the CD,+ first order diffracted ray passing through the numerical aperture NA 0.5–0.63, is formed on the information recording surface as a wide range of flare light, thereby, the erroneous detection of the detector can be prevented. Further, for both of the CD and DVD, the first order diffracted ray and the third order diffracted ray are also formed as a wide range of flare light.

Figure 43:
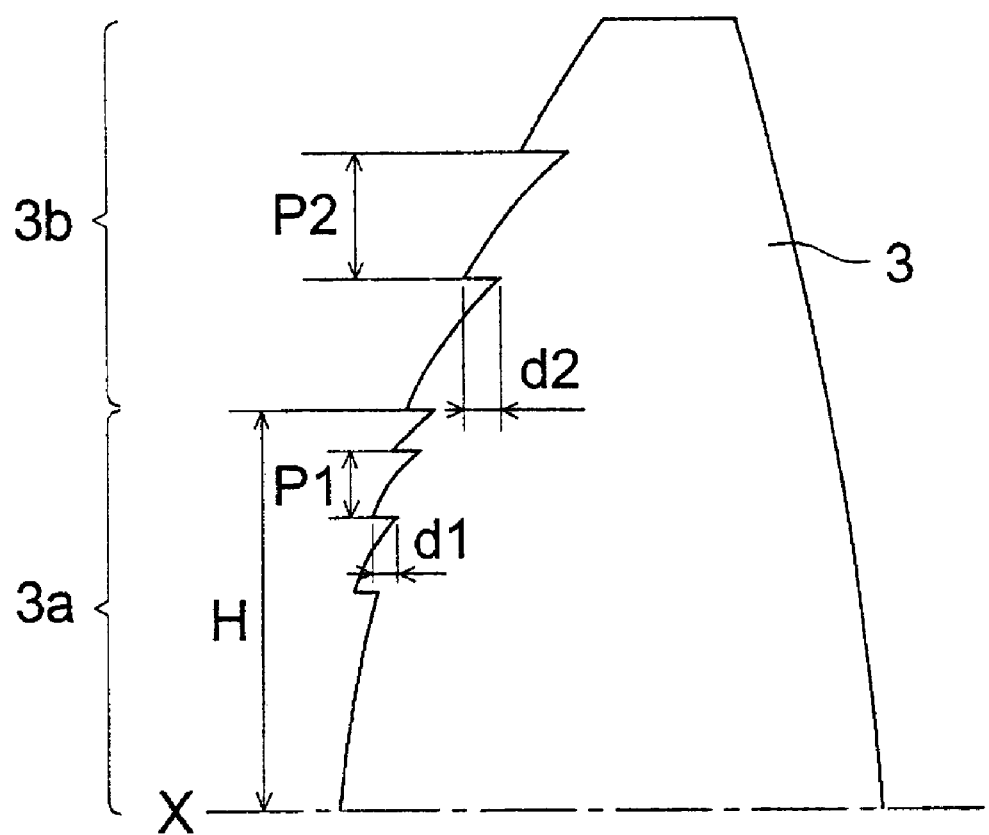
FIG. 43 is a typical view showing an example of a lens as an optical element in which the diffracting ring-shaped band is provided.

Further, the objective lens of the optical pick-up apparatus is generally produced by molding the plastic or glass by a die, and the die is processed by cutting by using a super precision lathe. In the diffraction lens having the diffracting ring-shaped band, as shown in FIG. 43, the sectional shape including the optical axis is the saw-toothed shape, and when the die is processed, because the edge of the blade for cutting has a some degree of large roundness, the edge of the saw tooth gets out of shape corresponding to the largeness of the roundness. In the portion which gets out of shape, the effective light amount is lost, however, when the interval (pitch) between ring-shaped bands is narrow, the loss becomes large.

For example, in the case where the loss is found in the objective lens in Example 13, when the most peripheral side ring-shaped band (ring-shaped band interval 22 $\mu$m) is blazed by the cutting edge having the roundness of radius of 4 $\mu$m at+ first order diffracted ray, the calculation value of the transmission light amount loss at this ring-shaped band is 16.4%. In contrast to this, as the above embodiment, when blazing is conducted so that the light intensity of+ second order diffracted ray is the highest in more than numerical aperture NA 0.5, the calculation value of the transmission light amount loss at this ring-shaped band is 14.9% at the interval of the diffracting ring-shaped band is 44 $\mu$m. Accordingly, according to the present embodiment, the transmission light amount can be increased.

According to the present invention, although the small number of optical elements or objective lens are used, the optical elements appropriate for the optical pick-up apparatus, and the optical pick-up apparatus using these optical elements, in which the recording and/or reproducing (hereinafter, simply called recording and reproducing) of the information can be conducted on the optical information recording media with different thickness, and the erroneous detection can be suppressed, can be provided.

Disclosed embodiment can be varied by a skilled person without departing from the spirit and scope of the invention.

What is claimed is:

1. An optical pickup apparatus to conduct reproducing and/or recording information of a first optical information recording medium including a first transparent base plate having a thickness of t1 and a second optical information recording medium including a second transparent base plate having a thickness of t2 (t2>t1), comprising:

a first light source to emit a first light flux having a wavelength of $\lambda 1$;

a second light source to emit a second light flux having a wavelength of $\lambda 2$ ($\lambda 1 < \lambda 2$);

a converging optical system to converge the first light flux or the second light flux onto a first information recording surface of the first optical information recording medium or a second information recording surface of the second optical information recording medium, the converging optical system having an objective lens; and an optical detector to receive reflected light from the first optical information recording medium or the second optical information recording medium;

wherein the converging optical system comprises a diffracting section on an almost entire surface in an effective aperture of at least one surface thereof, the converging optical system generates an m-th order diffracted light ray (m being an integer other than zero) more than other order diffracted light rays when the first light flux passes the diffracting section and converges the m-th order diffracted light ray onto the first information recording surface so as to conduct the reproducing and/or recording information of the first optical information recording medium;

the converging optical system generates an n-th order diffracted light ray (n being an integer other than zero) more than other order diffracted light rays when the second light flux passes the diffracting section and converges the n-th order diffracted light ray onto the second information recording surface so as to conduct the reproducing and/or recording information of the second optical information recording medium; and a spherical aberration has at least one substantially discontinuous portion when the converging optical system converges the second light flux onto the second information recording surface so as to conduct reproducing and/or recording the information of the second optical information recording medium.

2. The optical pickup apparatus of claim 1, wherein the following formula is satisfied:

$$m=n.$$

3. The optical pickup apparatus of claim 1, wherein when an optical path difference function of the diffracting surface is $\phi(h)$ where h is a distance from the optical axis along the direction perpendicular to the optical axis at the surface provided with the diffracting section, $d\phi(h)/dh$ is discontinuous or substantially discontinuous at least one point, whereby the spherical aberration has at least one discontinuous portion or at least one substantially discontinuous portion when the converging optical system converges the second light flux onto the second information recording surface so as to conduct reproducing and/or recording the information of the second optical information recording medium.

4. The optical pickup apparatus of claim 3, wherein the diffracting section has plural diffracting ring-shaped bands in which a prescribed ring-shaped band is located at the outermost side among inner ring-shaped bands located on an inside of the point of h where $d\phi(h)/dh$ is discontinuous or substantially discontinuous and a neighbor ring-shaped band neighbors the prescribed ring-shaped band and is located on an outside of the point of h and, and wherein a width of the prescribed ring-shaped band along a direction perpendicular to an optical axis of the surface having the diffracting section is smaller than that of the neighbor ring-shaped band.

5. The optical pickup apparatus of claim 1, wherein a necessary numerical aperture at an optical information recording medium-side of the converging optical system necessary to conduct recording or reproducing the information of the first optical information recording medium with the first light flux is NA1 and a necessary numerical aperture at an optical information recording medium-side of the converging optical system necessary to conduct recording or reproducing the information of the second optical information recording medium with the second light flux is NA2 (NA1>NA2), and wherein among the second light flux having passed the objective lens, a light flux having passed a portion of the objective lens whose numerical aperture at the optical information recording media-side is not smaller than NA2 and is not larger than NA1 forms a spot on the second information recording surface through the second transparent base plate of the second optical information recording medium, a diameter of the spot is not smaller than w2 and is not larger than w1, and the following conditional formulas are satisfied:

$$10 \ \mu m \leq w2 \leq 50 \ \mu m.$$

$$20 \ \mu m \leq w1 - w2 \leq 110 \ \mu.$$

6. The optical pickup apparatus of claim 1, wherein when the diffracting section is provided on an aspheric surface of the objective lens and a length x along an optical axis of the objective lens is x coordinate and a height h perpendicular to the optical axis is h coordinate, dx/dh is discontinuous or substantially discontinuous at at least one point on a basic aspheric surface of the aspheric surface provided with the diffracting section, whereby the spherical aberration has at least one discontinuous portion or at least one substantially discontinuous portion when the converging optical system converges the second light flux onto the second information recording surface so as to conduct reproducing and/or recording the information of the second optical information recording medium.

7. The optical pickup apparatus of claim 1, wherein the diffracting section is provided on a surface of the objective lens and the objective lens has a stepped portion in an effective aperture.

8. The optical pickup apparatus of claim 1, wherein a necessary numerical aperture at an optical information recording medium-side of the converging optical system necessary to conduct recording or reproducing the information of the first optical information recording medium with the first light flux is NA1 and a necessary numerical aperture at an optical information recording medium-side of the converging optical system necessary to conduct recording or reproducing the information of the second optical information recording medium with the second light flux is NA2 (NA1>NA2), and wherein among the first light flux having passed the objective lens, when a first light flux having passed a portion of the objective lens whose numerical aperture at the optical information recording media-side is not larger than NA1 passes through the first transparent base plate of the first optical information recording medium, a wave front aberration of the first light flux on the first information. recording surface is not larger than 0.07 $\lambda 1$ rms, and among the second light flux having passed the objective lens, when a second light flux having passed a portion of the objective lens whose numerical aperture at the optical information recording media-side is not larger than NA2 passes through the second transparent base plate of the second optical information recording medium, a wave front aberration of the second light flux on the second information recording surface is not larger than 0.07 $\lambda 2$ rms.

9. The optical pickup apparatus of claim 8, wherein among the second light flux having passed the objective lens, when the second light flux having passed a portion of the objective lens whose numerical aperture at the optical information recording media-side is not larger than NA2 passes through the second transparent base plate of the second optical information recording medium, a third-order spherical aberration component of the wave front aberration of the second light flux on the second information recording surface shows an over characteristic and an absolute value (WSA2·$\lambda 2$ rms) of the third-order spherical aberration component satisfies the following conditional formula:

$$0.02 \ \lambda 2 \ rms \leq WSA2 \cdot \lambda 2 \ rms \leq 0.06 \ \lambda 2 \ rms.$$

10. The optical pickup apparatus of claim 8, wherein among the first light flux having passed the objective lens, when the first light flux having passed a portion of the objective lens whose numerical aperture at the optical information recording media-side is not larger than NA1 passes through the first transparent base plate of the first optical information recording medium, an absolute value (WSA1·λ1 rms) of a third-order spherical aberration component of the wave front aberration of the first light flux on the first information recording surface satisfies the following conditional formula:

$WSA1 \lambda 1 \text{ rms} \leq 0.04 \, \lambda 1 \text{ rms}.$

11. The optical pickup apparatus of claim 1, wherein the spherical aberration has two or more discontinuous portions or two or more substantially discontinuous portions when the converging optical system converges the second light flux onto the second information recording surface so as to conduct reproducing and/or recording the information of the second optical information recording medium.

12. The optical pickup apparatus of claim 1, wherein the objective lens is a single lens having a positive refracting power.

13. The optical pickup apparatus of claim 1, wherein the objective lens comprises a first lens having a positive refracting power and a second lens having a positive refracting power.

14. The optical pickup apparatus of claim 1, wherein the diffracting section comprises plural diffracting ring-shaped bands among which at least one diffracting ring-shaped band satisfies the following conditional formula:

$1.2 \leq P_{i+1}/P_i \leq 10$ where $P_i$ is a width of the diffracting ring-shaped band located at i-th place counted from an optical axis of the surface provided with the diffracting section to a periphery of the objective lens in which the width is along the direction vertical to the optical axis.

15. The optical pickup apparatus of claim 1, wherein a number m of a ring-shaped band through which a light ray of NA of 0.60 passes satisfies the following conditional formula:

$22 \leq m \leq 32$ wherein a number of ring-shaped band located on an optical axis on a surface provided with the diffracting section is 1 and the number m is counted toward the periphery side.

16. The optical pickup apparatus of claim 1, wherein a necessary numerical aperture at an optical information recording medium-side of the converging optical system necessary to conduct recording or reproducing the information of the first optical information recording medium with the first light flux is NA1 and a necessary numerical aperture at an optical information recording medium-side of the converging optical system necessary to conduct recording or reproducing the information of the second optical information recording medium with the second light flux is NA2 (NA1>NA2), and wherein among the first light flux having passed the objective lens, when a first light flux having passed a portion of the objective lens whose numerical aperture at the optical information recording media-side is not larger than NA1 passes through the second transparent base plate of the second optical information recording medium, a wave front aberration of the first light flux on the first information recording surface is not larger than 0.07 λ1 rms, and among the second light flux having passed the objective lens, when a partial second light flux having passed a portion of the objective lens whose numerical aperture at the optical information recording media-side is not larger than NA2 passes through the second transparent base plate of the second optical information recording medium, a wave front aberration of the partial second light flux on the second information recording surface is not larger than 0.07 λ2 rms, and when another partial second light flux having passed a portion of the objective lens whose numerical aperture at the optical information recording media-side is larger than NA2 passes through the second transparent base plate of the second optical information recording medium, a wave front aberration of the another partial second light flux on the second information recording surface is larger than 0.07 λ2 rms.

17. The optical pickup apparatus of claim 1, wherein a numerical aperture of NAZ is a predetermined value which satisfies the following conditional formula:

$0.43 \leq NAZ \leq 0.53$, and wherein among the second light flux having passed the objective lens, when a partial second light flux having passed a portion of the objective lens whose numerical aperture at the optical information recording media-side is not smaller than NAZ and not larger than 0.7 passes through the second transparent base plate of the second optical information recording medium and when another partial second light flux having passed a portion of the objective lens whose numerical aperture at the optical information recording media-side is smaller than NAZ passes through the second transparent base plate of the second optical information recording medium, an amount of spherical aberration of the partial second light flux is larger by 102 or more than that of the another partial second light flux.

18. The optical pickup apparatus of claim 1, wherein the optical detector comprises a light receiving surface arranged at a predetermined position and a numerical aperture of NAZ is a predetermined value which satisfies the following conditional formula:

$0.43 \leq NAZ \leq 0.53$, and wherein among the second light flux having passed the objective lens, when a partial second light flux having passed a portion of the objective lens whose numerical aperture at the optical information recording media-side is smaller than NAZ passes through the second transparent base plate of the second optical information recording medium, reflected light of the partial second light flux from the second recording surface proceeds into the light receiving surface of the optical detector and when another partial second light flux having passed a portion of the objective lens whose numerical aperture at the optical information recording media-side is not smaller than NAZ passes through the second transparent base plate of the second optical information recording medium, reflected light of the another partial second light flux from the second recording surface proceeds into a periphery region other than the light receiving surface of the optical detector.

19. The optical pickup apparatus of claim 1, wherein the optical detector comprises a central light receiving surface and a peripheral light receiving surface arranged at predetermined positions respectively and a numerical aperture of NAZ is a predetermined value which satisfies the following conditional formula:

$0.43 \leq NAZ \leq 0.53$, and wherein among the second light flux having passed the objective lens, when a partial second light flux having passed a portion of the objective lens whose numerical aperture at the optical information recording media-side is not smaller than NAZ passes through the second transparent base plate of the second optical information recording medium, reflected light of the another partial second light flux from the second recording surface proceeds into the peripheral light receiving surface of the optical detector other than the central light receiving surface or a periphery region other than the periphery light receiving surface.

20. The optical pickup apparatus of claim 1, wherein the diffracting section comprises a first diffracting section and a second diffracting section and an order number of a strongest diffracted light ray generated by the first diffracting section for a light flux having a predetermined wavelength and an order number of a strongest diffracted light ray generated by the second diffracting section for the light flux having the predetermined wavelength are different from each other and not zero respectively.

21. The optical pickup apparatus of claim 1, wherein the diffracting section comprises a first diffracting section and a second diffracting section and an order number of a strongest diffracted light ray generated by the first diffracting section for a light flux having a predetermined wavelength and an order number of a strongest diffracted light ray generated by the second diffracting section for the light flux having the predetermined wavelength are same to each other and not zero respectively.

22. An objective lens for use in an optical pickup apparatus to conduct reproducing and/or recording information of an optical information recording medium having a transparent base plate, comprising:
 at least one surface;
 wherein a diffracting section is provided on an almost entire surface of an effective aperture of the surface, wherein when a light flux having a predetermined wavelength passes the diffracting section, the objective lens generates an m-th order diffracted light ray (m being an integer other than zero) more than other order light rays and when the m-th order diffracted light ray is converged through a transparent base plate having a predetermined thickness, a spherical aberration has at least one substantially discontinuous portion.

23. The objective lens of claim 22, herein the optical pickup apparatus conducts reproducing and/or recording information of a first optical information recording medium including a first transparent base plate having a thickness of t1 and a second optical information recording medium including a second transparent base plate having a thickness of t2 (t2>t1),
 when a first light flux having a wavelength of $\lambda 1$ passes the diffracting section, the objective lens generates the m-th order diffracted light ray (m being an integer other than zero) more than other order diffracted light rays and converges the m-th order diffracted light rays onto a first information recording surface so that the optical pickup apparatus conducts the reproducing and/or recording information of the first optical information recording medium;
 when a second light flux having a wavelength of $\lambda 2$ ($\lambda 1 < \lambda 2$) passes the diffracting section, the objective lens generates an n-th order diffracted light ray (n being an integer other than zero) more than other order diffracted light rays and converges the n-th order diffracted light rays onto a second information recording surface so that the optical pickup apparatus conducts the reproducing and/or recording information of the second optical information recording medium; and
 when the objective lens converges the second light flux onto the second information recording surface, a spherical aberration has at least one discontinuous portion or at least one substantially discontinuous portion.

24. The objective lens of claim 23, wherein the following formula is satisfied:

$$m=n.$$

25. The objective lens of claim 23, wherein when an optical path difference function of the diffracting surface is $\phi(h)$ where h is a distance from the optical axis, $d\phi(h)/dh$ is discontinuous or substantially discontinuous at least one point, whereby the spherical aberration has at least one discontinuous portion or at least one substantially discontinuous portion when the converging optical system converges the second light flux onto the second information recording surface so as to conduct reproducing and/or recording the information of the second optical information recording medium.

26. The objective lens of claim 25, wherein the diffracting section has plural diffracting ring-shaped bands in which a prescribed ring-shaped band is located at the outermost side among inner ring-shaped bands located on an inside of the point of h where $d\phi(h)/dh$ is discontinuous or substantially discontinuous and a neighbor ring-shaped band neighbors the prescribed ring-shaped band and is located on an outside of the point of h and, and wherein a width of the prescribed ring-shaped band along a direction perpendicular to an optical axis of the surface having the diffracting section is smaller than that of the neighbor ring-shaped band.

27. The objective lens of claim 23, wherein when the objective lens has an aspheric surface and a length x along an optical axis of the objective lens is x coordinate and a height h perpendicular to the optical axis is h coordinate, dx/dh is discontinuous or substantially discontinuous at least one point on a basic aspheric surface of the aspheric surface.

28. The objective lens of claim 23, wherein the objective lens has a stepped portion in an effective aperture.

29. The objective lens of claim 23, wherein when the objective lens converges the second light flux onto the second information recording surface in order to conduct reproducing and/or recording the information of the second optical information recording medium, a spherical aberration has at least two discontinuous portion or at least two substantially discontinuous portion.

30. The objective lens of claim 22, wherein the objective lens is a single lens having a positive refracting power.

31. The objective lens of claim 22, wherein the objective lens comprises a first lens having a positive refracting power and a second lens having a positive refracting power.

32. The objective lens of claim 22, wherein the diffracting section comprises plural diffracting ring-shaped bands among which at least one diffracting ring-shaped band satisfies the following conditional formula:

$$1.2 \leq P_{i+1}/P_i \leq 10$$

where $P_i$ is a width of the diffracting ring-shaped band located at i-th place counted from an optical axis of the surface provided with the diffracting section to a periphery of the objective lens in which the width is along the direction perpendicular to the optical axis.

33. The objective lens of claim 22, wherein a number m of a ring-shaped band through which a light ray of NA of 0.60 passes satisfies the following conditional formula:

$$22 \leq m \leq 32$$

wherein a number of ring-shaped band located on an optical axis on a surface provided with the diffracting section is 1 and the number m is counted toward the periphery side.

34. The objective lens of claim 22, wherein the diffracting section comprises a first diffracting section and a second diffracting section and an order number of a strongest diffracted light ray generated by the first diffracting section and an order number of a strongest diffracted light ray generated by the second diffracting section for a light flux having a predetermined wavelength are different from each other and not zero respectively.

35. The objective lens of claim 22, wherein the diffracting section comprises a first diffracting section and a second diffracting section and an order number of a strongest diffracted light ray generated by the first diffracting section and an order number of a strongest diffracted light ray generated by the second diffracting section for a light flux having a predetermined wavelength are same to each other and not zero respectively.

36. An optical information reproducing and/or recording apparatus to conduct reproducing and/or recording information of a first optical information recording medium including a first transparent base plate having a thickness of t1 and a second optical information recording medium including a second transparent base plate having a thickness of t2 (t2>t1), comprising:

an optical pickup apparatus comprising:

a first light source to emit a first light flux having a wavelength of $\lambda 1$;

a second light source to emit a second light flux having a wavelength of $\lambda 2$ ($\lambda 1 < \lambda 2$);

a converging optical system to converge the first light flux or the second light flux onto a first information recording surface of the first optical information recording medium or a second information recording surface of the second optical information recording medium, the converging optical system having an objective lens; and an optical detector to receive reflected light from the first optical information recording medium or the second optical information recording medium;

wherein the converging optical system comprises a diffracting section on an almost entire surface in an effective aperture of at least one surface thereof, the converging optical system generates an m-th order diffracted light ray (m being an integer other than zero) more than other order diffracted light rays when the first light flux passes the diffracting section and converges the m-th diffracted light ray onto the first information recording surface so as to conduct the reproducing and/or recording information of the first optical information recording medium;

the converging optical system generates an n-th order diffracted light ray (n being an integer other than zero) more than other order diffracted light rays when the second light flux passes the diffracting section and converges the n-th diffracted light ray onto the second information recording surface so as to conduct the reproducing and/or recording information of the second optical information recording medium; and a spherical aberration has at least one substantially discontinuous portion when the converging optical system converges the second light flux onto the second information recording surface so as to conduct reproducing and/or recording the information of the second optical information recording medium.

* * * * *

UNITED STATES PATENT AND TRADEMARK OFFICE
CERTIFICATE OF CORRECTION

PATENT NO.   : 6,671,247 B1
DATED        : December 30, 2003
INVENTOR(S)  : Norikazu Arai et al.

It is certified that error appears in the above-identified patent and that said Letters Patent is hereby corrected as shown below:

Column 92,
Line 4, "w2and" should read -- w2 and --.
Line 9, "110 μ." should read -- 110 μm. --.
Line 45, "information. recording" should read -- information recording --.

Column 93,
Line 13, "WSA1λ1" should read -- WSA1· λ1 --.

Column 94,
Line 33, "102" should read -- 10λ2 --.

Column 95,
Line 43, "herein" should read -- wherein --.

Column 96,
Line 6, "The. objective" should read -- The objective --.

Signed and Sealed this

Twentieth Day of April, 2004

JON W. DUDAS
*Acting Director of the United States Patent and Trademark Office*